United States Patent
Pincu et al.

(10) Patent No.: US 7,146,258 B2
(45) Date of Patent: Dec. 5, 2006

(54) DIRECT CURRENT POWER POOLING

(75) Inventors: David Pincu, Holon (IL); Ilan Atias, Haifa (IL); Amir Lehr, Hod Hasharon (IL)

(73) Assignee: PowerDsine, Ltd., Hod Hasharon (IL)

( * ) Notice: Subject to any disclaimer, the term of this patent is extended or adjusted under 35 U.S.C. 154(b) by 478 days.

(21) Appl. No.: 10/750,856

(22) Filed: Jan. 5, 2004

(65) Prior Publication Data

US 2005/0146219 A1 Jul. 7, 2005

Related U.S. Application Data

(63) Continuation of application No. PCT/IL03/00832, filed on Oct. 14, 2003.

(60) Provisional application No. 60/418,599, filed on Oct. 15, 2002.

(51) Int. Cl.
 *H02J 3/12* (2006.01)
 *H02J 3/14* (2006.01)
 *H02J 1/00* (2006.01)

(52) U.S. Cl. .................. 700/297; 700/286; 700/291

(58) Field of Classification Search ............. 700/286, 700/291, 297
See application file for complete search history.

(56) References Cited

U.S. PATENT DOCUMENTS

| | | | | |
|---|---|---|---|---|
| 5,157,269 A | 10/1992 | Jordan et al. | ............. | 307/59 |
| 5,221,862 A * | 6/1993 | Fiorina et al. | ............. | 307/66 |
| 5,266,838 A | 11/1993 | Gerner | ............. | 307/19 |
| 5,483,656 A | 1/1996 | Oprescu et al. | ............. | 713/320 |
| 5,712,779 A | 1/1998 | Sheppard et al. | ............. | 363/69 |
| 5,745,670 A | 4/1998 | Linde | ............. | 714/22 |
| 5,834,925 A | 11/1998 | Chesavage | ............. | 323/272 |
| 5,844,329 A | 12/1998 | Bailey et al. | ............. | 307/66 |
| 5,892,299 A | 4/1999 | Siewert et al. | ............. | 307/85 |
| 5,914,585 A | 6/1999 | Grabon | ............. | 320/125 |
| 6,008,971 A | 12/1999 | Duba et al. | ............. | 361/64 |
| 6,009,000 A | 12/1999 | Siri | ............. | 363/21 |
| 6,104,103 A | 8/2000 | Siewert et al. | ............. | 307/64 |
| 6,121,693 A | 9/2000 | Rock | ............. | 307/18 |
| 6,125,448 A | 9/2000 | Schwan et al. | ............. | 713/300 |
| 6,153,946 A | 11/2000 | Koch et al. | ............. | 307/64 |
| 6,295,487 B1 * | 9/2001 | Ono et al. | ............. | 701/22 |
| 6,377,874 B1 | 4/2002 | Ykema | ............. | 700/286 |
| 6,420,850 B1 | 7/2002 | Thurman | ............. | 320/130 |
| 6,535,983 B1 | 3/2003 | McCormack et al. | ............. | 713/310 |
| 6,539,484 B1 | 3/2003 | Cruz | ............. | 713/300 |
| 6,608,470 B1 * | 8/2003 | Oglesbee et al. | ............. | 320/136 |

(Continued)

OTHER PUBLICATIONS

IEEE Standard for a High Performance Serial Bus—IEEE 1394-1995.

*Primary Examiner*—Stephen W. Jackson
*Assistant Examiner*—Hal I. Kaplan
(74) *Attorney, Agent, or Firm*—Simon Kahn

(57) ABSTRACT

The present invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; DC electrical power interconnections, interconnecting the plurality of DC electrical power consuming and providing entities and permitting electrical power flow thereto and therefrom; and at least one pooling controller operative to vary at least one of voltage, output impedance and current of electrical power provided by at least one of the plurality of DC electrical power consuming and providing entities.

38 Claims, 52 Drawing Sheets

U.S. PATENT DOCUMENTS

| | | |
|---|---|---|
| 6,628,011 B1 | 9/2003 | Droppo et al. ................. 307/43 |
| 6,640,308 B1 | 10/2003 | Keyghobad et al. ......... 713/300 |
| 6,909,943 B1 | 6/2005 | Lehr et al. ................... 700/286 |
| 2002/0091950 A1 | 7/2002 | Cruz .......................... 713/300 |
| 2003/0072438 A1 | 4/2003 | Le Creff et al. ......... 379/399.01 |
| 2003/0078797 A1 | 4/2003 | Kanbara et al. ................ 705/1 |
| 2003/0141907 A1 | 7/2003 | Canova et al. .............. 327/131 |
| 2003/0187550 A1* | 10/2003 | Wilson et al. .............. 700/295 |
| 2004/0051397 A1 | 3/2004 | Juntunen et al. ............ 307/130 |

* cited by examiner

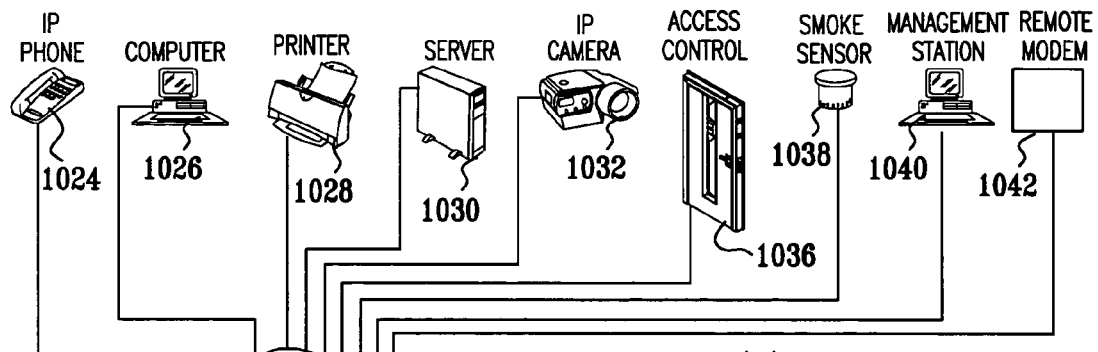
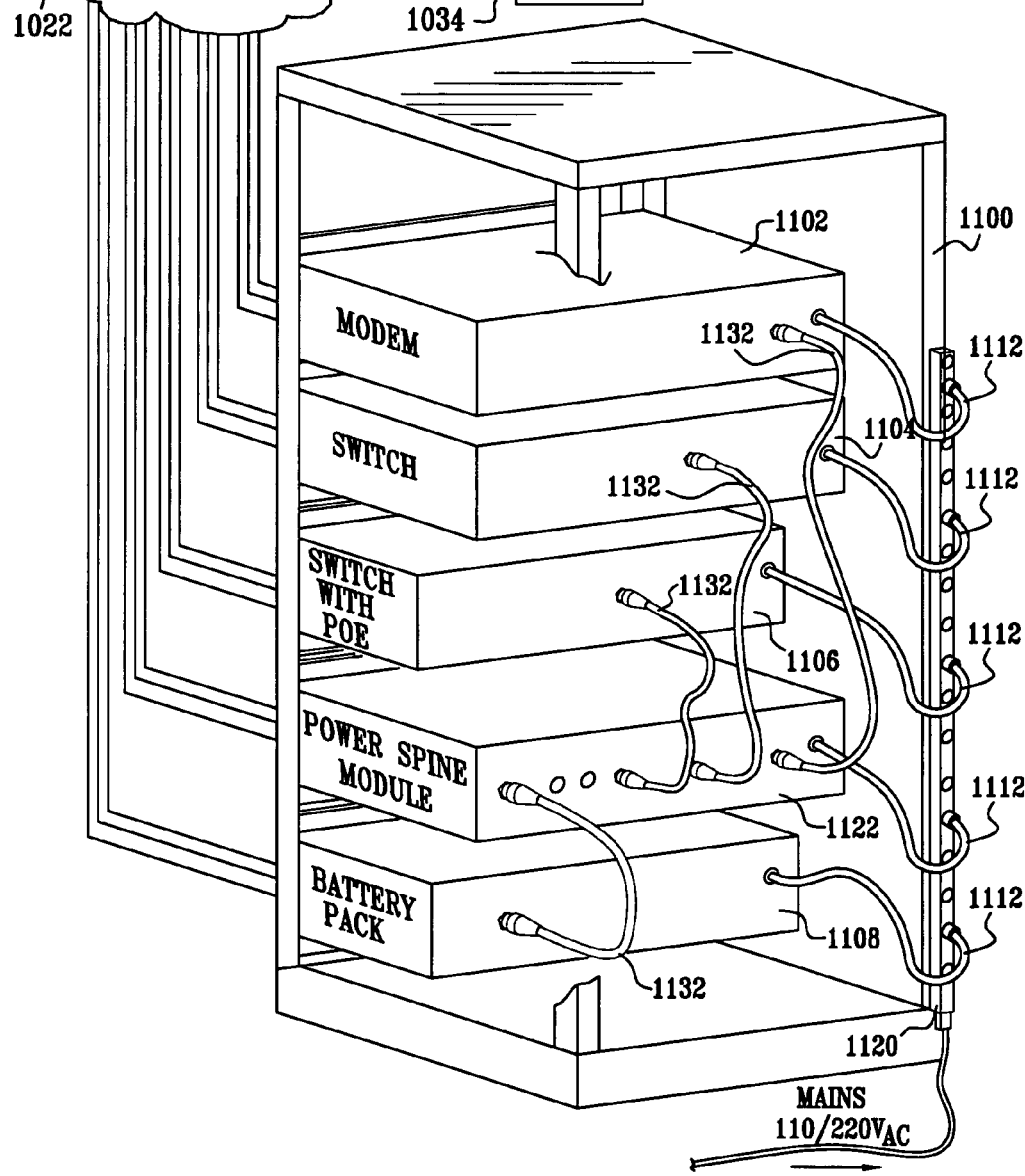
FIG. 11

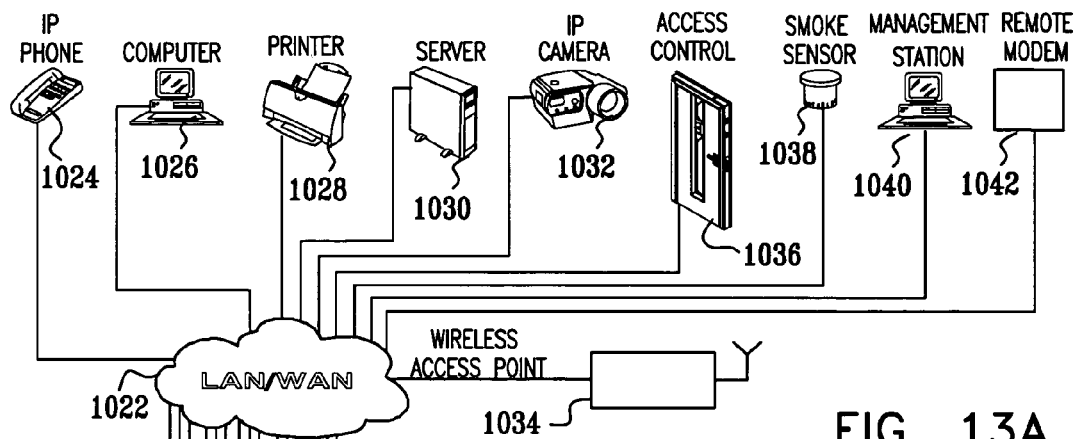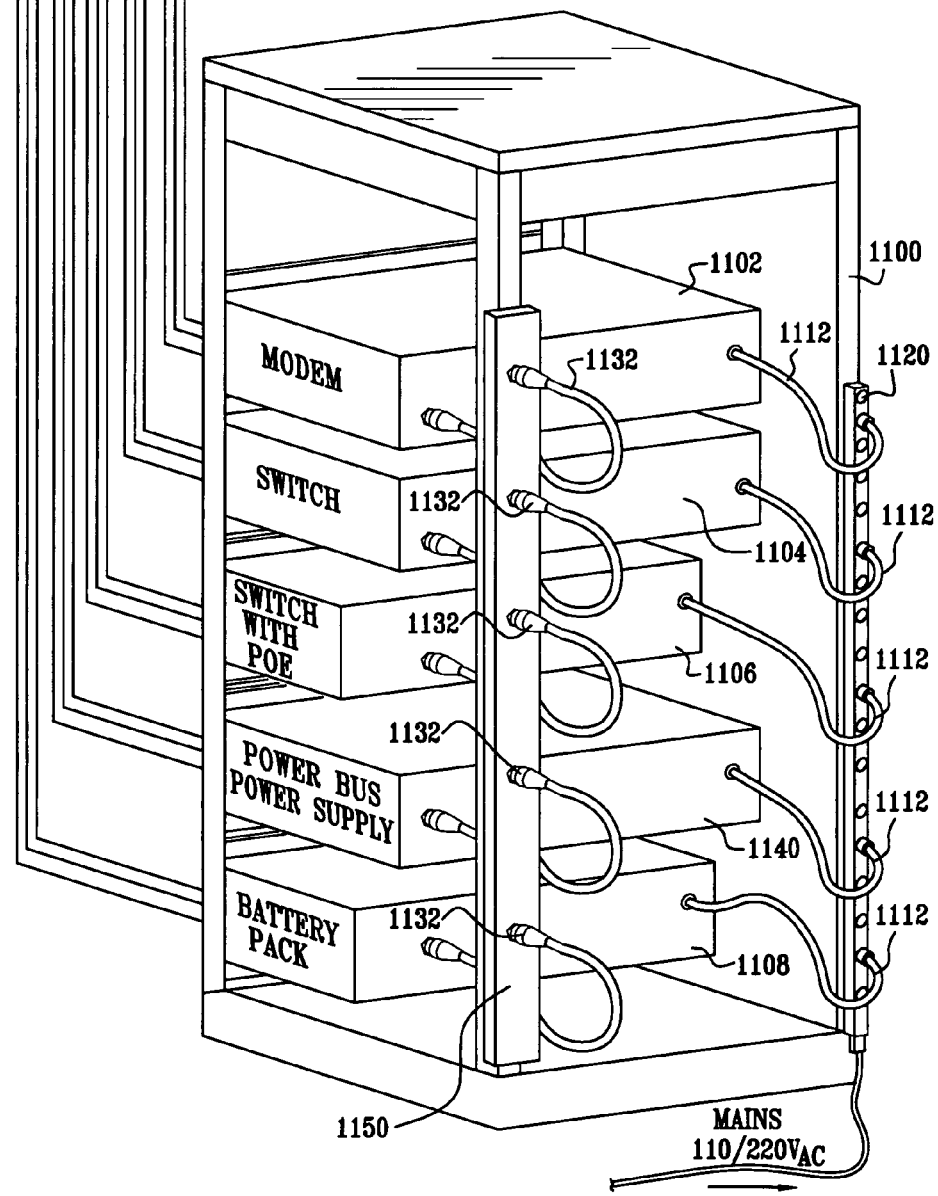
FIG. 13A

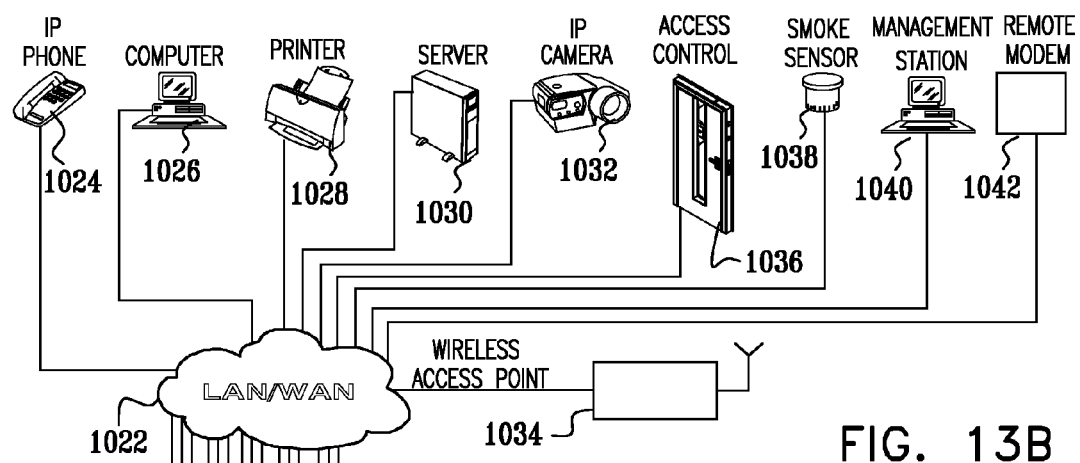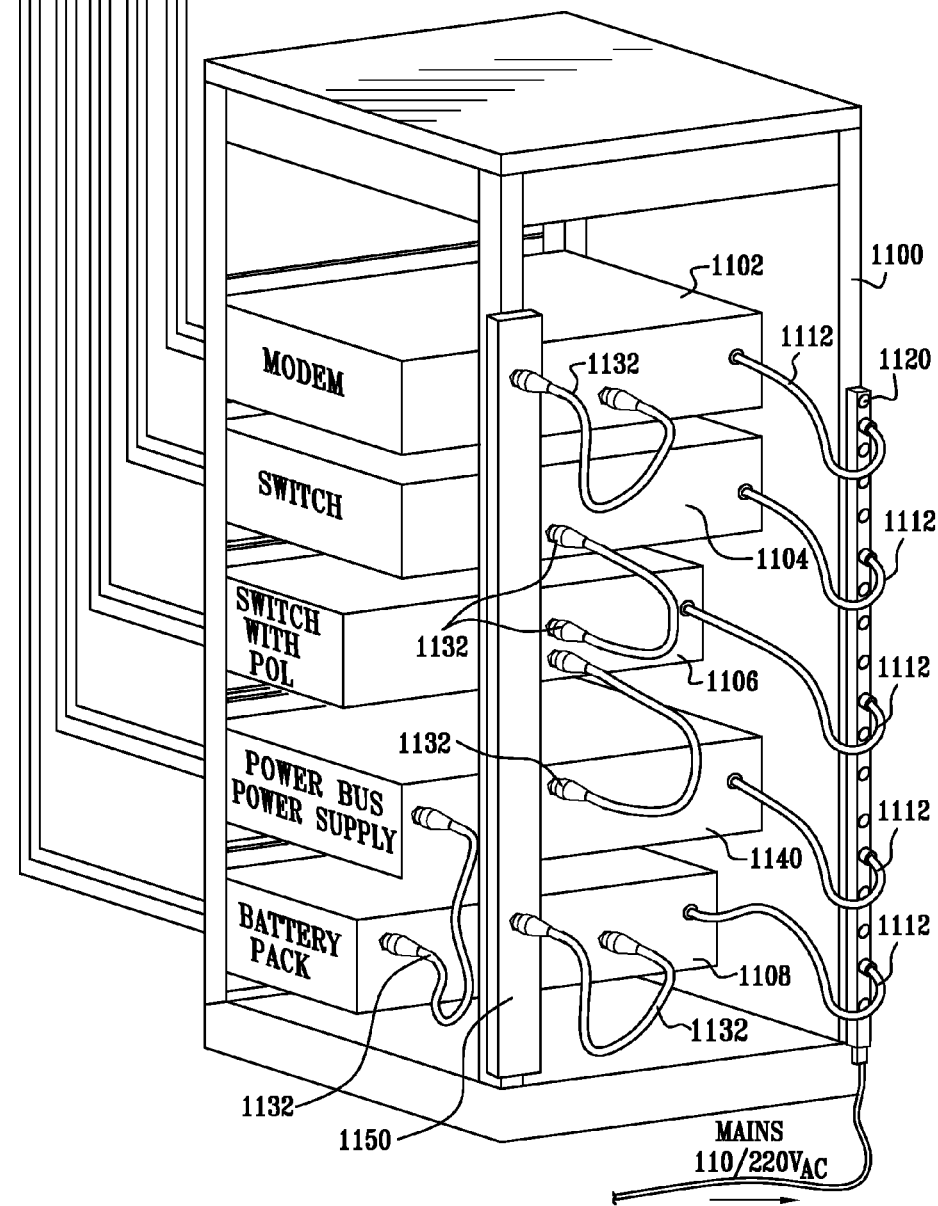
FIG. 13B

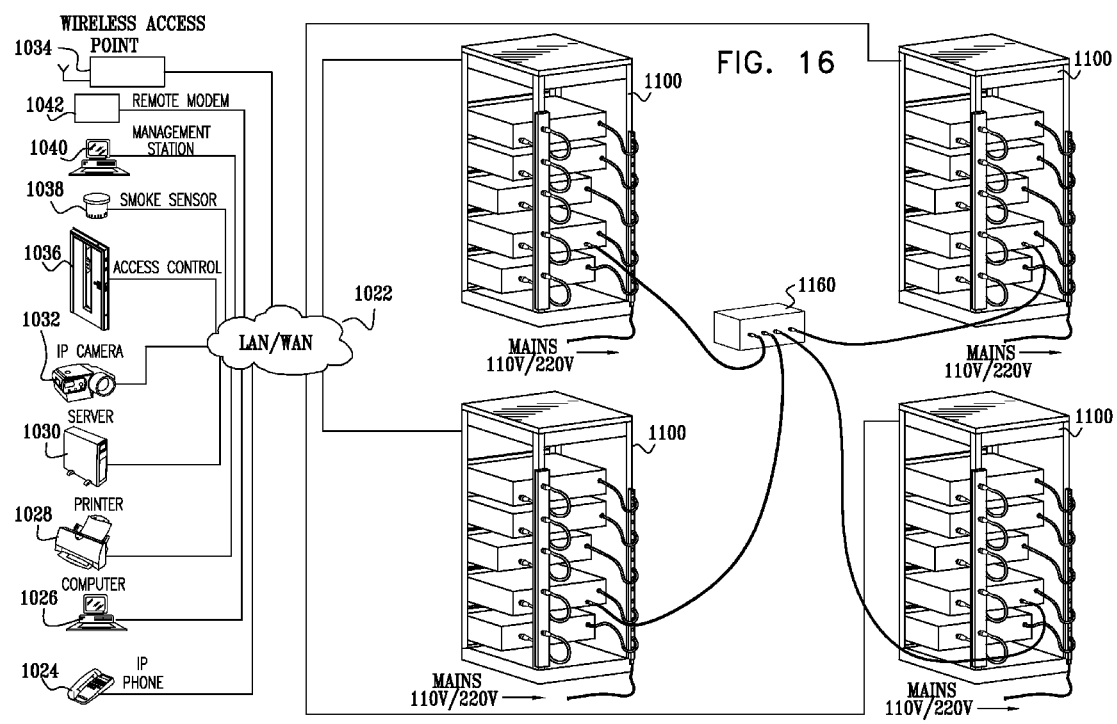

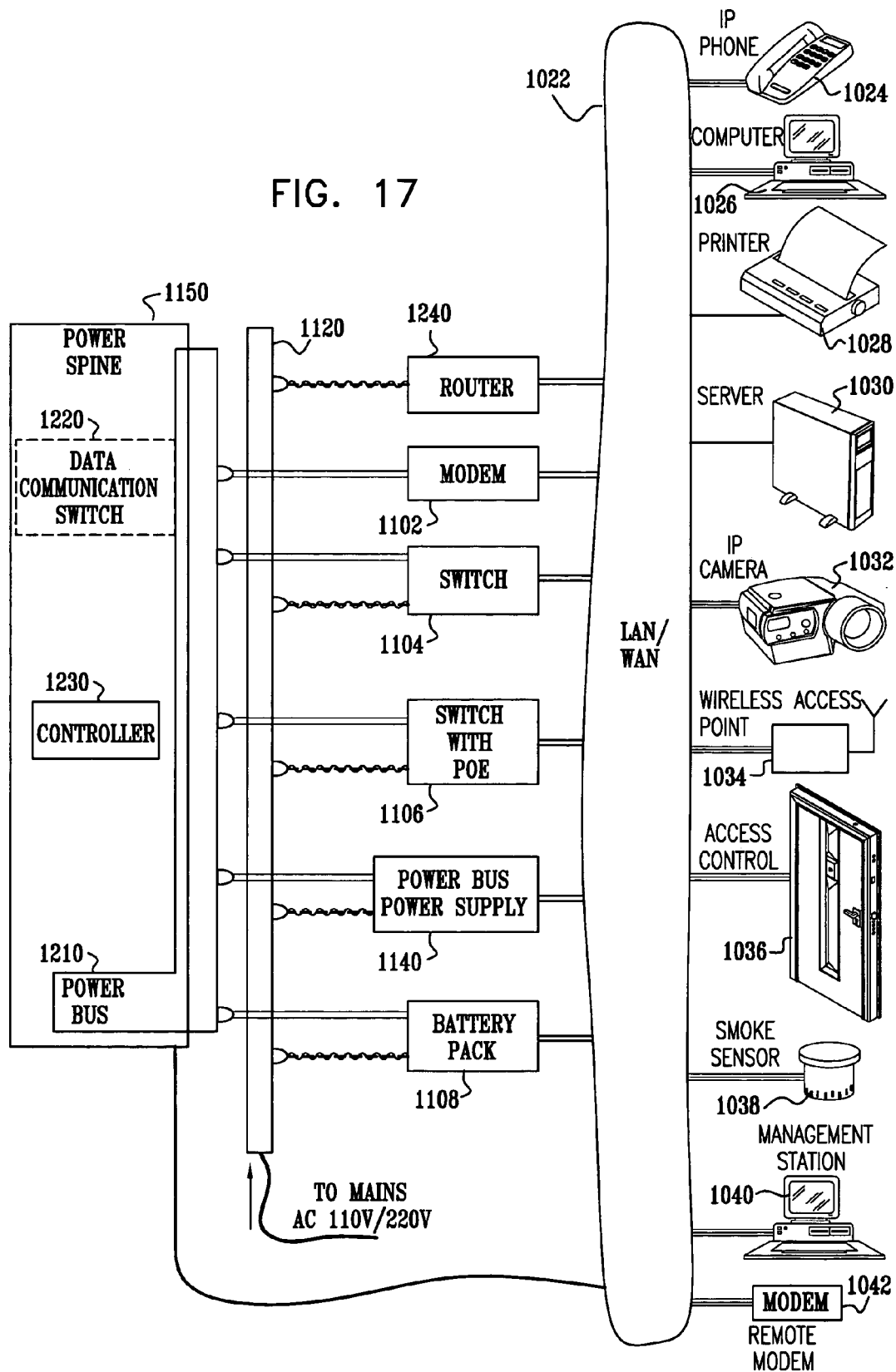

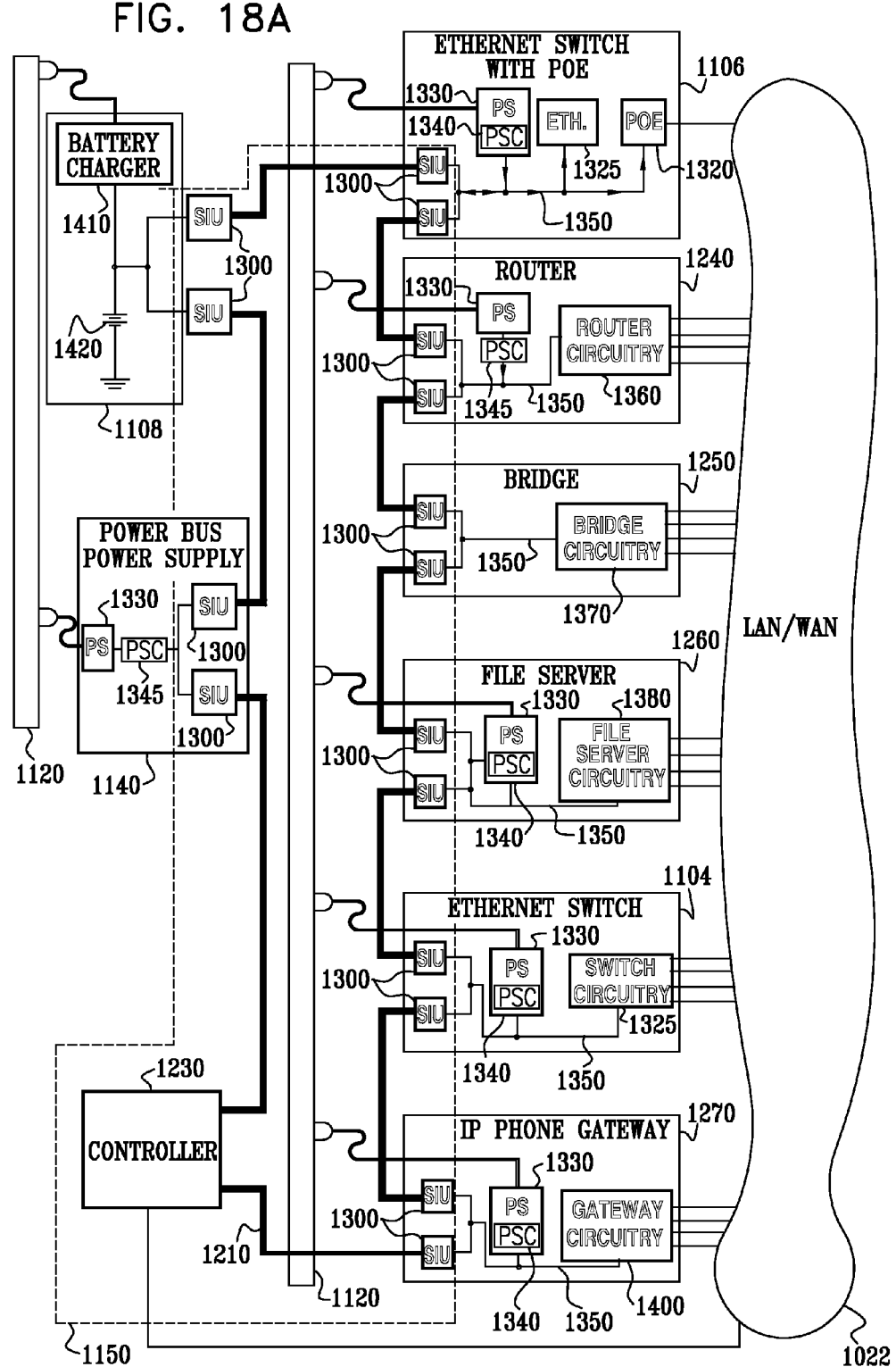

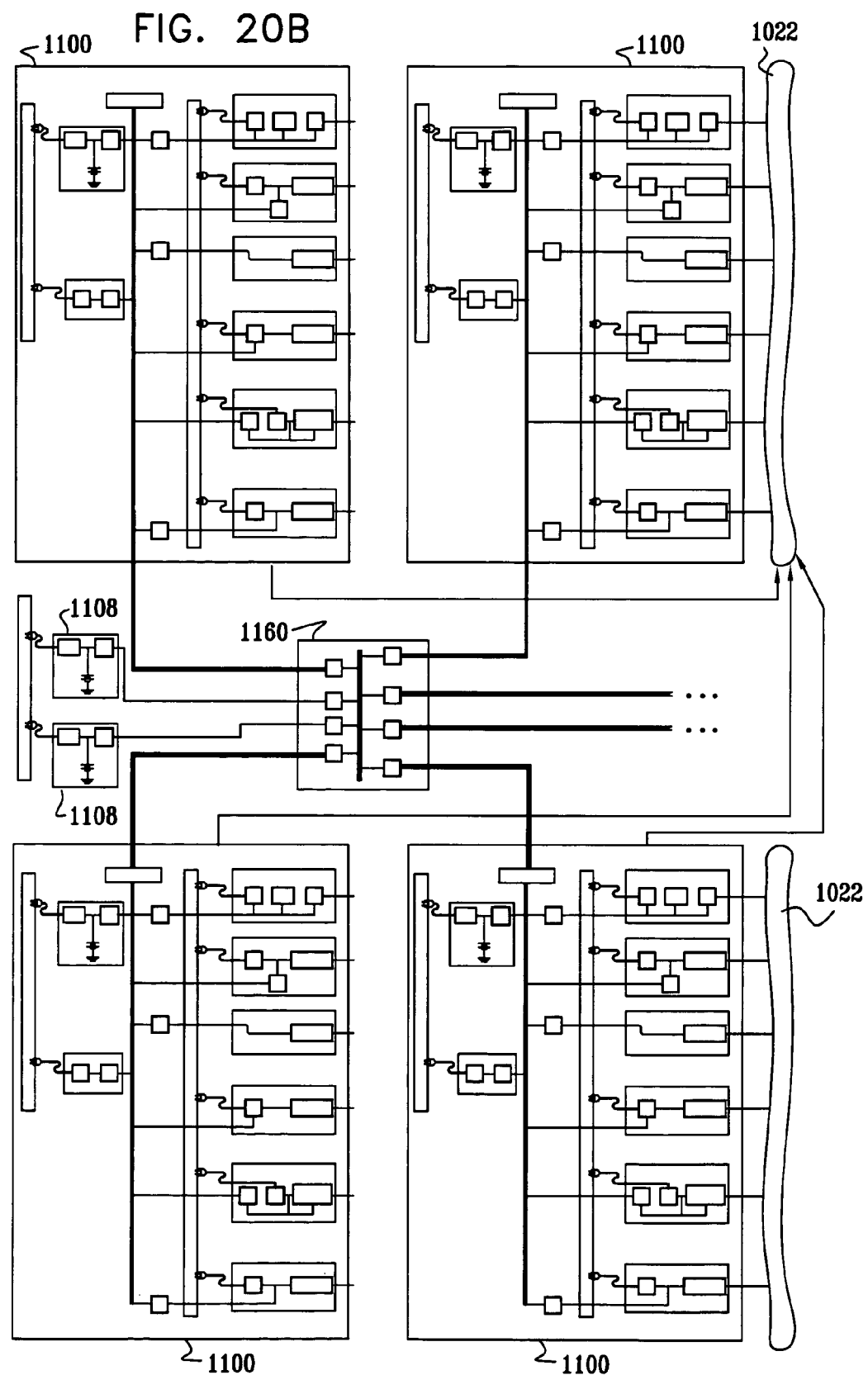

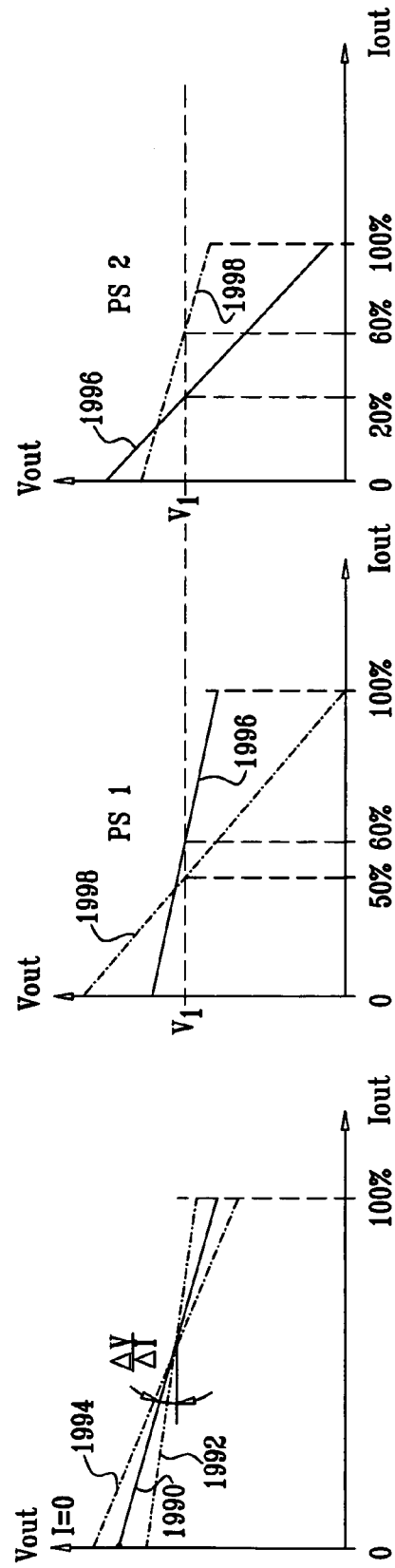

DIRECT CURRENT POWER POOLING

CROSS-REFERENCE TO RELATED APPLICATIONS

The present application claims priority from, and is a continuation of, PCT patent application No. PCT/IL03/00832 filed Oct. 14, 2003, which claims priority from U.S. Provisional Patent Application No. 60/418,599 filed Oct. 15, 2002, whose entire contents are incorporated herein by reference.

BACKGROUND OF THE INVENTION

The present invention relates to the field of powering a system comprising multiple components, and in particular to a system and entities for DC power pooling.

Systems comprising multiple modules, such as communication systems, commonly comprise modules having on-board power supplies that are connected to a common mains. In order to provide uninterrupted operation of the system, including during failure of power mains, systems often comprise a back-up power supply, such as an uninterruptible power supply (UPS), which during a power interrupt functions to supply AC power to each of modules in the system.

The combination of modules each comprising an on-board power supply often leads to a less than optimum situation, in which the on-board power supply of some modules are operating at low utilization, while the on-board power supply of other modules are approaching or have reached maximum utilization. Power supply longevity is at least partially a function of the utilization rate, in which typically a highly utilized power supply begins to increase in temperature. This increase in temperature leads to a shortened life for the power supply.

Certain modules, for example an Ethernet switch having power over Ethernet functionality, may have a need for additional power above that available from the on-board power supply. Prior art systems require a dedicated additional power supply to be added as a module, feeding the additional required power. Such a dedicated additional power supply is required despite the on-board power supply of other modules in the system being at low utilization, thus having spare power available. Furthermore, in prior art systems, a dedicated additional power supply will typically be initially underutilized, and will only experience optimum utilization as the system power needs grow. This underutilized dedicated additional power supply is thus unavailable in the event that one of the other modules in the system has reached maximum utilization of its on-board power supply.

In the event that one of the modules in the system experiences an on-board power supply failure, the prior art further does not teach an arrangement for supplying power to the module in place of the local power supply. Furthermore, the prior art does not teach an arrangement in which the utilization of local power supplies is optimized.

U.S. Pat. No. 6,125,448 issued to Schwan et al. discloses a method and apparatus of powering components on a network by using a load-share technique and by using over-voltage and current limiting circuitry. Under normal operation of the power subsystem, the load will be powered directly from the power subsystem. Unfortunately, no means of optimization of overall network power is described.

U.S. Pat. No. 5,745,670 issued to Linde discloses a fault tolerant power supply system including a plurality of nodes coupled to a common power distribution bus. Under normal operation of the power subsystem, the load will be powered directly from the power subsystem, and excess power is available to be supplied to the bus. Upon failure of the local power supply, bus power is supplied under certain conditions. No means of optimization of overall network power is described, and no means of centralized control of individual local power supplies exist.

IEEE 1394 specification, "IEEE Standard for a High Performance Serial Bus", IEEE Std 1394-1995, Aug. 30, 1996, describes a high speed serial bus that includes the capability for sourcing power from one "node" to another over a power bus coupling the nodes. This power sourcing capability introduces potential complexities into the process of configuring the power source/sink relationships between a set of nodes or systems, such as those coupled by a 1394 specification compliant bus. For example, at any given time, one node should be providing or sourcing power and the remaining nodes should either consume power as a power sink, power themselves, or act as a power "conduit" distributing power from the power source to nodes coupled to the power distribution bus or cable (but not directly coupled to the power source). Such a layout does not teach an arrangement or a means allowing for optimization of overall network power.

U.S. Pat. No. 6,539,484 issued to Cruz describes an electronically configurable physical arrangement of power transistors. The arrangement is configurable under externally derived electrical signals to: sink power to a node from a power bus segment; source power from the node to a power bus segment; and distribute power through the node. Such an arrangement allows flexibility and power sharing, however it does not optimize overall network power.

There is therefore a need for an arrangement in which the utilization of local power supplies is optimized.

SUMMARY OF THE INVENTION

Accordingly, it is a principal object of the present invention to overcome the disadvantages of prior art arrangements. This is provided in the present invention by a system of power pooling of DC electrical power consuming and providing entities being interconnected to pool power under control of a pooling controller.

The invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; DC electrical power interconnections, interconnecting the plurality of DC electrical power consuming and providing entities and permitting electrical power flow thereto and therefrom; and at least one pooling controller operative to vary at least one of voltage, output impedance and current of electrical power provided by at least one of the plurality of DC electrical power consuming and providing entities.

Independently, the invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; electrical power interconnections, interconnecting the plurality of DC electrical power consuming and providing entities and permitting electrical power flow thereto and therefrom; and at least one dynamic closed loop pooling controller operative to govern electrical power provided by at least one of the plurality of DC electrical power consuming and providing entities.

Independently, the invention provides for a DC power system comprising: a plurality of DC electrical power consuming entities, each of the plurality of electrical power consuming entities including at least one electrical power source receiving AC mains power and at least one electrical power load consuming DC power; at least one centralized DC backup power source; DC electrical power interconnections, interconnecting the plurality of electrical power consuming entities and the at least one DC backup power source; and at least one backup controller operative to control supply of electrical power from the at least one centralized DC backup power source to the plurality of DC electrical power consuming entities.

Independently, the invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; electrical power interconnections, interconnecting the plurality of DC electrical power consuming and providing entities and permitting electrical power flow thereto and therefrom; and at least one optimization driven pooling controller operative to govern interchange of electrical power between the plurality of DC electrical power consuming and providing entities, providing optimization of at least one of temperature, electrical load and percentage of available power being supplied of the plurality of DC electrical power consuming and providing entities.

Independently, the invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; electrical power interconnections, interconnecting the plurality of DC electrical power consuming and providing entities and permitting electrical power flow thereto and therefrom; and at least one priority driven pooling controller operative to govern interchange of electrical power between the plurality of DC electrical power consuming and providing entities, operative in accordance with predetermined priorities relating to at least one of temperature, electrical load and percentage of available power being supplied of the plurality of DC electrical power consuming and providing entities.

Independently, the invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; electrical power interconnections, interconnecting the plurality of DC electrical power consuming and providing entities and permitting electrical power flow thereto and therefrom; and at least one priority driven pooling controller operative to govern interchange of electrical power between the plurality of DC electrical power consuming and providing entities, operative in accordance with predetermined priorities relating to individual ones of the plurality of DC electrical power consuming and providing entities.

Independently, the invention provides for a DC power pooling system comprising: a plurality of DC electrical power consuming and providing entities, each of the plurality of DC electrical power consuming and providing entities having at least a first operative mode in which it may provide more electrical power than it consumes and a second operative mode in which it may consume more electrical power than it provides; electrical power interconnections, interconnecting the plurality of DC electrical power consuming and providing entities and permitting electrical power flow thereto and therefrom; and at least one controller in data communication with the plurality of DC electrical power consuming and providing entities and being operative to employ the communication to govern electrical power provided by at least one of the plurality of DC electrical power consuming and providing entities.

Independently, the invention provides for a DC power pooling system for an Ethernet network comprising: a plurality of DC electrical power consuming and providing Ethernet nodes, each of the plurality of DC electrical power consuming and providing Ethernet nodes having at least a first operative mode in which it may provide more electrical power than it consumes and a second operative mode in which it may consume more electrical power than it provides; electrical power interconnections, interconnecting the plurality of DC electrical power consuming and providing Ethernet nodes and permitting electrical power flow thereto and therefrom; and at least one controller in data communication with the plurality of DC electrical power consuming and providing Ethernet nodes and being operative to employ the communication to govern electrical power provided by at least one of the plurality of DC electrical power consuming and providing Ethernet nodes.

For each of the above independent inventions, in one embodiment each of the plurality of DC electrical power consuming and providing entities, or Ethernet nodes, respectively, comprises at least one DC electrical power source and at least one electrical power load. In one further embodiment, the DC electrical power source receives AC mains power and converts the AC mains power to DC electrical power.

In another further embodiment of each of the above independent inventions, each of the plurality of DC electrical power consuming and providing entities, or Ethernet nodes, respectively, further comprises at least one power sharing circuit associated with the at least one DC electrical power source, the at least one power sharing circuit being responsive to an output of the at least one controller to vary the at least one of voltage, output impedance and current of electrical power provided by the at least one DC electrical power source. In one yet further embodiment, the at least one DC electrical power source comprises a power supply controller, and wherein the at least one power sharing circuit is operable to modify the operation of the power supply controller. In another yet further embodiment, the power sharing circuit comprises a temperature sensor having a temperature indicating output, the at least one power sharing circuit being operable to communicate information regarding the temperature indicating output to the at least one controller.

In one embodiment of each of the above independent inventions, the controller receives for each of the plurality of DC electrical power consuming and providing entities, or Ethernet nodes, respectively, information relating to DC electrical power needs and DC electrical power providing capabilities.

In one embodiment of each of the above independent inventions, in which each of the plurality of DC electrical power consuming and providing entities, or Ethernet nodes, respectively, comprises at least one DC electrical power source and at least one electrical power load, the controller receives at least one of power needs of the at least one electrical power load and power providing capabilities of the at least one DC electrical power source.

In one embodiment of each of the above independent inventions, the system further comprises a supply interface unit associated with at least one of the DC electrical power interconnections, the supply interface unit being responsive to an output of the at least one controller to control the electrical power flow. In one further embodiment, the supply interface unit comprises at least one adjustable current limiter responsive to an output of the at least one controller, the at least one adjustable current limiter being operative for limiting at least one of the electrical power flow to at least one of the plurality of DC electrical power consuming and providing entities, or Ethernet nodes, respectively, and from at least one of the plurality of DC electrical power consuming and providing entities or Ethernet nodes, respectively. In another further embodiment, the supply interface unit comprises at least one current sensor, the at least one current sensor being operative for sensing at least one of the electrical power flow to at least one of the plurality of DC electrical power consuming and providing entities, or Ethernet nodes, respectively, and from at least one of the plurality of DC electrical power consuming and providing entities, or Ethernet nodes, respectively. In one further embodiment, the supply interface unit comprises a telemetry output operable to communicate with the at least one controller, the telemetry output comprising information regarding at least one of direction and extent of electrical power flow.

In one embodiment of each of the above independent inventions, at least one of the plurality of DC electrical power consuming and providing entities, or Ethernet nodes, respectively, comprises a temperature sensor having a temperature indicating output, wherein the at least one of the plurality of DC electrical power consuming and providing entities, or Ethernet nodes, respectively, communicates information regarding the temperature indicating output to the at least one controller.

In one embodiment of each of the above independent inventions, at least one of the plurality of DC electrical power consuming and providing entities, or Ethernet nodes, respectively, comprises at least one of a modem, a switch, a switch providing power over Ethernet and operating in accordance with IEEE 802.3af Standard, an Internet Protocol telephone, a computer, a server, a camera, an access controller, a smoke sensor, a wireless access point and a battery pack module.

In another embodiment of each of the above independent inventions, the system further comprises an overcurrent protection circuit associated with at least one of the DC electrical power interconnections. In a further embodiment the overcurrent protection circuit comprises at least one of a fuse and a circuit breaker operative to prevent excess power flow.

In another embodiment of each of the above independent inventions, the system further comprises a power supply module interconnected with at least one of the DC electrical power interconnections, the power supply module being operative to supply power to at least one of the plurality of DC electrical power consuming and providing entities, or Ethernet nodes, respectively, when the at least one of the plurality of DC electrical power consuming and providing entities, or Ethernet nodes, respectively, is operative in the second mode.

In one embodiment of each of the above independent inventions, the system further comprises a power supply module interconnected with at least one of the DC electrical power interconnections, and wherein the power supply module is operative in response to an output of the at least one controller to supply power to at least one of the plurality of DC electrical power consuming and providing entities, or Ethernet nodes, respectively, when the at least one of the plurality of DC electrical power consuming and providing entities, or Ethernet nodes, respectively, is operative in the second mode.

In another embodiment of each of the above independent inventions, the system further comprises a battery pack module interconnected with at least one of the DC electrical power interconnections, and wherein the battery pack module supplies power to at least one of the plurality of DC electrical power consuming and providing entities, or Ethernet nodes, respectively, when the at least one of the plurality of DC electrical power consuming and providing entities, or Ethernet nodes, respectively, is operative in the second mode.

In another embodiment of each of the above independent inventions at least one of the DC electrical power interconnections are arranged in one of a hierarchical star topology and a hierarchical ring topology.

Another independent aspect of the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one pooling controller; interconnecting the plurality of DC electrical power consuming and providing entities thereby permitting electrical power flow thereto and therefrom; and varying at least one of voltage, output impedance and current of electrical power provided by at least one of the plurality of DC electrical power consuming and providing entities in response to an output of the at least one pooling controller thereby enabling DC power pooling.

Independently, the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one dynamic closed loop pooling controller; interconnecting the plurality of DC electrical power consuming and providing entities thereby permitting electrical power flow thereto and therefrom; and governing electrical power provided by at least one of the plurality of DC electrical power consuming and providing entities in response to an output of the at least one dynamic closed loop pooling controller thereby enabling DC power pooling.

Independently, the invention provides for a method of centralized DC backup comprising: providing a plurality of DC electrical power consuming entities, each of the plurality of DC electrical power consuming having at least one DC electrical power source receiving AC mains power; providing at least one centralized DC backup power source; providing at least one backup controller; interconnecting the plurality of DC electrical power consuming entities and the at least one centralized DC backup power source; and supplying DC electrical power from the at least one centralized DC backup power source to at least one of the DC electrical power consuming entities.

Independently, the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one optimization driven pooling controller; interconnecting the plurality of DC electrical power consuming and providing entities thereby permitting interchange electrical power thereto and therefrom; and governing the interchange of electrical power in response to an output of the at least one optimization driven pooling controller, providing optimization of at least one of temperature, electrical load and percentage of available power being supplied, thereby enabling DC power pooling.

Independently, the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one priority driven pooling controller;

interconnecting the plurality of DC electrical power consuming and providing entities thereby permitting interchange electrical power thereto and therefrom; and governing the interchange of electrical power in response to an output of the at least one priority driven pooling controller in accordance with predetermined priorities relating to at least one of temperature, electrical load and percentage of available power being supplied of the plurality of DC electrical power consuming and providing entities, thereby enabling DC power pooling.

Independently, the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one priority driven pooling controller;

interconnecting the plurality of DC electrical power consuming and providing entities thereby permitting interchange electrical power thereto and therefrom; and governing the interchange of electrical power in response to an output of the at least one priority driven pooling controller in accordance with predetermined priorities relating to individual ones of the plurality of DC electrical power consuming and providing entities, thereby enabling DC power pooling.

Independently, the invention provides for a method of DC power pooling comprising: providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides; providing at least one controller; interconnecting the plurality of DC electrical power consuming and providing entities thereby permitting electrical power flow thereto and therefrom; and governing electrical power provided by at least one of the plurality of DC electrical power consuming and providing entities in response to an output of the at least one controller, thereby enabling DC power pooling.

Independently, the invention provides for a method of DC power pooling for a plurality of nodes of an Ethernet network comprising: providing a plurality of DC electrical power consuming and providing Ethernet nodes, each of the plurality of DC electrical power consuming and providing Ethernet nodes having at least a first operative mode in which it may provide more electrical power than it consumes and a second operative mode in which it may consume more electrical power than it provides; providing at least one controller in data communication with the plurality of DC electrical power consuming and providing Ethernet nodes; interconnecting the plurality of DC electrical power consuming and providing Ethernet nodes thereby permitting interchange electrical power thereto and therefrom; and governing the interchange of electrical power in response to an output of the at least one controller, thereby enabling DC power pooling.

For each of the above independent inventions, in one embodiment each of the plurality of DC electrical power consuming and providing entities comprises at least one DC electrical power source and at least one electrical power load. One further embodiment comprises receiving AC mains power by the each of the plurality of DC electrical power consuming and providing entities, or Ethernet nodes, respectively; converting the AC mains power to DC power; and providing the DC power to the at least one electrical power load located in the each of the plurality of DC electrical power consuming and providing entities, or Ethernet nodes, respectively. Another further embodiment comprises providing at least one power sharing circuit associated with the at least one DC electrical power source, and wherein the varying is accomplished by the at least one power sharing circuit. In a yet further embodiment the at least one DC electrical power source comprises a power supply controller, and wherein the varying is accomplished by modifying the operation of the power supply controller.

In another embodiment of each of the above independent inventions, the method further comprises: receiving for each of the plurality of DC electrical power consuming and providing entities information relating to DC electrical power needs and DC electrical power providing capabilities, wherein the varying is accomplished at least partially in response to the received information.

In another embodiment of each of the above independent inventions wherein each of the plurality of DC electrical power consuming and providing entities, or Ethernet nodes, respectively, comprise at least one DC electrical power source and at least one electrical load, the method further comprises: receiving by the controller at least one of power needs of the at least one electrical power load and power providing capabilities of the at least one DC electrical power source.

In another embodiment of each of the above independent inventions, the method further comprises: providing a supply interface unit associated with at least one of the plurality of DC electrical power consuming and providing entities, or Ethernet nodes, respectively; and controlling the electrical power flow in response to an output of the at least one controller. In one further embodiment the method comprises sensing a temperature of the at least one DC electrical power source; communicating information relating to the sensed temperature to the at least one controller. In another further embodiment, the controlling comprises: limiting at least one of the electrical power flow to at least one of the plurality of DC electrical power consuming and providing entities and from at least one of the plurality of DC electrical power consuming and providing entities. In another further embodiment the method further comprises:

sensing at least one of the electrical power flow to at least one of the plurality of DC electrical power and consuming entities, or Ethernet nodes, respectively, and from at least one of the plurality of DC electrical power and consuming entities, or Ethernet nodes, respectively. In a yet further embodiment the method comprises:

communicating information relating to at least one of direction and amount of electrical power flow sensed by the sensing to the at least one controller.

In another embodiment of each of the above independent inventions, the method further comprises: sensing a temperature of at least one the plurality of DC electrical power consuming and providing entities; and communicating information relating to the sensed temperature to the at least one pooling controller.

In another embodiment of each of the above independent inventions at least one of the plurality of DC electrical power consuming and providing entities, or Ethernet nodes, respectively, comprises at least one of a modem, a switch, a switch providing power over Ethernet and operating in accordance with IEEE 802.3af Standard, an Internet Protocol telephone, a computer, a server, a camera, an access controller, a smoke sensor, a wireless access point and a battery pack module.

In another embodiment of each of the above independent inventions, the method further comprises: protecting at least one of the plurality of DC electrical power consuming and providing entities, or Ethernet nodes, respectively, against excess electrical power flow. In a further embodiment the protecting comprises: providing at least one of a fuse and a circuit breaker operative to prevent excess electrical power flow.

In another embodiment of each of the above independent inventions the method further comprises: providing a power supply module; interconnecting the power supply module with the interconnected plurality of DC electrical power consuming and providing entities, or Ethernet nodes, respectively; and supplying power from the power supply module to at least one of the plurality of DC electrical power consuming and providing entities or Ethernet nodes, respectively, when the at least one of the plurality of DC electrical power consuming and providing entities or Ethernet nodes, respectively, is operative in the second mode.

In another embodiment of each of the above independent inventions, the method further comprises: providing a power supply module; interconnecting the power supply module with the interconnected plurality of DC electrical power consuming and providing entities, or Ethernet nodes, respectively; and supplying power from the power supply module in response to an output of the at least one controller to at least one of the plurality of DC electrical power consuming and providing entities, or Ethernet nodes, respectively, when the at least one of the plurality of DC electrical power consuming and providing entities, or Ethernet nodes, respectively, is operative in the second mode.

In another embodiment of each of the above independent inventions, the method further comprises: providing a battery pack module; interconnecting the battery pack module with the interconnected plurality of DC electrical power consuming and providing entities, or Ethernet nodes, respectively; and supplying power from the battery pack module to at least one of the plurality of DC electrical power consuming and providing entities, or Ethernet nodes, respectively, when the at least one of the plurality of DC electrical power consuming and providing entities, or Ethernet nodes, respectively, is operative in the second mode.

In another embodiment of each of the above independent inventions the interconnecting is done in at least one of a hierarchical star topology and a hierarchical ring topology.

Independently, the invention provides for a power bus for a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the power bus comprising: at least one pooling controller operative to vary at least one of voltage, output impedance and current of electrical power provided by at least one of the plurality of DC electrical power consuming and providing entities; and DC electrical power interconnections interconnecting the plurality of DC electrical power consuming and providing entities and permitting electrical power flow thereto and therefrom.

Independently, the invention provides for a power bus for a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the power bus comprising: at least one dynamic closed loop pooling controller operative to govern electrical power provided by at least one of the plurality of DC electrical power consuming and providing entities; and electrical power interconnections interconnecting the plurality of DC electrical power consuming and providing entities and permitting electrical power flow thereto and therefrom.

Independently, the invention provides for a DC power backup system comprising a plurality of electrical power consuming entities, each of the electrical power consuming entities including at least one electrical power source receiving AC mains power and at least one electrical power load consuming DC power, the DC power backup system comprising: at least one centralized DC backup power source for backing up the plurality of electrical power consuming entities; a plurality of DC electrical power interconnections interconnecting the plurality of electrical power consuming entities and the at least one DC backup power source; and at least one backup controller operative to control supply of electrical power from the at least one centralized DC backup power source to the plurality of electrical power consuming entities.

Independently, the invention provides for a power bus for a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the power bus comprising: at least one optimization driven pooling controller operative to govern interchange of electrical power between the plurality of DC electrical power consuming and providing entities, providing optimization of at least one of temperature, electrical load and percentage of available power being supplied of the plurality of DC electrical power consuming and providing entities; and electrical power interconnections interconnecting the plurality of DC electrical power consuming and providing entities and permitting electrical power flow thereto and therefrom.

Independently, the invention provides for a power bus for a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the power bus comprising: at least one priority driven pooling controller operative to govern interchange of electrical power between the plurality of DC electrical power consuming and providing entities, operative in accordance with predetermined priorities relating to at least one of temperature, electrical load and percentage of available power being supplied of the plurality of DC electrical power consuming and providing entities; and electrical power interconnections interconnecting the plurality of DC electrical power consuming and providing entities and permitting electrical power flow thereto and therefrom.

Independently, the invention provides for a power bus for a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the power bus comprising: at least one priority driven pooling controller operative to govern interchange of electrical power between the plurality of DC electrical power consuming and providing entities, operative in accordance with predetermined priorities relating to individual ones of the plurality of DC electrical power consuming and providing entities; and electrical power interconnections interconnecting the plurality of DC electrical power consuming and providing entities and permitting electrical power flow thereto and therefrom.

For each of the above independent inventions, in one embodiment the controller receives for at least one of the plurality of DC electrical power consuming and providing entities information relating to DC electrical power needs and DC electrical power providing capabilities. In another embodiment, the power bus further comprises a supply interface unit associated with at least one of the DC electrical power interconnections, the supply interface unit being responsive to an output of the at least one pooling controller to control the electrical power flow. In one further embodiment the supply interface unit comprises at least one adjustable current limiter responsive to an output of the at least one pooling controller, the at least one adjustable current limiter being operative for limiting at least one of the electrical power flow to at least one of the plurality of DC electrical power consuming and providing entities and from at least one of the plurality of DC electrical power consuming and providing entities. In another further embodiment the supply interface unit comprises at least one current sensor, the at least one current sensor being operative for sensing at least one of the electrical power flow to at least one of the plurality of DC electrical power consuming and providing entities and from at least one of the plurality of DC electrical power consuming and providing entities. In a yet further embodiment the supply interface unit comprises a telemetry output operable to communicate with the at least one controller, the telemetry output comprising information regarding at least one of direction and extent of electrical power flow.

For each of the above independent invention, in one embodiment the controller receives temperature information from at least one of the plurality of DC electrical power consuming and providing entities. In one further embodiment the controller is operative at least partially in response to the received temperature information.

In another embodiment the bus further comprises a power supply module interconnected with at least one of the DC electrical power interconnections, the power supply module being operative to supply power to at least one of the plurality of DC electrical power consuming and providing entities when the at least one of the plurality of DC electrical power consuming and providing entities is operative in the second mode. In another embodiment the bus further comprises a power supply module interconnected with at least one of the DC electrical power interconnections, and wherein the power supply module is operative in response to an output of the at least one controller to supply power to at least one of the plurality of DC electrical power consuming and providing entities when the at least one of the plurality of DC electrical power consuming and providing entities is operative in the second mode. In another embodiment the bus further comprises a battery pack module interconnected with at least one of the DC electrical power interconnections, the battery pack module being operative to supply power to at least one of the plurality of DC electrical power consuming and providing entities when the at least one of the plurality of DC electrical power consuming and providing entities is operative in the second mode.

In another embodiment at least one of the DC electrical power interconnections are arranged in one of a hierarchical star topology and a hierarchical ring topology.

In another independent aspect, the invention provides for a method of DC power pooling for a DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, the method comprising:

providing at least one pooling controller; providing a plurality of interconnections for interconnecting the plurality of DC electrical power consuming and providing entities thereby permitting electrical power flow thereto and therefrom; and varying at least one of voltage, output impedance and current of electrical power provided by at least one of the plurality of DC electrical power consuming and providing entities in response to an output of the at least one pooling controller thereby enabling DC power pooling.

Independently, the invention provides for a method of DC power pooling for a system comprising a plurality of DC electrical power consuming and providing entities, each of the plurality of DC electrical power consuming and providing entities having at least a first operative mode in which it may provide more electrical power than it consumes and a second operative mode in which it may consume more electrical power than it provides, the method comprising; providing at least one dynamic closed loop pooling controller; providing interconnections for the plurality of DC electrical power consuming and providing entities thereby permitting electrical power flow thereto and therefrom; and governing electrical power provided by at least one of the plurality of DC electrical power consuming and providing entities in response to an output of the at least one dynamic closed loop pooling controller thereby enabling DC power pooling.

Independently, the invention provides for a method of centralized DC backup for a plurality of DC electrical power consuming entities, each of the plurality of DC electrical power consuming having at least one DC electrical power source receiving AC mains power, the method comprising: providing at least one centralized DC backup power source; providing at least one backup controller; providing interconnections for interconnecting the plurality of DC electrical power consuming entities and the at least one centralized DC backup power source; and supplying DC electrical power from the at least one centralized DC backup power source to at least one of the DC electrical power consuming entities.

Independently, the invention provides for a method of DC power pooling for a system comprising a plurality of DC electrical power consuming and providing entities, each of the plurality of DC electrical power consuming and providing entities having at least a first operative mode in which it may provide more electrical power than it consumes and a second operative mode in which it may consume more electrical power than it provides, the method comprising: providing at least one optimization driven pooling controller; providing interconnections for interconnecting the plurality of DC electrical power consuming and providing entities thereby permitting interchange electrical power thereto and therefrom; and governing the interchange of electrical power in response to an output of the at least one optimization driven pooling controller, providing optimization of at least one of temperature, electrical load and percentage of available power being supplied, thereby enabling DC power pooling.

Independently, the invention provides for a method of DC power pooling for a system comprising a plurality of DC electrical power consuming and providing entities, each of the plurality of DC electrical power consuming and providing entities having at least a first operative mode in which it may provide more electrical power than it consumes and a second operative mode in which it may consume more electrical power than it provides, the method comprising: providing at least one priority driven pooling controller; providing interconnections interconnecting the plurality of DC electrical power consuming and providing entities thereby permitting interchange electrical power thereto and therefrom; and governing the interchange of electrical power in response to an output of the at least one priority driven pooling controller in accordance with predetermined priorities relating to at least one of temperature, electrical load and percentage of available power being supplied of the plurality of DC electrical power consuming and providing entities, thereby enabling DC power pooling.

Independently, the invention provides for a method of DC power pooling for a system comprising providing a plurality of DC electrical power consuming and providing entities, each of the plurality of DC electrical power consuming and providing entities having at least a first operative mode in which it may provide more electrical power than it consumes and a second operative mode in which it may consume more electrical power than it provides, the method comprising: providing at least one priority driven pooling controller; providing interconnections interconnecting the plurality of DC electrical power consuming and providing entities thereby permitting interchange electrical power thereto and therefrom; and governing the interchange of electrical power in response to an output of the at least one priority driven pooling controller in accordance with predetermined priorities relating to individual ones of the plurality of DC electrical power consuming and providing entities, thereby enabling DC power pooling.

In one embodiment of each of the above inventions, the method of DC power pooling further comprises: receiving for each of the plurality of DC electrical power consuming and providing entities information relating to DC electrical power needs and DC electrical power providing capabilities, wherein the varying is accomplished at least partially in response to the received information. In another embodiment the method of DC power pooling further comprises: providing a supply interface unit associated with at least one of the DC electrical power consuming and providing entities; and controlling the electrical power flow in response to the at least one pooling controller. In one further embodiment controlling comprises: limiting at least one of the electrical power flow to at least one of the plurality of DC electrical power consuming and providing entities and from at least one of the plurality of DC electrical power consuming and providing entities. In another further embodiment the method of DC power pooling further comprises: sensing at least one of the electrical power flow to at least one of the plurality of DC electrical power and consuming entities and from at least one of the plurality of DC electrical power and consuming entities. In another further embodiment the method comprises: communicating information relating to at least one of direction and amount of electrical power flow sensed by the sensing to the at least one controller.

In another embodiment, the method of DC power pooling further comprises: sensing a temperature of at least one the plurality of DC electrical power consuming and providing entities; and communicating information relating to the sensed temperature to the at least one controller. In another embodiment, the method of DC power pooling further comprises: providing a power supply module; interconnecting the power supply module with the interconnected plurality of DC electrical power consuming and providing entities; and supplying power from the power supply module to at least one of the plurality of DC electrical power consuming and providing entities, when the at least one of the plurality of DC electrical power consuming and providing entities is operative in the second mode.

In another embodiment the method of DC power pooling further comprises: providing a power supply module; interconnecting the power supply module with the interconnected plurality of DC electrical power consuming and providing entities; and supplying power from the power supply module in response to an output of the at least one controller to at least one of the plurality of DC electrical power consuming and providing entities when the at least one of the plurality of DC electrical power consuming and providing entities is operative in the second mode.

In yet another embodiment the method of DC power pooling further comprises: providing a battery pack module; interconnecting the battery pack module with the interconnected plurality of DC electrical power consuming and providing entities; and supplying power from the battery pack module to at least one of the plurality of DC electrical power consuming and providing entities when the at least one of the plurality of DC electrical power consuming and providing entities is operative in the second mode.

In one embodiment the interconnecting is done in at least one of a hierarchical star topology and a hierarchical ring topology.

Independently, the invention provides for a DC electrical power consuming and providing entity operable for use in a power pooling system, the DC electrical power consuming and providing entity comprising: a DC power source; an electrical load connected to the DC power source; at least one power sharing circuit, operative to vary at least one of voltage, output impedance and current of electrical power provided by the DC power source; and a DC electrical power connection to the DC power source and the electrical load, permitting external DC electrical power flow to and from the DC electrical power consuming and providing entity, wherein the DC electrical power consuming and providing entity has at least a first operative mode in which the DC power source may provide more electrical power than is consumed by the electrical load and a second operative mode in which the electrical load may consume more electrical power than is provided by the DC power source.

Independently, the invention provides for a DC electrical power consuming and providing entity operable for use in a power pooling system, the power pooling system comprising at least one pooling controller of the power pooling system, the DC electrical power consuming and providing entity comprising: a DC power source; an electrical load connected to the DC power source; at least one power sharing circuit responsive to an output of at least one pooling controller of the power pooling system, the power sharing circuit controller being operative to govern electrical power provided by the DC power source; and a DC electrical power connection to the DC power source and the electrical load, permitting external DC electrical power flow to and from the DC electrical power consuming and providing entity, wherein the DC electrical power consuming and providing entity has at least a first operative mode in which the DC power source may provide more electrical power than is consumed by the electrical load and a second operative mode in which the electrical load may consume more electrical power than is provided by the DC power source.

Independently, the invention provides for a DC electrical power consuming and providing entity operable for use with a system having a centralized DC backup power source, the centralized DC backup power source being responsive to a backup controller of the system, the DC electrical power consuming and providing entity comprising: a DC power source receiving AC mains power; a DC electrical load connected to the DC power source; a power sharing circuit operable to variably govern electrical power provided by the DC power source; and a DC electrical power connection permitting external DC electrical power flow from the at least one centralized DC backup power source to the DC electrical load.

Independently, the invention provides for an Ethernet switch node providing power over Ethernet functionality for use in a power pooling system comprising at least one pooling controller, the Ethernet switch node providing power over Ethernet functionality comprising: a DC power source; an electrical load connected to the DC power source; a power sharing circuit responsive to an output of the at least one pooling controller, the power sharing circuit being operative to govern electrical power provided by the DC power source; and a DC electrical power connection to the DC power source and the electrical load, permitting external DC electrical power flow to and from the DC electrical power consuming and providing entity, wherein the Ethernet switch node providing power over Ethernet functionality has at least a first operative mode in which the DC power source may provide more electrical power than is consumed by the electrical load and a second operative mode in which the electrical load may consume more electrical power than is provided by the DC power source.

In one embodiment of each of the above independent inventions, wherein the DC power source receives AC mains power and converts the AC mains power to DC electrical power. In another embodiment the DC electrical power consuming and providing entity, or Ethernet switch node, respectively, further comprises at least one power sharing circuit controller associated with at least one of the at least one power sharing circuit, the at least one power sharing circuit being responsive to an output of the at least one of the at least one power sharing circuit controller to vary the at least one of voltage, output impedance and current of electrical power provided by the DC power source. In another embodiment the DC power source comprises a power supply controller, and wherein the at least one power sharing circuit is operable to modify the operation of the power supply controller.

In one embodiment the at least one power sharing circuit is operable by at least one pooling controller of the power pooling system. In another embodiment the at least one power sharing circuit is operable to transmit to a pooling controller of the power pooling system information relating to DC electrical power needs and DC electrical power providing capabilities of the DC electrical power consuming and providing entity. In yet another embodiment the at least one power sharing circuit is operable to transmit to a pooling controller of the power pooling system information relating to at least one of power needs of the at least one electrical load and power providing capabilities of the at least one DC power source. In another embodiment the at least one power sharing circuit has an associated temperature sensor having a temperature indicating output, the at least one power sharing circuit being operable to communicate information regarding the temperature indicating output to at least one pooling controller of the power pooling system.

In one embodiment the DC electrical power consuming and providing entity, or Ethernet switch node, respectively, further comprises a temperature sensor having a temperature indicating output. In one embodiment the DC electrical power consuming and providing entity comprises at least one of a modem, a switch, a switch providing power over Ethernet and operating in accordance with the IEEE 802.3af standard, an Internet Protocol telephone, a computer, a server, a camera, an access controller, a smoke sensor, a wireless access point and a battery pack module. In one embodiment the Ethernet switch node operates in accordance with the IEEE 802.3af standard.

In one embodiment the DC electrical power consuming and providing entity, or Ethernet switch node, respectively, further comprises an overcurrent protection circuit associated with the DC electrical power connection. In a further embodiment the overcurrent protection circuit comprises at least one of a fuse and a circuit breaker operative to prevent excess electrical power flow.

Independently, the invention provides for a method of DC power pooling for a DC electrical power consuming and providing entity in a power pooling system comprising at least one pooling controller, the method comprising: providing a DC power source; providing an electrical load associated with the DC power source; connecting the DC power source to the electrical load; varying at least one of voltage, output impedance and current of electrical power provided by the DC power source; and providing a DC electrical power connection to the DC power source and the electrical load, thereby permitting external DC electrical power flow to and from the DC electrical power consuming and providing entity, wherein the DC electrical power consuming and providing entity has at least a first operative mode in which it may provide more electrical power than it consumes and a second operative mode in which it may consume more electrical power than it provides.

Independently, the invention provides for a method of DC power pooling for a DC electrical power consuming and providing entity in a power pooling system, the power pooling system having at least one pooling controller of the power pooling system, the method comprising: providing a DC power source; providing an electrical load associated with the DC power source; connecting the DC power source to the electrical load; governing electrical power provided by the DC power source; and providing a DC electrical power connection to the DC power source and the electrical load, thereby permitting external DC electrical power flow to and from the DC electrical power consuming and providing entity, wherein the DC electrical power consuming and providing entity has at least a first operative mode in which it may provide more electrical power than it consumes and a second operative mode in which it may consume more electrical power than it provides.

Independently, the invention provides for a method of centralized DC power backup for a DC electrical power consuming and providing entity in a system comprising a backup controller and a centralized DC backup power source responsive to the backup controller, the method comprising: providing a DC power source; providing an electrical load associated with the DC power source; connecting the DC power source to the electrical load; variably governing electrical power provided by the DC power source; and providing an external DC electrical power connection to the electrical load, thereby permitting external DC electrical power flow from a centralized DC backup power source to the electrical load.

Independently, the invention provides for a method of DC power pooling for an Ethernet switch node having power over Ethernet functionality in a power pooling system comprising at least one pooling controller, the method comprising: providing a DC power source; providing an electrical load associated with the DC power source; connecting the DC power source to the electrical load; governing the electrical power provided by the DC power source; and providing a DC electrical power connection to the DC power source and the electrical load, thereby permitting external DC electrical power flow to and from the DC electrical power consuming and providing entity, wherein the Ethernet switch node having power over Ethernet functionality has at least a first operative mode in which it may provide more electrical power than it consumes and a second operative mode in which it may consume more electrical power than it provides.

In one embodiment of each of the above independent inventions, the method further comprises: receiving AC mains power at each of the plurality of DC electrical power consuming and providing entities, or Ethernet switch nodes, respectively; converting the AC mains power to DC power; and providing the DC power to the electrical load. In another embodiment the method further comprises:

providing at least one power sharing circuit associated with the DC power source, and wherein the varying is accomplished by the at least one power sharing circuit. In yet another embodiment the at least one DC electrical power source comprises a power supply controller, and wherein the varying is accomplished by modifying the operation of the power supply controller.

In one embodiment the method further comprises: transmitting to at least one pooling controller of the power pooling system information relating to DC electrical power needs and DC electrical power providing capabilities. In another embodiment the method further comprises: transmitting to at least one pooling controller of the power pooling system information relating to power needs of the electrical load and power providing capabilities of the DC power source.

In one embodiment, the method further comprises: sensing a temperature of the DC electrical power consuming and providing entity, or Ethernet switch node, respectively; and communicating information relating to the sensed temperature to at least one pooling controller of the power pooling system. In another embodiment the method further comprises: sensing a temperature of the DC power source; and communicating information relating to the sensed temperature to at least one pooling controller, or backup controller, respectively of the power pooling system.

In another embodiment the method of DC power pooling further comprises: communicating information relating to percentage of available power being supplied of the DC power source to at least one pooling controller of the power pooling system.

In one embodiment at least one of the DC electrical power consuming and providing entity comprises at least one of a modem, a switch, a switch providing power over Ethernet and operating in accordance with IEEE 802.3af Standard, an Internet Protocol telephone, a computer, a server, a camera, an access controller, a smoke sensor, a wireless access point and a battery pack module.

In another embodiment the method further comprises: protecting the DC electrical consuming and providing entity against excess power flow.

Independently, the invention provides for a system having a power pooling power arrangement among and between a plurality of nodes, comprising: a power bus; a pooling controller; a plurality of nodes, each node having a DC power source and an electrical load, each of the plurality of nodes having an individual address, being addressable by the pooling controller, and each of the plurality of nodes being further assigned to at least one group of the plurality of nodes, the at least one group of the plurality of nodes being addressable by the pooling controller by at least one group address, whereby each of the plurality of nodes may be addressed by the pooling controller individually and alternatively as part of the at least one group address, and wherein each of the nodes having a plurality of operating modes the modes being assigned by the pooling controller.

In one embodiment the at least one group address is operable to set the plurality of nodes assigned to the at least one group address to one of the plurality of operating modes. In one further embodiment the one of the plurality of operating modes comprises a reduced power need of the electrical load of the plurality of nodes assigned to the at least one group address. In another further embodiment the one of the plurality of operating modes comprises an increased output of the DC power source of the plurality of nodes assigned to the at least one group address.

In one embodiment each of the plurality of nodes is operable to notify the pooling controller of a failure of the DC power source of the node. In one further embodiment the failure mode comprises a rise in temperature above a predetermined level. In a still further embodiment the pooling controller addresses the plurality of nodes as a group address in response to the high temperature notification. In another further embodiment the pooling controller addresses the plurality of nodes as a group address in response to the failure notification. In a still further embodiment the plurality of nodes enters at least one of a reduced load power need mode and an increased power output mode in response to the group address. In another further embodiment the plurality of nodes enters at least one of a reduced load power need mode and an increased power output mode in response to the group address.

Independently, the invention provides for a method of power pooling power among and between a plurality of nodes, comprising: providing a pooling controller; providing a plurality of nodes, each node having a DC power source and an electrical load; assigning an individual address to each of the plurality of nodes; assigning at least one group address to a plurality of nodes, each of the nodes being addressable alternatively by the assigned individual address and the assigned at least one group address; operating at least one of the nodes in at least one of a plurality of operating modes, the operating modes being assigned by the pooling controller utilizing at least one of the individual address and the at least one group address.

In one embodiment the operating at least one node comprises: operating a plurality of nodes in a pre-assigned operating mode in response to the pooling controller utilizing the group address. In one further embodiment the operating a plurality of nodes in pre-assigned operating mode comprises: reducing the power need of the electrical load of the node. In another further embodiment the operating a plurality of nodes in a pre-assigned operating mode comprises: increasing the output of the DC power source.

In another embodiment the method further comprises notifying the pooling controller of a failure mode of a DC power source of at least one of the plurality of nodes. In one further embodiment the failure mode comprises a rise in temperature above a predetermined level. In another further embodiment the operating at least one node comprises: operating a plurality of nodes in at least one pre-assigned operating mode in response to the pooling controller utilizing the group address in response to the failure notification. In another further embodiment the operating at least one node comprises: operating a plurality of nodes in at least one pre-assigned operating mode in response to the pooling controller utilizing the group address in response to the failure notification. In another further embodiment the pre-assigned operating node comprises at least one of a reduced load power need mode and an increased power output mode in response to the group address. In yet another further embodiment the pre-assigned operating mode comprises at least one of a reduced load power need mode and an increased power output mode in response to the group address.

Independently, the invention provides for a DC power supply for use in a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, and at least one pooling controller, the DC power supply comprising: at least one DC electrical power source; and at least one power sharing circuit being responsive to an output of at least one pooling controller of the DC power pooling system to vary at least one of voltage, output impedance and current of electrical power provided by the at least one DC electrical power source.

In one embodiment the at least one DC electrical power source comprises a converter, operable to convert AC mains power to DC electrical power. In another embodiment the at least one DC electrical power source comprises a power source controller, and wherein the at least one power sharing circuit is operable to modify the operation of the power supply controller. In yet another embodiment the at least one power sharing circuit is operable to change the voltage to current relationship of the at least one DC electrical power source.

In one embodiment the at least one power sharing circuit is operable to change the voltage to current relationship of the at least one DC electrical power source, thereby affecting the Droop parameters of the at least one DC electrical power source. In another embodiment the at least one power sharing circuit is internal to at least one of the at least one DC electrical power source. In yet another embodiment the at least one power sharing circuit is external to at least one of the at least one DC electrical power source.

In one embodiment the DC power supply further comprises a power sharing circuit controller, the power sharing circuit controller being operable to communicate with at least one pooling controller of the DC power pooling system. In a further embodiment the controller is external to the at least one power sharing circuit. In another embodiment the at least one power sharing circuit further comprises a current share bus, the at least one power sharing circuit being further responsive to the power share bus to vary the at least one of voltage, output impedance and current of electrical power provided by the at least one DC electrical power source.

Independently, the invention provides for a method of DC power pooling for use in a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, and at least one pooling controller, the method of DC power pooling comprising: supplying at least one DC electrical power source; and varying at least one of voltage, output impedance and current of electrical power provided by the at least one DC electrical power source in response to the an output of at least one pooling controller of the DC power pooling system.

In one embodiment the supplying at least one DC electrical power source comprises: receiving AC mains power; and converting the AC mains power to DC electrical power. In another embodiment the varying comprises: modifying the operation of a power supply controller of the at least one DC electrical power source. In yet another embodiment the varying comprises: changing the voltage to current relationship of the at least one DC electrical power source.

In one embodiment the varying comprises: changing the voltage to current relationship of the at least one DC electrical power source, thereby affecting the Droop parameters of the at least one DC electrical power source. In another embodiment the varying is accomplished by a power sharing circuit internal to at least one of the at least one DC electrical power source. In yet another embodiment the varying is accomplished by a power sharing circuit external to at least one of the at least one DC electrical power source.

In one embodiment the method of DC power pooling further comprises: communicating at least one of temperature information, percentage of available power being supplied, output current and voltage output of at least one of the at least one DC electrical power source to at least one pooling controller of the DC power pooling system. In a further embodiment the communicating is accomplished by a controller external to the at least one of the at least one DC electrical power source. In another embodiment the method of DC power pooling further comprises: providing a current share bus connected to at least one of the at least one DC electrical power source; and varying at least one of voltage, output impedance and current of electrical power provided by the at least one DC electrical power source in response to the current share bus.

Independently, the invention provides for a supply interface unit for use in a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, and at least one pooling controller, the supply interface unit comprising: a first port and a second port; a controller; at least one controllable switch, operable by the controller to enable current flow from one of the first port to the second port and the second port to the first port; and at least one current limiter, operable by the controller to limit the current flow.

In one embodiment the supply interface unit further comprises a current sensor, the current sensor sensing at least one of amount and direction of the current flow. In a further embodiment the controller communicates information relating to the sensed at least one of amount and direction of the current flow to the at least one pooling controller. In another embodiment the supply interface unit further comprising a voltage sensor. In a further embodiment the controller communicates information regarding the output of the voltage sensor to the at least one pooling controller.

In one embodiment the controller is operable to be in data communication with the at least one pooling controller. In another embodiment the controller is operable by at least one pooling controller to control at least one of current direction and amount of the current flow. In another embodiment of the supply interface unit, the current limiter is an adjustable current limiter. In a further embodiment the adjustable current limiter is operable by the controller in response to the at least one pooling controller to limit the current flow to a specified amount, the specified amount being supplied by the at least one pooling controller to the controller. In another embodiment the supply interface unit further comprises overcurrent protection, the overcurrent protection comprising at least one of a fuse and a circuit breaker.

Independently, the invention provides for a method of directing and controlling current flow in a DC power pooling system, the DC power pooling system comprising a plurality of DC electrical power consuming and providing entities, each of the DC electrical power consuming and providing entities having at least a first operative mode in which it may provide more electrical power than it consumes and a second operative mode in which it may consume more electrical power than it provides, and at least one pooling controller, the method of directing and controlling current flow comprising: supplying a first port and a second port; switching the direction of current flow alternatively to one of the first port to the second port and the second port to the first port; and limiting the current flow.

In one embodiment the method of directing and controlling current flow further comprises: sensing at least one of amount and direction of the current flow. In a further embodiment the method of directing and controlling current flow further comprises: communicating information regarding the sensed at least one of amount and direction of the current flow to the at least one pooling controller.

In one embodiment the method of directing and controlling current flow further comprises: sensing the voltage of at least one of the first port and the second port. In a further embodiment the method of directing and controlling current flow further comprises: communicating information regarding the sensed voltage to the at least one pooling controller.

In one embodiment the switching is accomplished in response to an output of the at least one pooling controller. In another embodiment the limiting is accomplished in response to an output of the at least one pooling controller. In another embodiment the limiting comprises: adjustably limiting the current flow. In yet another embodiment the limiting comprises: adjustably limiting the current flow to a specified amount in response to an output of the at least one pooling controller, the output of the at least one pooling controller comprising information regarding the specified amount. In another embodiment the method of directing and controlling current flow further comprises: protecting against excess current flow.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings, in which like numerals designate corresponding elements or sections throughout, and in which:

FIG. 11 is a simplified pictorial illustration of a system constructed and operative in accordance with a preferred embodiment of the present invention;

FIG. 13a is a simplified pictorial illustration of a system constructed and operative in accordance with yet another preferred embodiment of the present invention;

FIG. 13b is a simplified pictorial illustration of a system constructed and operative in accordance with yet another preferred embodiment of the present invention;

FIG. 16 is a simplified pictorial illustration of a multiple rack mounted system constructed and operative in accordance with still another preferred embodiment of the present invention;

FIG. 17 is a simplified block diagram illustration of a system constructed and operative in accordance with an embodiment of the present invention;

FIGS. 18A and 18B are simplified block diagram illustrations of two alternative embodiments of a system of the type shown in FIG. 17 constructed and operative in a ring topology and providing power distribution;

FIGS. 20A and 20B are simplified block diagram illustrations of two alternative embodiments of a system of the type shown in FIG. 17 constructed and operative respectively in ring and star topologies and providing power distribution and data communication;

FIGS. 26A, 26B and 26C are illustrations of voltage/current relationships useful in understanding the operation of the circuitry of FIGS. 25A–25C;

DETAILED DESCRIPTION OF PREFERRED EMBODIMENTS

Figure 1:
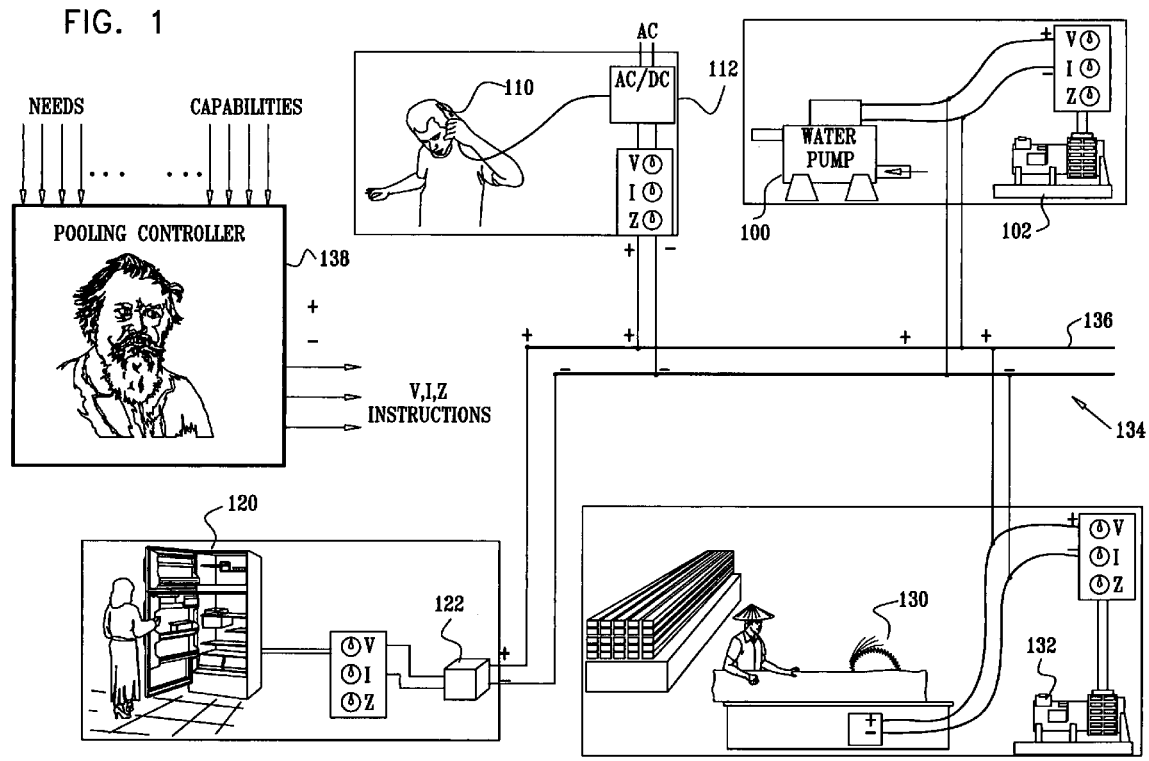
FIG. 1 is a simplified symbolic illustration of a DC power pooling system constructed and operative in accordance with a preferred embodiment of the present invention.

The present embodiments enable a system of power pooling among and between entities having at least a first mode in which the entity provides more DC electrical power than it consumes and a second mode in which the entity consumes more DC electrical power than it provides, the power pooling system being operative to function under at least one pooling controller.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified symbolic illustration of a DC power pooling system constructed and operative in accordance with a preferred embodiment of the present invention. As seen in FIG. 1, there is provided a DC power pooling system including a plurality of DC electrical power consuming and providing entities, here shown as disparate operating assemblies, such as a water pump 100 operated by a DC electrical generator 102, a shaver 110 operated by an AC/DC wall socket converter 112 connected to AC mains power; a DC refrigerator 120 operated by a DC battery assembly 122 and a DC motor operated sawmill 130 operated by a DC generator 132. It is appreciated that each of the plurality of DC electrical power consuming and providing entities 100 & 102, 110 & 112, 120 & 122 and 130 & 132 has at least a first operative mode in which it may provide more electrical power than it consumes and a second operative mode in which it may consume more electrical power than it provides.

DC electrical power interconnections, here designated collectively by reference numeral 134, interconnect the plurality of DC electrical power consuming and providing entities, permitting electrical power flow thereto and therefrom. The DC electrical power interconnections may include a DC bus 136.

At least one pooling controller 138 is operative to vary at least one of voltage, output impedance and current of electrical power provided by one or more of the plurality of DC electrical power consuming and providing entities.

The controller 138 receives from the entities which it controls information as to the capabilities and needs of each entity. In practical terms, the capability of each entity is its DC power providing capability and the needs of each entity are its DC power needs. Thus, for the entity including the water pump 100 and the generator 102, the capability is the maximum KW output of the generator 102 and the needs are KW power currently needed by the pump. For the entity including the shaver 110 and the AC/DC wall socket, the capability is the maximum wattage output of the wall socket and the needs are power currently needed by the shaver. Alternatively, controller 138 may receive from the entities which it controls at least two datum selected from among the group consisting of the current DC electrical power consuming needs, the current DC electrical power providing abilities and the current DC excess providing ability or shortfall.

The controller 138, based on predetermined or programmable criteria, governs in real time the electrical power supplied by each of the electrical power sources in each of the entities controlled by the controller. Power that is supplied by an electrical power source of an entity which does not need all of the power, is provided to one or more entities that do need the power. Thus it is appreciated that the controller 138 effects power pooling of the power supply resources of the entities which it controls and allocates the pooled power among those entities.

The system of the present invention, as exemplified in FIG. 1 employs communication between one or more controller and plural entities controlled thereby to provide the controller with current data regarding both the needs and the capabilities of the controlled entities and to provide control instructions to the power sources of such entities. These control instructions, which may be provided along the power connections or along dedicated communication lines or other paths may vary one or more of voltage V, output impedance Z and current I of electrical power provided by the various DC power sources.

Figure 2:
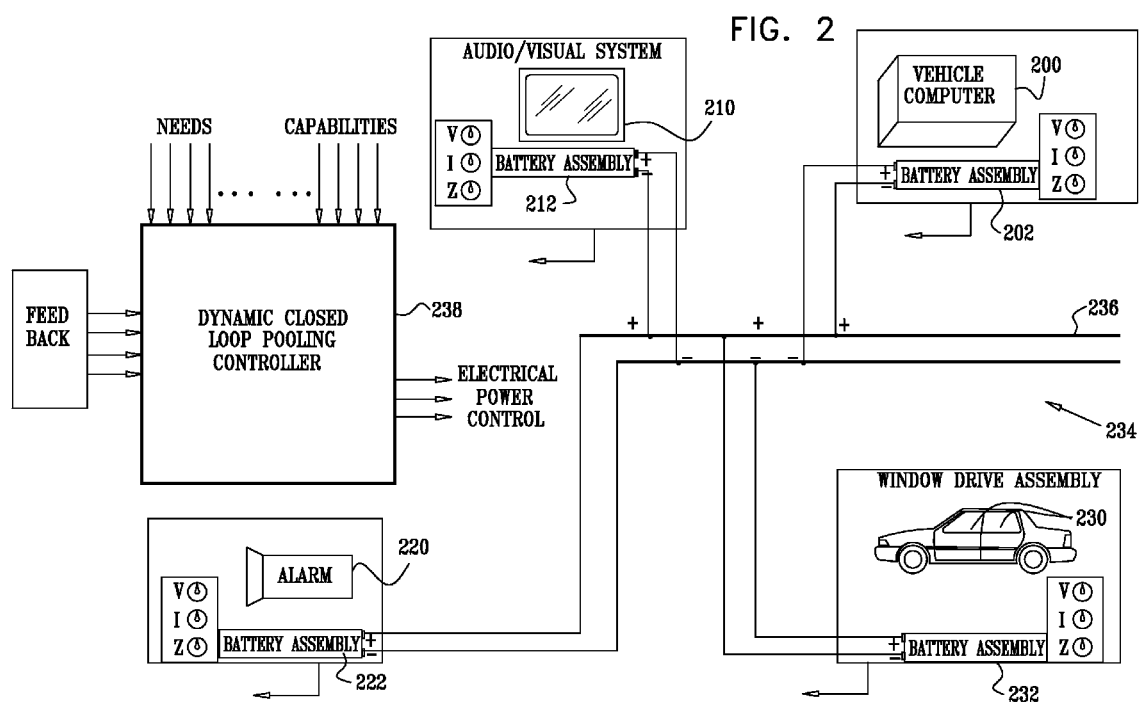
FIG. 2 is a simplified symbolic illustration of a DC power pooling system constructed and operative in accordance with a preferred embodiment of the present invention and employing a dynamic closed loop controller.

Reference is now made to FIG. 2, which is a simplified symbolic illustration of a DC power pooling system constructed and operative in accordance with another preferred embodiment of the present invention. As seen in FIG. 2, there is provided a DC power pooling system including a plurality of DC electrical power consuming and providing entities, here shown as disparate operating assemblies of a somewhat imaginary motor vehicle, such as a vehicle computer 200 associated with a backup battery assembly 202, a vehicle audio/visual system 210 associated with a backup battery assembly 212; a vehicle alarm 220 associated with a backup battery assembly 222 and a power window drive assembly 230 associated with a backup battery assembly 232. It is appreciated that each of the plurality of DC electrical power consuming and providing entities 200 & 202, 210 & 212, 220 & 222 and 230 & 232 has at least a first operative mode in which it may provide more electrical power than it consumes and a second operative mode in which it may consume more electrical power than it provides.

DC electrical power interconnections, here designated collectively by reference numeral 234, interconnect the plurality of DC electrical power consuming and providing entities and permitting electrical power flow thereto and therefrom. The DC electrical power interconnections may include a DC bus 236.

At least one dynamic closed loop pooling controller 238 is operative to vary at least one of voltage, output impedance and current of electrical power provided by one or more of the plurality of DC electrical power consuming and providing entities.

The dynamic closed loop pooling controller 238 receives from the entities which it controls information at least as to the initial capabilities and needs of each entity. Additionally controller 238 receives real time feedback information as to the performance of the various entities. This feedback may be in one or more of many possible forms and preferably reflects actual power consumption by each of the controlled entities. A preferred metric of feedback is current consumption by each of the entities. Another preferred metric is the temperature of the entities.

In practical terms, the capability of each entity is its DC power providing capability and the needs of each entity are its DC power needs. Thus, for the entity including the vehicle computer 200 and the backup battery assembly 202, the capability is the maximum wattage output of the backup battery assembly 202 and the needs are wattage currently needed by the computer. For the entity including power window drive assembly 230 and backup battery assembly 232, the capability is the maximum wattage of the backup battery assembly 232 and the needs are power currently needed by the power window drive assembly 230.

Typical feedback supplied to controller 238 from power window drive assembly 230 is the current draw, which varies greatly depending on whether the window drives are operated and whether the windows are being opened or closed.

The controller 238, based on predetermined or programmable criteria, and based on the real time feedback received thereby from the various entities, governs in real time the electrical power supplied by each of the electrical power sources in each of the entities controlled by the controller. Power that is supplied by an electrical power source of an entity which does not need all of the power, is provided to one or more entities that do need the power. Thus it is appreciated that the controller 238 effects power pooling of the power supply resources of the entities which it controls, and allocates the pooled power among those entities.

The system of the present invention, as exemplified in FIG. 2 employs communication between one or more controller and plural entities controlled thereby to provide the controller with current feedback data regarding both the current needs and the capabilities of the controlled entities and their performance and to provide control instructions to the power sources of such entities. These control instructions, which may be provided along the power connections or along dedicated communication lines or other paths govern electrical power provided by at least one of the DC electrical power consuming and providing entities.

Figure 3:
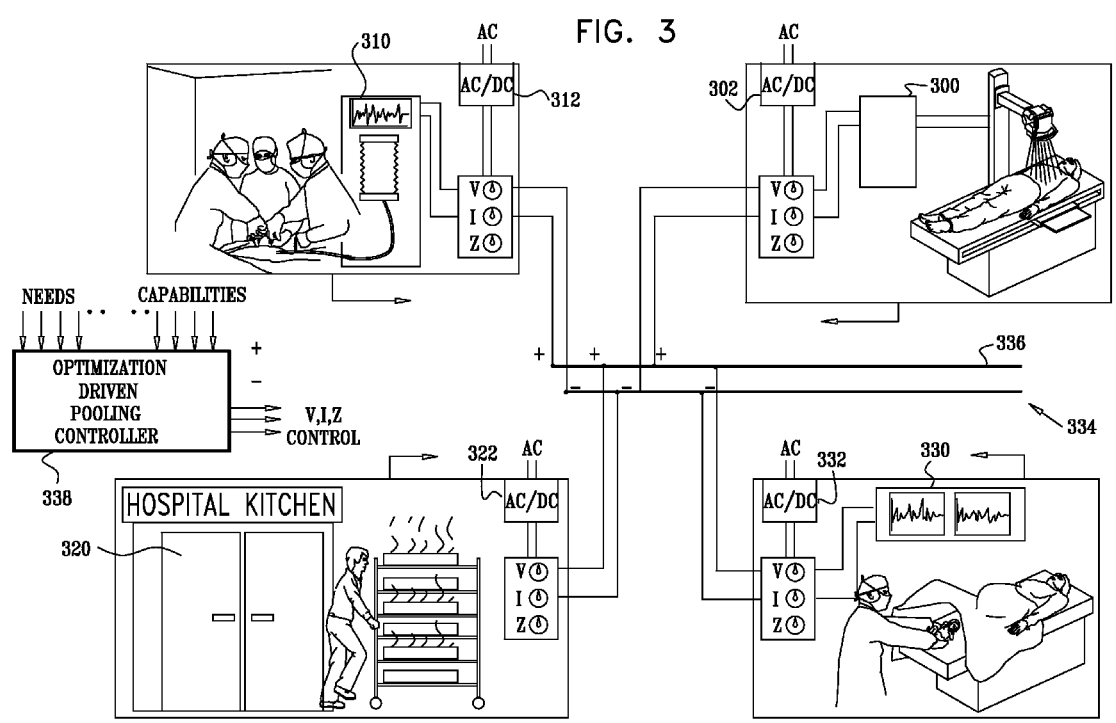
FIG. 3 is a simplified symbolic illustration of a DC power pooling system constructed and operative in accordance with a preferred embodiment of the present invention and employing an optimization drive pooling controller.

Reference is now made to FIG. 3, which is a simplified symbolic illustration of a DC power pooling system constructed and operative in accordance with another preferred embodiment of the present invention. As seen in FIG. 3, there is provided a DC power pooling system including a plurality of DC electrical power consuming and providing entities, here shown as disparate functional equipment located in disparate rooms of a hospital, such as x-ray diagnostic equipment 300 powered by an AC mains supplied AC/DC power rectifier 302, operating room equipment 310 powered by an AC mains supplied AC/DC power rectifier 312; hospital kitchen equipment 320 powered by an AC mains supplied AC/DC power rectifier 322 and birthing room equipment 330 powered by an AC mains supplied AC/DC power rectifier 332. It is appreciated that each of the plurality of DC electrical power consuming and providing entities 300 & 302, 310 & 312, 320 & 322 and 330 & 332 has at least a first operative mode in which it may provide more electrical power than it consumes and a second operative mode in which it may consume more electrical power than it provides.

DC electrical power interconnections, here designated collectively by reference numeral 334, interconnect the plurality of DC electrical power consuming and providing entities and permitting electrical power flow thereto and therefrom. The DC electrical power interconnections may include a DC bus 336.

At least one optimization driven pooling controller 338 is operative to vary at least one of voltage, output impedance and current of electrical power provided by one or more of the plurality of DC electrical power consuming and providing entities.

The optimization driven pooling controller 338 receives from the entities which it controls information at least as to the initial capabilities and needs of each entity. Additionally controller 338 receives real time feedback information as to the performance and utilization of the various entities. This feedback may be in one or more of many possible forms and preferably reflects actual power consumption by each of the controlled entities. A preferred metric of feedback is current consumption by each of the entities. A second preferred metric of feedback is percentage of utilization.

In practical terms, the capability of each entity is its DC power providing capability and the needs of each entity are its DC power needs. Thus, for the entity including the x-ray diagnostic equipment 300 and AC mains supplied AD/DC power rectifier 302, the capability is the maximum wattage output of the AC mains supplied AD/DC power rectifier 302 and the needs are wattage currently needed by the x-ray diagnostic equipment 300.

The controller 338, based on predetermined or programmable criteria, and based on the real time feedback received thereby from the various entities, governs in real time the electrical power supplied by each of the electrical power sources in each of the entities controlled by the controller. Power that is supplied by an electrical power source of an entity which does not need all of the power, is provided to one or more entities that do need the power based on predetermined or programmable priority. It is appreciated that birthing room equipment 330 is of a higher priority than hospital kitchen equipment 320, which can accept a power outage for a short period of time. Furthermore, a demand for birthing room equipment 330 can not be delayed, and thus has a higher priority than x-ray diagnostic equipment 300. The priority of operating room equipment 310 varies in time, being of high priority during an actual operation, and being of lower priority when the operating room is not utilized. The use of x-ray diagnostic equipment 300 is typically a revenue enhancing service, and therefore optimization of its use, at or near its maximum capacity is desirable by proper scheduling of both the use of, and power delivery to, each of entities 300 & 302, 310 & 312, 320 & 322 and 330 & 332. Thus it is appreciated that the controller 338 effects optimization driven power pooling of the power supply resources of the entities which it controls and allocates the pooled power among those entities. Furthermore, controller 338 optimizes use of the hospital equipment by scheduling the use of each of entities 300 & 302, 310 & 312, 320 & 322 and 330 & 332.

The system of the present invention, as exemplified in FIG. 3 employs communication between one or more controller and plural entities controlled thereby to provide the controller with current feedback data regarding both the current needs and the capabilities of the controlled entities and their performance and to provide control instructions to the power sources of such entities. These control instructions, which may be provided along the power connections or along dedicated communication lines or other paths govern interchange of electrical power between the plurality of DC electrical consuming and providing entities, and provide optimization of at least one of temperature, electrical load and percentage of available power being supplied of the plurality of DC electrical consuming and providing entities.

Figure 4:
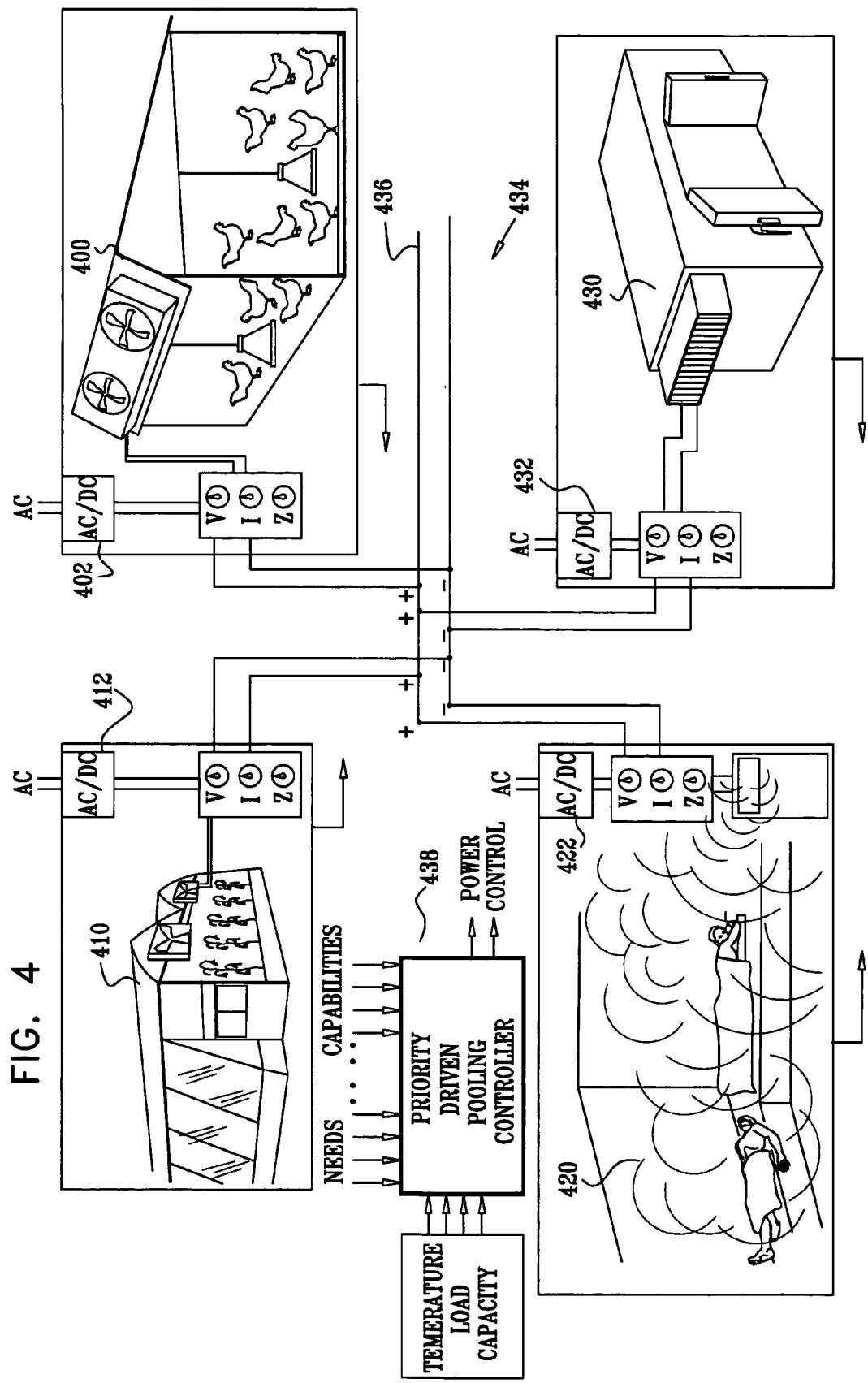
FIG. 4 is a simplified symbolic illustration of a DC power pooling system constructed and operative in accordance with another preferred embodiment of the present invention and employing a priority driven pooling controller operative in accordance with predetermined priorities.

Reference is now made to FIG. 4, which is a simplified symbolic illustration of a DC power pooling system constructed and operative in accordance with another preferred embodiment of the present invention. As seen in FIG. 4, there is provided a DC power pooling system including a plurality of DC electrical power consuming and providing entities, here shown as disparate functional heating, cooling or ventilation consumers, such as chicken coop ventilators 400 powered by an AC mains supplied AC/DC power rectifier 402, hot house ventilators 410 powered by an AC mains supplied AC/DC power rectifier 412; sauna room equipment 420 powered by an AC mains supplied AC/DC power rectifier 422 and industrial refrigerator 430 powered by an AC mains supplied AC/DC power rectifier 432. It is appreciated that each of the plurality of DC electrical power consuming and providing entities 400 & 402, 410 & 412, 420 & 422 and 430 & 432 has at least a first operative mode in which it may provide more electrical power than it consumes and a second operative mode in which it may consume more electrical power than it provides.

DC electrical power interconnections, here designated collectively by reference numeral 434, interconnect the plurality of DC electrical power consuming and providing entities and permitting electrical power flow thereto and therefrom. The DC electrical power interconnections may include a DC bus 436.

At least one priority driven pooling controller 438 is operative in accordance with predetermined priorities relating to at least one of temperature, electrical load and percentage of available power being supplied of the plurality of DC electrical power consuming and providing entities to vary at least one of voltage, output impedance and current of electrical power provided by one or more of the plurality of DC electrical power consuming and providing entities.

The priority driven pooling controller 438 receives from the entities which it controls information at least as to the initial capabilities and needs of each entity. Additionally priority driven pooling controller 438 receives real time feedback information as to the performance and utilization of the various entities. This feedback may be in one or more of many possible forms and preferably reflects at least one of temperature, electrical load and percentage of available power being supplied by each of the controlled entities.

In practical terms, the capability of each entity is its DC power providing capability and the needs of each entity are its DC power needs. Thus, for the entity including the chicken coop ventilating equipment 400 and AC mains supplied AD/DC power rectifier 402, the capability is the maximum wattage output of the AC mains supplied AD/DC power rectifier 402 and the needs are wattage currently needed by the chicken coop ventilating equipment 400. Similarly, for the entity including the industrial refrigerator 430 and AC mains supplied AD/DC power rectifier 432, the capability is the maximum wattage output of the AC mains supplied AD/DC power rectifier 432 and the needs are wattage currently needed by industrial refrigerator 430.

The priority driven pooling controller 438, based on predetermined or programmable criteria, and based on the real time feedback received thereby from the various entities, governs in real time the electrical power supplied by each of the electrical power sources in each of the entities controlled by the controller. Power that is supplied by an electrical power source of an entity which does not need all of the power, is provided to one or more entities that do need the power based on predetermined or programmable priority. It is appreciated that chicken coop ventilating equipment 400 is of a higher priority than industrial refrigerator 430, since industrial refrigerator 430 can accept a power outage for a short period of time. Any rise in the temperature of chicken coop 400 will quickly result in a negative outcome for chickens raised in chicken coop 400. Similarly, the priority of hothouse ventilators 410 is greater than industrial refrigerator 430, but is lower than the priority of sauna room equipment 420, since the users of sauna room equipment 420 are relatively sensitive to temperature changes. Thus it is appreciated that the priority driven pooling controller 438 effects power pooling of the power supply resources of each of entities 400 & 402, 410 & 412, 420 & 422 and 430 & 432 which it controls and allocates the pooled power among those entities, with priority being allocated according to predetermined priorities relating to at least one of temperature, electrical load and percentage of available power being supplied.

The system of the present invention, as exemplified in FIG. 4 employs communication between one or more controller and plural entities controlled thereby to provide the controller with current feedback data regarding both the current needs and the capabilities of the controlled entities and their performance, particularly as it involves temperature of the entities, and to provide control instructions to the power sources of such entities. These control instructions, which may be provided along the power connections or along dedicated communication lines or other paths govern interchange of electrical power between the plurality of DC electrical consuming and providing entities, operative in accordance with predetermined priorities relating to at least one of temperature, electrical load and percentage of available power being supplied of the plurality of DC electrical consuming and providing entities.

Figure 5:
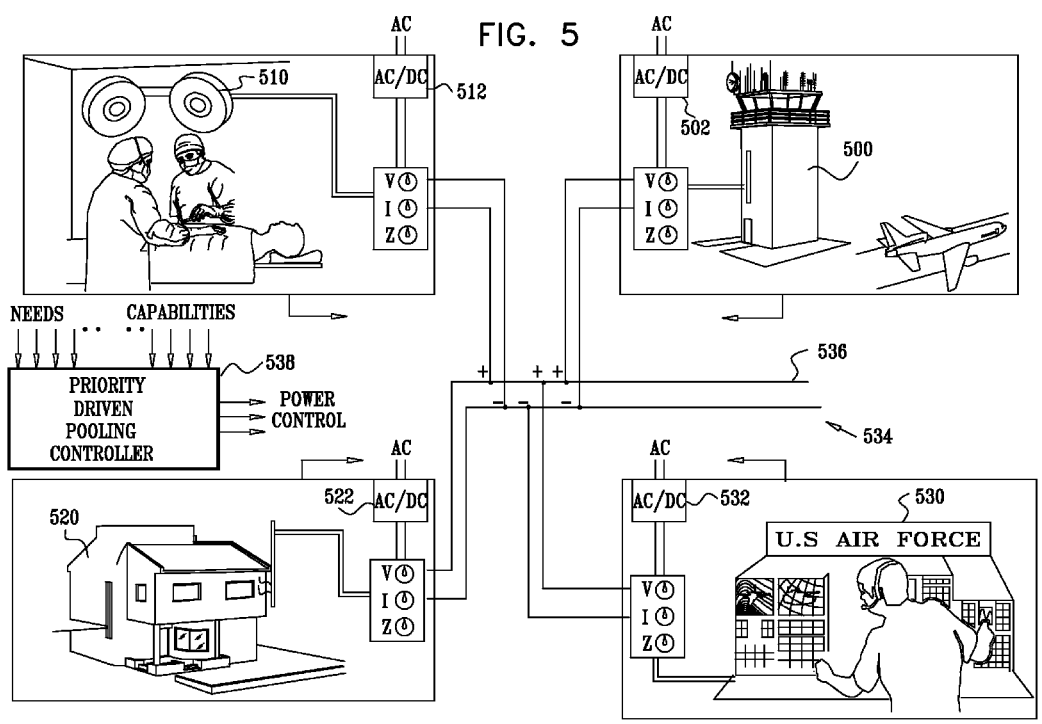
FIG. 5 is a simplified symbolic illustration of a DC power pooling system constructed and operative in accordance with another preferred embodiment of the present invention and employing a priority driven pooling controller operative in accordance with priorities relating to individual ones of connected entities.

Reference is now made to FIG. 5, which is a simplified symbolic illustration of a DC power pooling system constructed and operative in accordance with another preferred embodiment of the present invention. As seen in FIG. 5, there is provided a DC power pooling system including a plurality of DC electrical power consuming and providing entities, here shown as disparate functional equipment, such as an airport control tower 500 powered by an AC mains supplied AC/DC power rectifier 502, operating room equipment 510 powered by an AC mains supplied AC/DC power rectifier 512; individual household equipment 520 powered by an AC mains supplied AC/DC power rectifier 522 and military radar equipment 530 powered by an AC mains supplied AC/DC power rectifier 532. It is appreciated that each of the plurality of DC electrical power consuming and providing entities 500 & 502, 510 & 512, 520 & 522 and 530 & 532 has at least a first operative mode in which it may provide more electrical power than it consumes and a second operative mode in which it may consume more electrical power than it provides.

DC electrical power interconnections, here designated collectively by reference numeral 534, interconnect the plurality of DC electrical power consuming and providing entities and permitting electrical power flow thereto and therefrom. The DC electrical power interconnections may include a DC bus 536.

At least one priority driven controller 538 is operative to vary at least one of voltage, output impedance and current of electrical power provided by one or more of the plurality of DC electrical power consuming and providing entities in accordance with predetermined priorities relating to individual ones of the plurality of DC electrical power consuming and providing entities.

The priority driven pooling controller 538 receives from the entities which it controls information at least as to the initial capabilities and needs of each entity. Additionally controller 538 receives real time feedback information as to the performance and utilization of the various entities. This feedback may be in one or more of many possible forms and preferably reflects actual power consumption by each of the controlled entities. A preferred metric of feedback is current consumption by each of the entities. Another preferred metric of feedback is the current priority level requested by each of the entities.

In practical terms, the capability of each entity is its DC power providing capability and the needs of each entity are its DC power needs. Thus, for the entity including the control tower 500 and AC mains supplied AD/DC power rectifier 502, the capability is the maximum wattage output of the AC mains supplied AD/DC power rectifier 502 and the needs are wattage currently needed by the control tower 500.

The controller 538, based on predetermined or programmable criteria, and based on the real time feedback received thereby from the various entities, governs in real time the electrical power supplied by each of the electrical power sources in each of the entities controlled by the controller. Power that is supplied by an electrical power source of an entity which does not need all of the power, is provided to one or more entities that do need the power based on predetermined or programmable priority. It is appreciated that household 520 is of a lower priority, and that operating room 510 is of a high priority. The priority of control tower 500 may vary during the day, and the priority of military radar equipment 530 may vary based on perceived threats. Thus there may be predetermined or programmable variables for priority, with the priority levels of various entities changing over time. Thus it is appreciated that the controller 538 effects priority driven power pooling of the power supply resources of the entities that it controls and allocates the pooled power among those entities in accordance with predetermined priorities relating to the individual entities.

The system of the present invention, as exemplified in FIG. 5 employs communication between at least one priority driven controller and plural entities controlled thereby to provide the priority driven controller with current feedback data regarding both the current needs and the capabilities of the controlled entities and their performance and to provide control instructions to the power sources of such entities. These control instructions, which may be provided along the power connections or along dedicated communication lines or other paths govern interchange of electrical power between the plurality of DC electrical consuming and providing entities operative in accordance with predetermined priorities relating to individual ones of the plurality of DC electrical consuming and providing entities.

Figure 6:
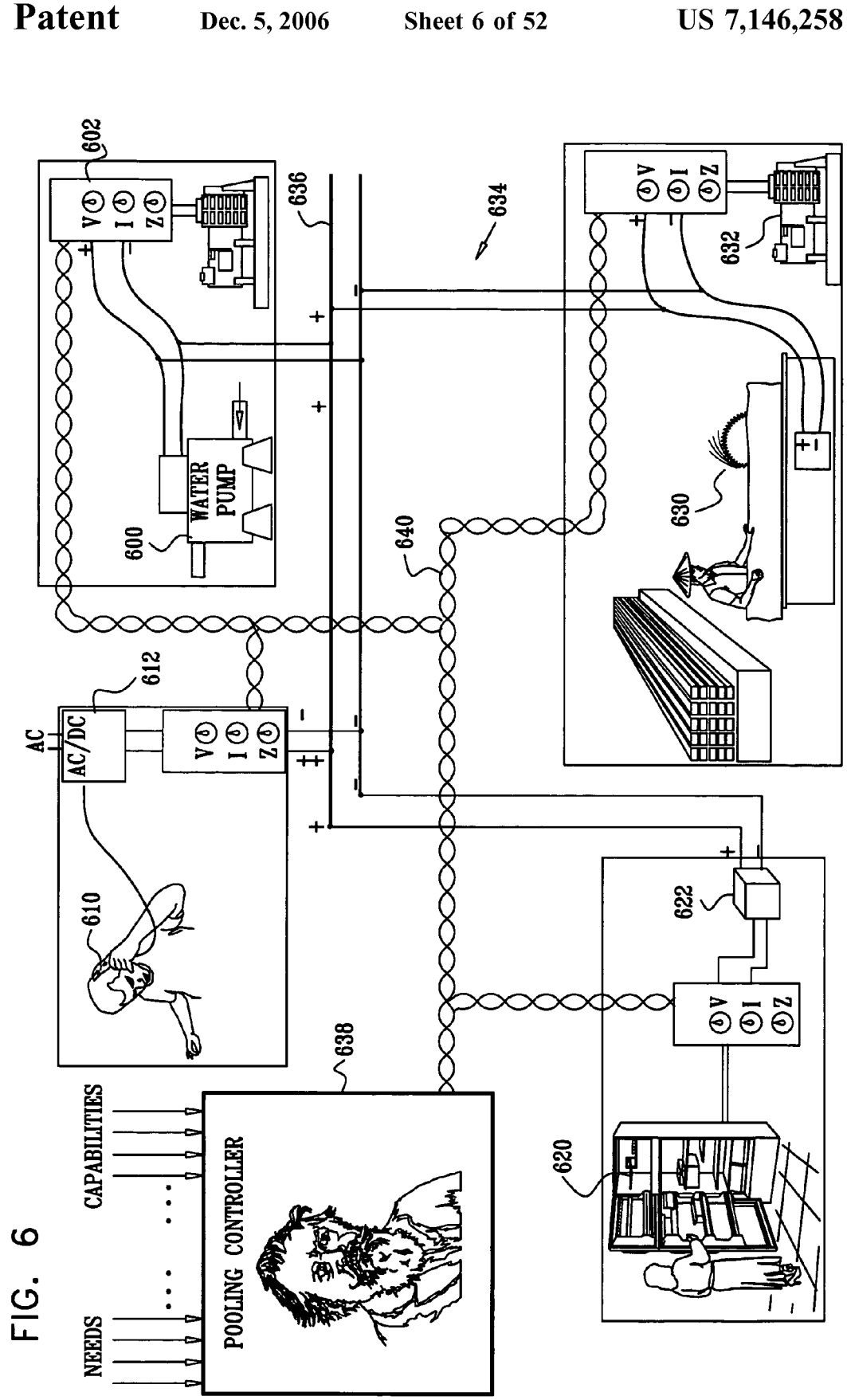
FIG. 6 is a simplified symbolic illustration of a DC power pooling system constructed and operative in accordance with a preferred embodiment of the present invention and employing a controller in data communication with a plurality of entities.

Reference is now made to FIG. 6, which is a simplified symbolic illustration of a DC power pooling system constructed and operative in accordance with a preferred embodiment of the present invention. As seen in FIG. 6, there is provided a DC power pooling system including a plurality of DC electrical power consuming and providing entities, here shown as disparate operating assemblies, such as a water pump 600 operated by a DC electrical generator 602, a shaver 610 operated by an AC/DC wall socket converter 612 connected to AC mains power; a DC refrigerator 620 operated by a DC battery assembly 622 and a DC motor operated sawmill 630 operated by a DC generator 632. It is appreciated that each of the plurality of DC electrical power consuming and providing entities 600 & 602, 610 & 612, 620 & 622 and 630 & 632 has at least a first operative mode in which it may provide more electrical power than it consumes and a second operative mode in which it may consume more electrical power than it provides.

DC electrical power interconnections, here designated collectively by reference numeral 634, interconnect the plurality of DC electrical power consuming and providing entities and permitting electrical power flow thereto and therefrom. The DC electrical power interconnections may include a DC bus 636.

At least one pooling controller 638 is operative to vary at least one of voltage, output impedance and current of electrical power provided by one or more of the plurality of DC electrical power consuming and providing entities.

The controller 638 receives from the entities which it controls information as to the capabilities and needs of each entity. In practical terms, the capability of each entity is its DC power providing capability and the needs of each entity are its DC power needs. Thus, for the entity including the water pump 600 and the generator 602, the capability is the maximum KW output of the generator 602 and the needs are KW power currently needed by the pump. For the entity including the shaver 610 and the AC/DC wall socket, the capability is the maximum wattage output of the wall socket and the needs are power currently needed by the shaver.

The controller 638, based on predetermined or programmable criteria, governs in real time the electrical power supplied by each of the electrical power sources in each of the entities controlled by the controller. Power that is supplied by an electrical power source of an entity which does not need all of the power, is provided to one or more entities that do need the power. Thus it is appreciated that the controller 638 effects power pooling of the power supply resources of the entities which it controls and allocates the pooled power among those entities.

The system of the present invention, as exemplified in FIG. 6 employs communication between one or more controller and plural entities controlled thereby over data communication path 640 to provide the controller with current data regarding both the needs and the capabilities of the controlled entities and to provide control instructions to the power sources of such entities. These control instructions, which may be provided along the power connections or along dedicated communication lines or other paths, indicated generally as path 640, govern electrical power provided by the various DC electrical power consuming and providing entities. Data communication path 640 is illustrated as a twisted pair data path, however this is meant by way of illustration only and is not meant to be limiting in any way.

Figure 7:
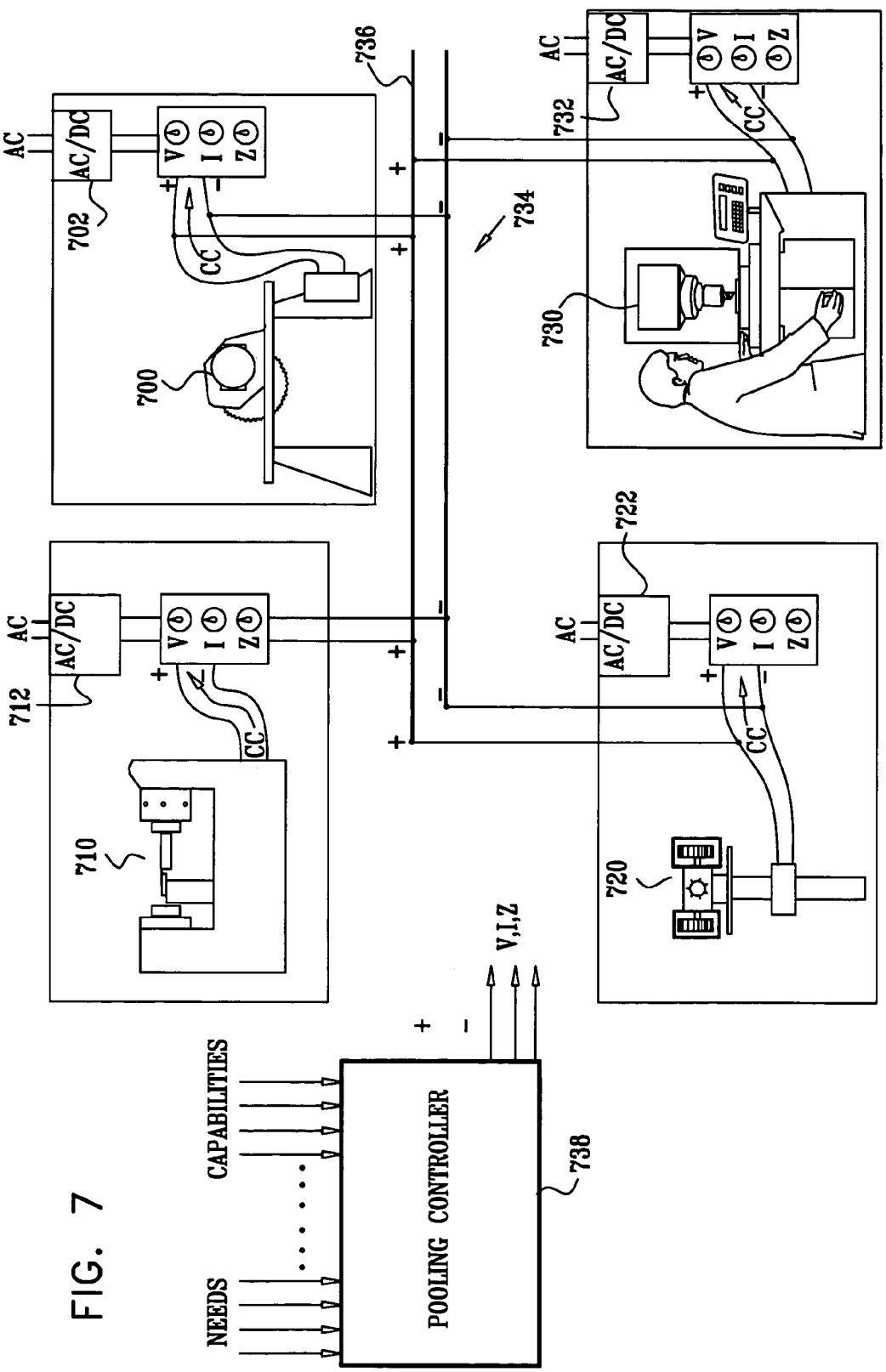
FIG. 7 is a simplified symbolic illustration of a DC power pooling system constructed and operative in accordance with a preferred embodiment of the present invention.

Reference is now made to FIG. 7, which is a simplified symbolic illustration of a DC power pooling system constructed and operative in accordance with a preferred embodiment of the present invention. As seen in FIG. 7, there is provided a DC power pooling system including a plurality of DC electrical power consuming and providing entities, here shown as disparate equipment of a machine shop, such as a saw 700 operated by an AC/DC power rectifier 702 connected to AC mains power, a lathe 710 operated by an AC/DC power rectifier 712 connected to AC mains power; a grinder 720 operated by an AC/DC power rectifier 722 connected to AC mains power and a numerically controlled milling machine 730 operated by an AC/DC power rectifier 732 connected to AC mains power. It is appreciated that each of the plurality of DC electrical power consuming and providing entities 700 & 702, 710 & 712, 720 & 722 and 730 & 732 has at least a first operative mode in which it may provide more electrical power than it consumes and a second operative mode in which it may consume more electrical power than it provides.

DC electrical power interconnections, here designated collectively by reference numeral 734, interconnect the plurality of DC electrical power consuming and providing entities and permitting electrical power flow thereto and therefrom. The DC electrical power interconnections may include a DC bus 736.

At least one pooling controller 738 is operative to vary at least one of voltage, output impedance and current of electrical power provided by one or more of the plurality of DC electrical power consuming and providing entities.

The pooling controller 738 receives from the entities which it controls information as to the capabilities and needs of each entity. In practical terms, the capability of each entity is its DC power providing capability and the needs of each entity are its DC power needs. Thus, for the entity including the saw 700 and the AC/DC power rectifier 702, the capability is the maximum KW output of the AC/DC power rectifier 702 and the needs are KW power currently needed by the saw 700.

The controller 738, based on predetermined or programmable criteria, governs in real time the electrical power supplied by each of the electrical power sources in each of the entities controlled by the controller. Power that is supplied by an electrical power source of an entity which does not need all of the power, is provided to one or more entities that do need the power. Thus it is appreciated that the controller 738 effects power pooling of the power supply resources of the entities which it controls and allocates the pooled power among those entities.

The system of the present invention, as exemplified in FIG. 7 employs communication between one or more controller and plural entities controlled thereby to provide the controller with current data regarding both the needs and the capabilities of the controlled entities and to provide control instructions to the power sources of such entities. These control instructions, which may be provided along the power connections or along dedicated communication lines or other paths may vary one or more of voltage V, output impedance Z and current I of electrical power provided by the various DC power sources.

Figure 8:
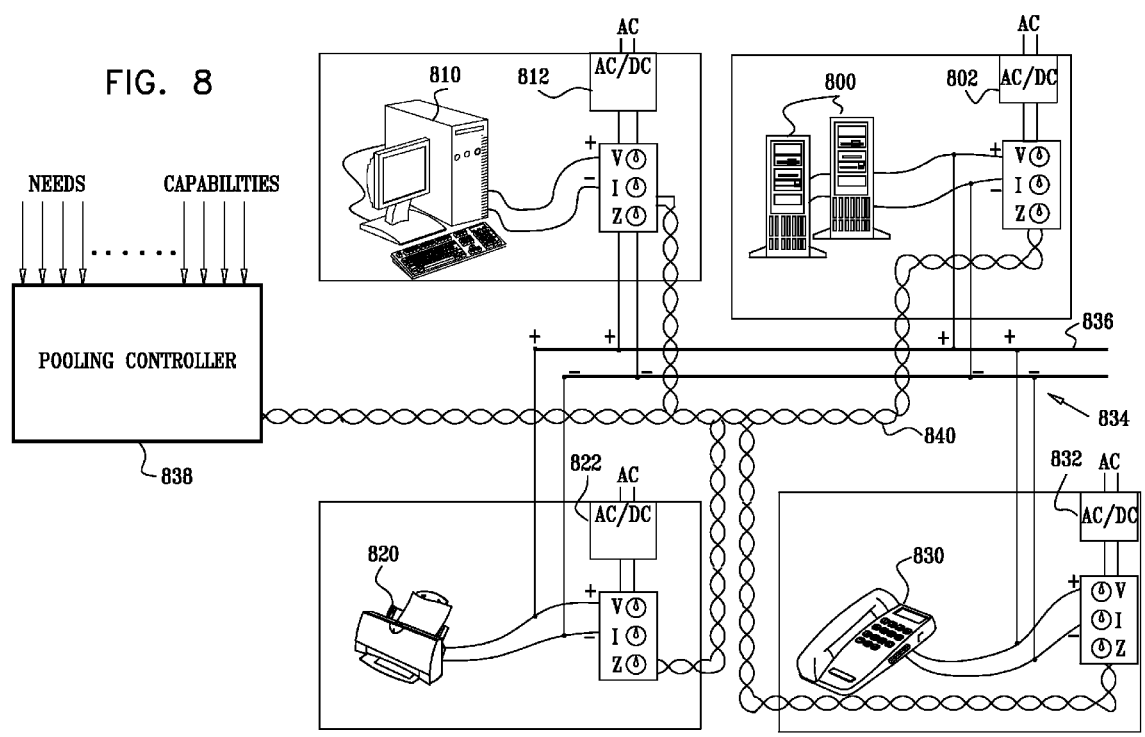
FIG. 8 is a simplified symbolic illustration of a DC power pooling system for a local area network constructed and operative in accordance with a preferred embodiment of the present invention.

Reference is now made to FIG. 8, which is a simplified symbolic illustration of a DC power pooling system for a local area network (LAN), constructed and operative in accordance with a preferred embodiment of the present invention. As seen in FIG. 8, there is provided a DC power pooling system for a LAN including a plurality of DC electrical power consuming and providing entities, here shown as disparate LAN elements, nodes or modules, such as a server 800 operated by an AC/DC switching power supply 802 connected to AC mains power, a personal computer 810 operated by an AC/DC switching power supply 812 connected to AC mains power, a printer 820 operated by an AC/DC converter 822 connected to AC mains power and an Internet Protocol telephone 830 operated by an AC/DC converter 832 connected to AC mains power. It is appreciated that each of the plurality of DC electrical power consuming and providing entities 800 & 802, 810 & 812, 820 & 822 and 830 & 832 has at least a first operative mode in which it may provide more electrical power than it consumes and a second operative mode in which it may consume more electrical power than it provides.

DC electrical power interconnections, here designated collectively by reference numeral 834, interconnect the plurality of DC electrical power consuming and providing entities and permitting electrical power flow thereto and therefrom. The DC electrical power interconnections may include a DC bus 836.

At least one pooling controller 838 is operative to govern electrical power provided by at least one of the plurality of DC electrical power consuming and providing LAN modules.

The controller 838 receives from the entities which it controls information as to the capabilities and needs of each entity. In practical terms, the capability of each entity is its DC power providing capability and the needs of each entity are its DC power needs. Thus, for the entity including the server 800 and the AC/DC switching power supply 802, the capability is the maximum wattage output of the AC/DC switching power supply 802 and the needs are the wattage power currently needed by the server 800. Similarly, for the entity including the printer 820 and the AC/DC converter 822, the capability is the maximum wattage output of the AC/DC converter 822 and the needs are the wattage power currently needed by the printer 820.

The controller 838, based on predetermined or programmable criteria, governs in real time the electrical power supplied by each of the electrical power sources in each of the entities controlled by the controller. Power that is supplied by an electrical power source of an entity which does not need all of the power, is provided to one or more entities that do need the power. Thus it is appreciated that the controller 838 effects power pooling of the power supply resources of the entities which it controls and allocates the pooled power among those entities.

The system of the present invention, as exemplified in FIG. 8 employs communication between one or more controller and plural LAN modules controlled thereby over data communication path 840 to provide the controller with current data regarding both the needs and the capabilities of the controlled LAN modules provide control instructions to the power sources of such LAN modules. These control instructions, which may be provided along the power connections or along dedicated communication lines or other paths, govern electrical power provided by at least one of the plurality of DC electrical consuming and providing LAN modules. Data communication path 840 is illustrated as a twisted pair data path, however this is meant by way of illustration only and is not meant to be limiting in any way. Data communication path 840 may be part of the LAN communication pathway, or a separate dedicated path, without exceeding the scope of the invention.

Figure 9:
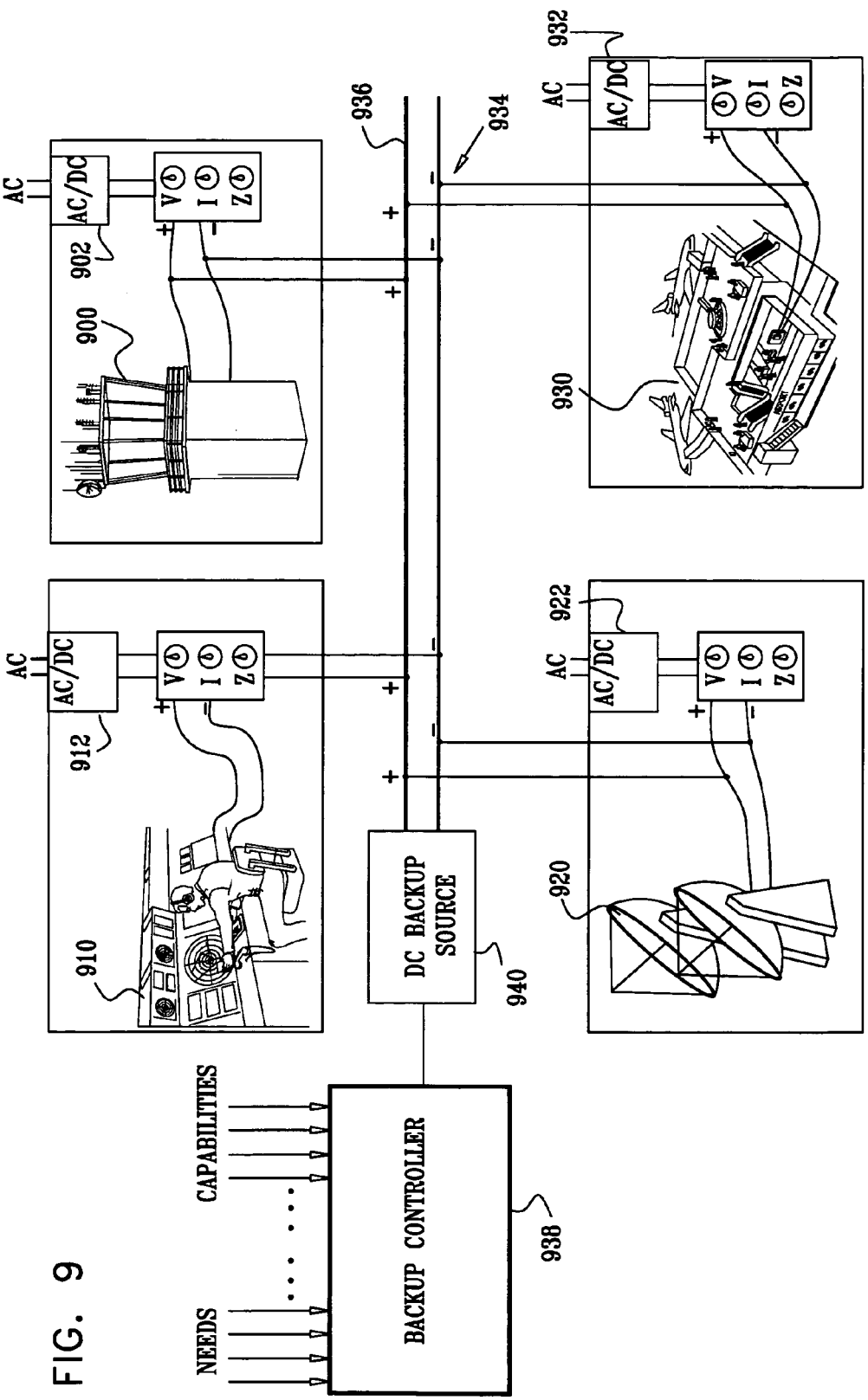
FIG. 9 is a simplified symbolic illustration of a DC power system comprising at least one centralized DC backup power source constructed and operative in accordance with a preferred embodiment of the present invention.

Reference is now made to FIG. 9, which is a simplified symbolic illustration of a DC power system constructed and operative in accordance with a preferred embodiment of the present invention. As seen in FIG. 9, there is provided a DC power system including a plurality of DC electrical power consuming and providing entities, here shown as disparate operating facilities of an airport, such as a control tower 900 operated by an AC/DC power rectifier 902, a radar installation 910 operated by an AC/DC power rectifier 912, communication antennas 920 operated by an AC/DC power rectifier 922 and terminal building equipment 930 operated by an AC/DC power rectifier 932. It is appreciated that each of the plurality of DC electrical power consuming and providing entities 900 & 902, 910 & 912, 920 & 922 and 930 & 932 has at least a first operative mode in which it may provide more electrical power than it consumes and a second operative mode in which it may consume more electrical power than it provides.

There is further provided a centralized DC backup power source 940, which in a preferred embodiment comprises a battery pack. Optionally, centralized DC backup power source 940 further comprises a charger for charging the battery pack.

DC electrical power interconnections, here designated collectively by reference numeral 934, interconnect the plurality of DC electrical power consuming and providing entities and the centralized DC backup power source 940, and permitting electrical power flow thereto and therefrom. The DC electrical power interconnections may include a DC bus 936.

At least one backup controller 938 is operative to control supply of electrical power from the centralized DC backup power source 940 to the plurality of DC electrical power consuming and providing entities. Such a centralized DC backup source enables a single DC backup for entities connected as part of the DC power system. Optionally, backup controller 938 is further operable to vary at least one of voltage, output impedance and current of electrical power provided by one or more of the plurality of DC electrical power consuming and providing entities.

The backup controller 938 receives from the entities which it controls information as to the capabilities and needs of each entity. In practical terms, the capability of each entity is its DC power providing capability and the needs of each entity are its DC power needs. Thus, for the entity including the control tower 900 and the AC/DC power rectifier 902, the capability is the maximum KW output of the AC/DC power rectifier 902 and the needs are KW power currently needed by the control tower 900. For the entity including the radar installation 910 and the AC/DC power rectifier 912, the capability is the maximum KW output of the AC/DC power rectifier 912 and the needs are KW power currently needed by the radar installation 910.

The backup controller 938, receives information from entities requiring back up power, inter alia due to a failure of the entities AC/DC converter, and based on predetermined or programmable criteria, governs in real time the electrical power supplied centralized DC backup power source to each of the entities controlled by the controller. Thus it is appreciated that backup controller 938 effects the supply of electrical power from the centralized DC backup power source to the plurality of DC electrical power consuming entities.

Figure 10:
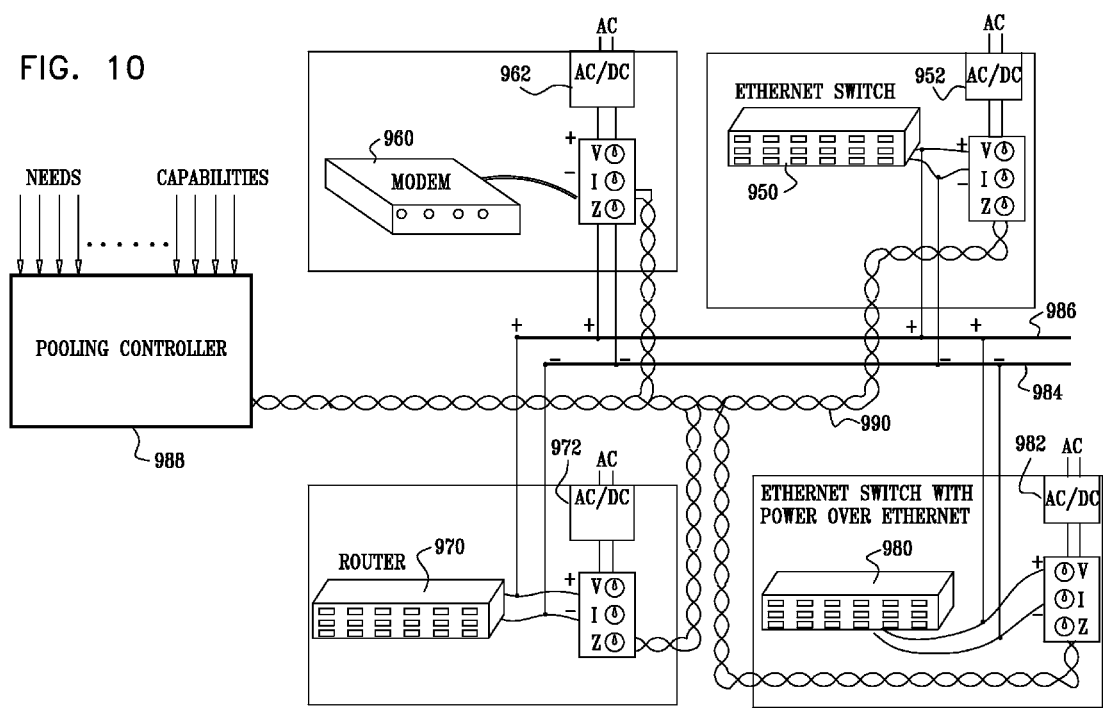
FIG. 10 is a simplified symbolic illustration of a DC power pooling system for a data communication network constructed and operative in accordance with a preferred embodiment of the present invention.

Reference is now made to FIG. 10, which is a simplified symbolic illustration of a DC power pooling system for a data communication network, in particular an Ethernet network, constructed and operative in accordance with a preferred embodiment of the present invention. As seen in FIG. 10, there is provided a DC power pooling system for a data communication network including a plurality of DC electrical power consuming and providing entities, here shown as disparate data communication Ethernet nodes, such as an Ethernet switch 950 operated by an AC/DC switching power supply 952 connected to AC mains power, a modem 960 operated by an AC/DC converter 962 connected to AC mains power, a router 970 operated by an AC/DC switching power supply 972 connected to AC mains power and an Ethernet switch with power over Ethernet functionality 980 operated by an AC/DC switching power supply 982 connected to AC mains power. It is appreciated that each of the plurality of DC electrical power consuming and providing Ethernet nodes 950 & 952, 960 & 962, 970 & 972 and 980 & 982 has at least a first operative mode in which it may provide more electrical power than it consumes and a second operative mode in which it may consume more electrical power than it provides.

DC electrical power interconnections, here designated collectively by reference numeral 984, interconnect the plurality of DC electrical power consuming and providing Ethernet nodes and permitting electrical power flow thereto and therefrom. The DC electrical power interconnections may include a DC bus 986.

At least one pooling controller 988 is operative to vary at least one of voltage, output impedance and current of electrical power provided by one or more of the plurality of DC electrical power consuming and providing Ethernet nodes.

The controller 988 receives from the Ethernet nodes which it controls information as to the capabilities and needs of each Ethernet node. In practical terms, the capability of each Ethernet node is its DC power providing capability and the needs of each entity are its DC power needs. Thus, for the Ethernet node including the Ethernet switch 950 and the AC/DC switching power supply 952, the capability is the maximum KW output of the AC/DC switching power supply 952 and the needs are KW power currently needed by the Ethernet switch 950. Similarly, for the Ethernet node including the modem 960 and the AC/DC converter 962, the capability is the maximum wattage output of the AC/DC converter 962 and the needs are power currently needed by the modem 960.

The controller 988, based on predetermined or programmable criteria, governs in real time the electrical power provided by at least one of the plurality of DC electrical power consuming and providing Ethernet nodes. Power that is supplied by an electrical power source of an Ethernet node which does not need all of the power, is provided to one or more Ethernet nodes that do need the power. Thus it is appreciated that the controller 988 effects power pooling of the power supply resources of the Ethernet nodes which it controls and allocates the pooled power among those Ethernet nodes.

The system of the present invention, as exemplified in FIG. 10 employs communication between one or more controller and plural Ethernet nodes controlled thereby over data communication path 990 to provide the controller with current data regarding both the needs and the capabilities of the controlled Ethernet nodes and to provide control instructions to the power sources of such Ethernet nodes. These control instructions, which may be provided along the power connections or along dedicated communication lines or other paths, illustrated generally as 990, govern electrical power provided by at least one of the plurality of DC electrical power consuming and providing Ethernet nodes. Data communication path 990 is illustrated as a twisted pair data path, however this is meant by way of illustration only and is not meant to be limiting in any way. Data communication path 990 may be part of the Ethernet communication pathway, or a separate dedicated path such as a CAN-bus, without exceeding the scope of the invention.

Reference is now made to FIGS. 11–34 which describe in further detail exemplary embodiments in accordance with the principles of the current invention. The invention is herein described in detail in relation to a data communication system, and in particular an Ethernet based network, however this is not meant to be limiting in any way. The term node, element, device, unit, module and entity is used interchangeably throughout the specification, and is meant to include any entity having relevance to the invention which is viewed as a separate addressable entity by the pooling controller.

Reference is now made to FIG. 11, which is a simplified pictorial illustration of a system constructed and operative in accordance with a preferred embodiment of the present invention. As seen in FIG. 1, the system preferably comprises nodes (1102, 1104, 1106, 1108 and 1122) that are each connected to a local area network (LAN), which is preferably an Ethernet network operating in accordance with the IEEE 802.3 standard, or wide area network (WAN) 1022.

Via LAN/WAN 1022, the various nodes communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and of nodes 1102, 1104, 1106, 1108 and 1122, and which preferably receives backup power and communicates data via a LAN connection. Remote modem 1042 preferably communicates data and receives backup power via a WAN connection via the LAN/WAN. Preferably, IP telephone 1024, computer 1026, IP camera 1032, wireless access point 1034, IP access controller 1036, smoke sensor 1038 and management station 1040 receive power in a manner consistent with IEEE 802.3af standard.

In an exemplary embodiment, nodes 1102, 1104, and 1106 comprise data communication modules, that are preferably rack mounted on a conventional 19-inch electronic module rack mount 1100. In the exemplary embodiment shown, node 1102 comprises a modem, hereinafter modem 1102, node 1104 comprises a switch, hereinafter switch 1104, such as a Gigabit Ethernet switch, node 1106 comprises a switch having power over Ethernet functionality, hereinafter switch having power over Ethernet functionality 1106, which preferably operates in accordance with the IEEE 802.3af standard, and node 1108 comprises a battery pack, hereinafter battery pack 1108, which is preferably employed for backup or power surge occurrences. Each of nodes 1102, 1104, 1106 and 1108 is coupled to LAN/WAN 1022 in a conventional manner. Each of nodes 1102, 1104, 1106, and 1108 is also directly coupled to mains AC voltage, preferably via a standard power cord and connector, here designated generally 1112, which are in turn connected to an outlet strip 1120.

In accordance with a preferred embodiment of the present invention, node 1122 comprises a power spine module, hereinafter power spine module 1122, is also provided, preferably in rack mounted form, which provides power community functionality among nodes 1102, 1104, 1106 and 1108. Power community functionality includes at least one of the following functionalities: power sharing, load balancing, power backup capabilities, power redundancy; power boosting, power adding, power limiting and fault recovery.

Power spine module 1122 preferably receives AC mains power via the power cord and connector 1112 from outlet strip 1120. Power spine module 1122 is preferably interconnected in a star configuration with nodes 1102, 1104, 1106 and 1108 by respective cables and connectors that are designated generally 1132, and in a conventional manner to LAN/WAN 1022. In one preferred embodiment cables and connector 1132 are interchangeable, with common and identical connectors on either side of each cable. In another preferred embodiment, at least two cable and connector types 1132 are supplied, with a first cable type being optimized for low current operation, and a second cable type being optimized for high current operation. Further preferably, any harmful connection of cables and modules is prevented by employing incompatible connectors. Power spine module 1122 preferably comprises an internal power supply operable to supply power as required to any of nodes 1102, 1104, 1106 and 1108.

Figure 12:
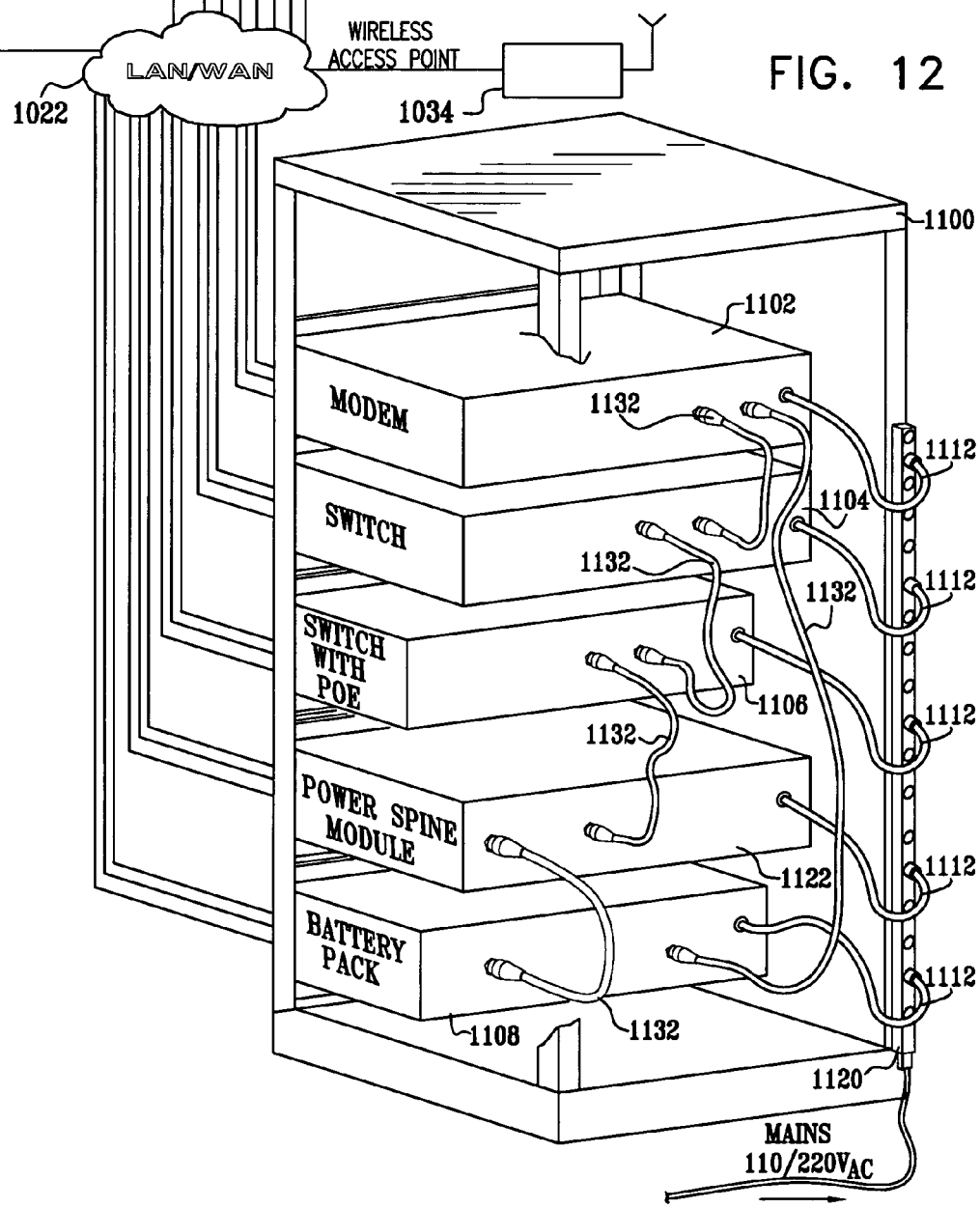
FIG. 12 is a simplified pictorial illustration of a system constructed and operative in accordance with another preferred embodiment of the present invention.

Reference is now made to FIG. 12, which is a simplified pictorial illustration of a system constructed and operative in accordance with a preferred embodiment of the present invention. As seen in FIG. 12, the system preferably comprises nodes (1102, 1104, 1106, 1108 and 1122) interconnected in a ring topology, that are each connected to a local area network (LAN), which is preferably an Ethernet network operating in accordance with the IEEE 802.3 standard, or wide area network (WAN) 1022.

Via LAN/WAN 1022, the various nodes communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and of nodes 1102, 1104, 1106, 1108 and 1122, and which preferably receives backup power and communicates data via a LAN connection. Remote modem 1042 preferably communicates data and receives backup power via a WAN connection via the LAN/WAN. Preferably, IP telephone 1024, computer 1026, IP camera 1032, wireless access point 1034, IP access controller 1036, smoke sensor 1038 and management station 1040 receive power in a manner consistent with IEEE 802.3af standard.

In an exemplary embodiment, nodes 1102, 1104, and 1106 comprise data communication modules, that are preferably rack mounted on a conventional 19 inch electronic module rack mount 1100. In the exemplary embodiment shown, node 1102 comprises a modem, hereinafter modem 1102, node 1104 comprises a switch, hereinafter switch 1104, such as a Gigabit Ethernet switch, node 1106 comprises a switch having power over Ethernet functionality, hereinafter switch having power over Ethernet functionality 1106, which preferably operates in accordance with the IEEE 802.3af standard, and node 1108 comprises a battery pack, hereinafter battery pack 1108, which is preferably employed for backup or power surge occurrences. Each of nodes 1102, 1104, 1106 and 1108 is coupled to LAN/WAN 1022 in a conventional manner. Each of nodes 1102, 1104, 1106, and 1108 is also directly coupled to mains AC voltage, preferably via a power cord and connector, here designated generally 1112, which are in turn connected to outlet strip 1120.

In accordance with a preferred embodiment of the present invention, node 1122 comprises a power spine module, hereinafter power spine module 1122, is also provided, preferably in rack mounted form, which provides power community functionality among nodes 1102, 1104, 1106 and 1108. Power community functionality includes at least one of the following functionalities: power sharing, load balancing, power backup capabilities, power redundancy; power boosting, power adding, power limiting and fault recovery.

Power spine module 1122 preferably receives AC mains power via a power cord and connector 1112 from outlet strip 1120. Power spine module 1122 is preferably interconnected in a ring topology with nodes 1102, 1104, 1106 and 1108 by respective cables and connectors that are designated generally 1132, and in a conventional manner to LAN/WAN 1022. In one preferred embodiment cables and connector 1132 are interchangeable, with common and identical connectors on either side of each cable. In another preferred embodiment, at least two cable and connector types 1132 are supplied, with a first cable type being optimized for low current operation, and a second cable type being optimized for high current operation. Further preferably, any harmful connection of cables and modules is prevented by employing incompatible connectors. Power spine module 1122 preferably comprises an internal power supply operable to supply power as required to any of nodes 1102, 1104, 1106 and 1108.

Reference is now made to FIG. 13A, which is a simplified pictorial illustration of a system constructed and operative in accordance with yet another preferred embodiment of the present invention. As seen in FIG. 13A, the system preferably comprises nodes (1102, 1104, 1106, 1108 and 1140) that are each connected to a local area network (LAN), which is preferably an Ethernet network operating in accordance with the IEEE 802.3 standard, or wide area network (WAN) 1022 and power spine node 1150 interconnecting nodes 1102, 1104, 1106, 1108 and 1140 in a star configuration.

Via LAN/WAN 1022, the various nodes communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and of nodes 1102, 1104, 1106, 1108 and 1140, and which preferably receives backup power and communicates data via a LAN connection. Remote modem 1042 preferably communicates data and receives backup power via a WAN connection via the LAN/WAN. Preferably, IP telephone 1024, computer 1026, IP camera 1032, wireless access point 1034, IP access controller 1036, smoke sensor 1038 and management station 1040 receive power in a manner consistent with IEEE 802.3af standard.

In an exemplary embodiment, nodes 1102, 1104, and 1106 comprise data communication modules, that are preferably rack mounted on a conventional 19 inch electronic module rack mount 1100. In the exemplary embodiment shown, node 1102 comprises a modem, hereinafter modem 1102, node 1104 comprises a switch, hereinafter switch 1104, such as a Gigabit Ethernet switch, node 1106 comprises a switch having power over Ethernet functionality, hereinafter switch having power over Ethernet functionality 1106, which preferably operates in accordance with the IEEE 802.3af standard, and node 1108 comprises a battery pack, hereinafter battery pack 1108, which is preferably employed for backup or power surge occurrences. Each of nodes 1102, 1104 and 1106 is coupled to LAN/WAN 1022 in a conventional manner. Each of nodes 1102, 1104, 1106, and 1108 is also directly coupled to mains AC voltage, preferably via a standard power cord and connector, here designated generally 1112, which are in turn connected to an outlet strip 1120.

In accordance with a preferred embodiment of the invention, node 1140 comprises a power bus power supply module, hereinafter power bus power supply module 1140, which is operable to supply power via power spine node 1150 to nodes 1102, 1104, 1106 and 1108.

In accordance with a preferred embodiment of the present invention, power spine node 1150 provides power community functionality among nodes 1102, 1104, 1106, 1108 and 1140. Power community functionality includes at least one of the following functionalities: power sharing, load balancing, power backup capabilities, power redundancy; power boosting, power adding, power limiting and fault recovery.

Power spine node 1150 is preferably interconnected in a star configuration with nodes 1102, 1104, 1106 and 1108 by respective cables and connectors that are designated generally 1132. In an exemplary embodiment power spine node 1150 is rear mounted on rack 1100, however this is not meant to be limiting in any way. In another embodiment, power spine node 1150 is rack mounted in a manner similar to any one of nodes 1102, 1104, 1106 and 1108. In one preferred embodiment cables and connector 1132 are interchangeable, with common and identical connectors on either side of each cable. In another preferred embodiment, at least two cable and connector types 1132 are supplied, with a first cable type being optimized for low current operation, and a second cable type being optimized for high current operation. Further preferably, any harmful connection of cables and modules is prevented by employing incompatible connectors.

Reference is now made to FIG. 13B, which is a simplified pictorial illustration of a system constructed and operative in accordance with yet another preferred embodiment of the present invention. As seen in FIG. 13B, the system preferably comprises nodes (1102, 1104, 1106, 1108 and 1140) that are each connected to a local area network (LAN), which is preferably an Ethernet network operating in accordance with the IEEE 802.3 standard, or wide area network (WAN) 1022 and power spine node 1150 interconnecting nodes 1102, 1104, 1106, 1108 and 1140 in a ring configuration.

Via LAN/WAN 1022, the various nodes communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and of nodes 1102, 1104, 1106, 1108 and 1140, and which preferably receives backup power and communicates data via a LAN connection. Remote modem 1042 preferably communicates data and receives backup power via a WAN connection via the LAN/WAN 1022. Preferably, IP telephone 1024, computer 1026, IP camera 1032, wireless access point 1034, IP access controller 1036, smoke sensor 1038 and management station 1040 receive power in a manner consistent with IEEE 802.3af standard.

In an exemplary embodiment, nodes 1102, 1104, and 1106 comprise data communication modules, that are preferably rack mounted on a conventional 19 inch electronic module rack mount 1100. In the exemplary embodiment shown, node 1102 comprises a modem, hereinafter modem 1102, node 1104 comprises a switch, hereinafter switch 1104, such as a Gigabit Ethernet switch, node 1106 comprises a switch having power over Ethernet functionality, hereinafter switch having power over Ethernet functionality 1106, which preferably operates in accordance with the IEEE 802.3af standard, and node 1108 comprises a battery pack, hereinafter battery pack 1108, which is preferably employed for backup or power surge occurrences. Each of nodes 1102, 1104 and 1106 is coupled to LAN/WAN 1022 in a conventional manner. Each of nodes 1102, 1104, 1106, and 1108 is also directly coupled to mains AC voltage, preferably via a standard power cord and connector, here designated generally 1112, which are in turn connected to an outlet strip 1120.

In accordance with a preferred embodiment of the invention, node 1140 comprises a power bus power supply module, hereinafter power bus power supply module 1140, which is operable to supply power via power spine node 1150 to nodes 1102, 1104, 1106 and 1108.

In accordance with a preferred embodiment of the present invention, power spine node 1150 provides power community functionality among nodes 1102, 1104, 1106, 1108 and 1140. Power community functionality includes at least one of the following functionalities: power sharing, load balancing, power backup capabilities, power redundancy; power boosting, power adding, power limiting and fault recovery.

Power spine node 1150 is preferably interconnected in a ring configuration with nodes 1102, 1104, 1106 and 1108 by respective cables and connectors that are designated generally 1132. In an exemplary embodiment power spine node 1150 is rear mounted on rack 1100, however this is not meant to be limiting in any way. In another embodiment, power spine node 1150 is rack mounted in a manner similar to any one of nodes 1102, 1104, 1106 and 1108. In one preferred embodiment cables and connector 1132 are interchangeable, with common and identical connectors on either side of each cable. In another preferred embodiment, at least two cable and connector types 1132 are supplied, with a first cable type being optimized for low current operation, and a second cable type being optimized for high current operation. Further preferably, any harmful connection of cables and modules is prevented by employing incompatible connectors.

Figure 14:
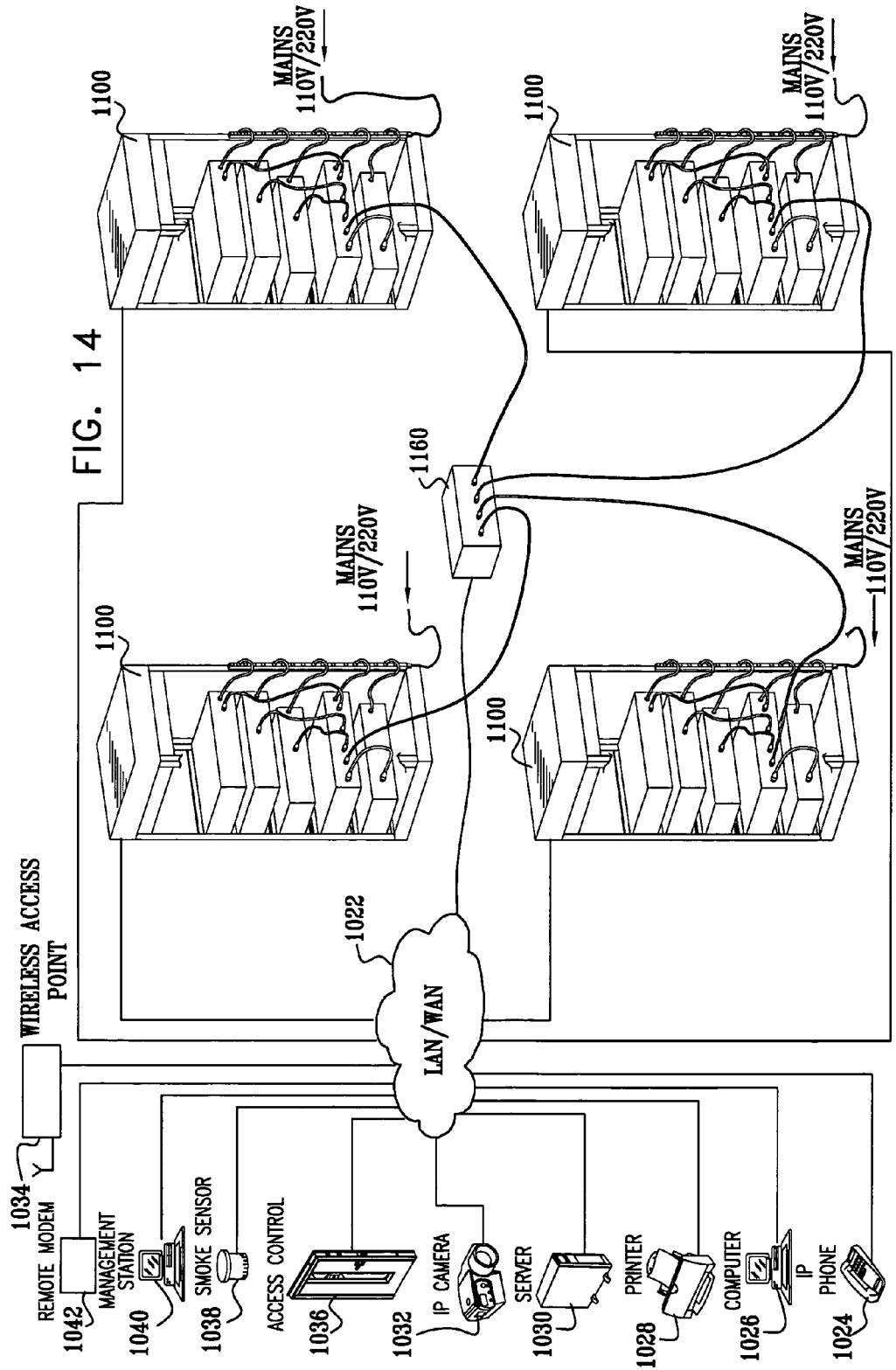
FIG. 14 is a simplified pictorial illustration of a multiple rack mounted system constructed and operative in accordance with a preferred embodiment of the present invention.

Reference is now made to FIG. 14, which is a simplified pictorial illustration of a multiple rack mounted system constructed and operative in accordance with a preferred embodiment of the present invention. FIG. 14 illustrates a system, which in an exemplary embodiment comprises a communication system, configured in a hierarchical star configuration and preferably includes a plurality of star configuration communication subsystems racks 1100, each of the type described hereinabove with reference to FIG. 11. Subsystem racks 1100 are interconnected in a star configuration, preferably via a power spine interconnect node 1160 and are all preferably connected to LAN/WAN 1022. Power spine interconnect node 1160 is preferably connected to LAN/WAN 1022.

Via LAN/WAN 1022, the various data communication modules in the various subsystem racks 1100 communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and its constituent data communication modules, and which preferably receives backup power and communicates data via a LAN connection. Remote modem 1042 preferably communicates data and receives backup power via a WAN connection via the LAN/WAN 1022. Preferably, IP telephone 1024, computer 1026, IP camera 1032, wireless access point 1034, IP access controller 1036, smoke sensor 1038 and management station 1040 receive power in a manner consistent with IEEE 802.3af standard.

It is appreciated that the embodiment of FIG. 14 which illustrates a hierarchical star topology, is applicable equally to single hierarchical star and multiple hierarchical star topologies.

Figure 15:
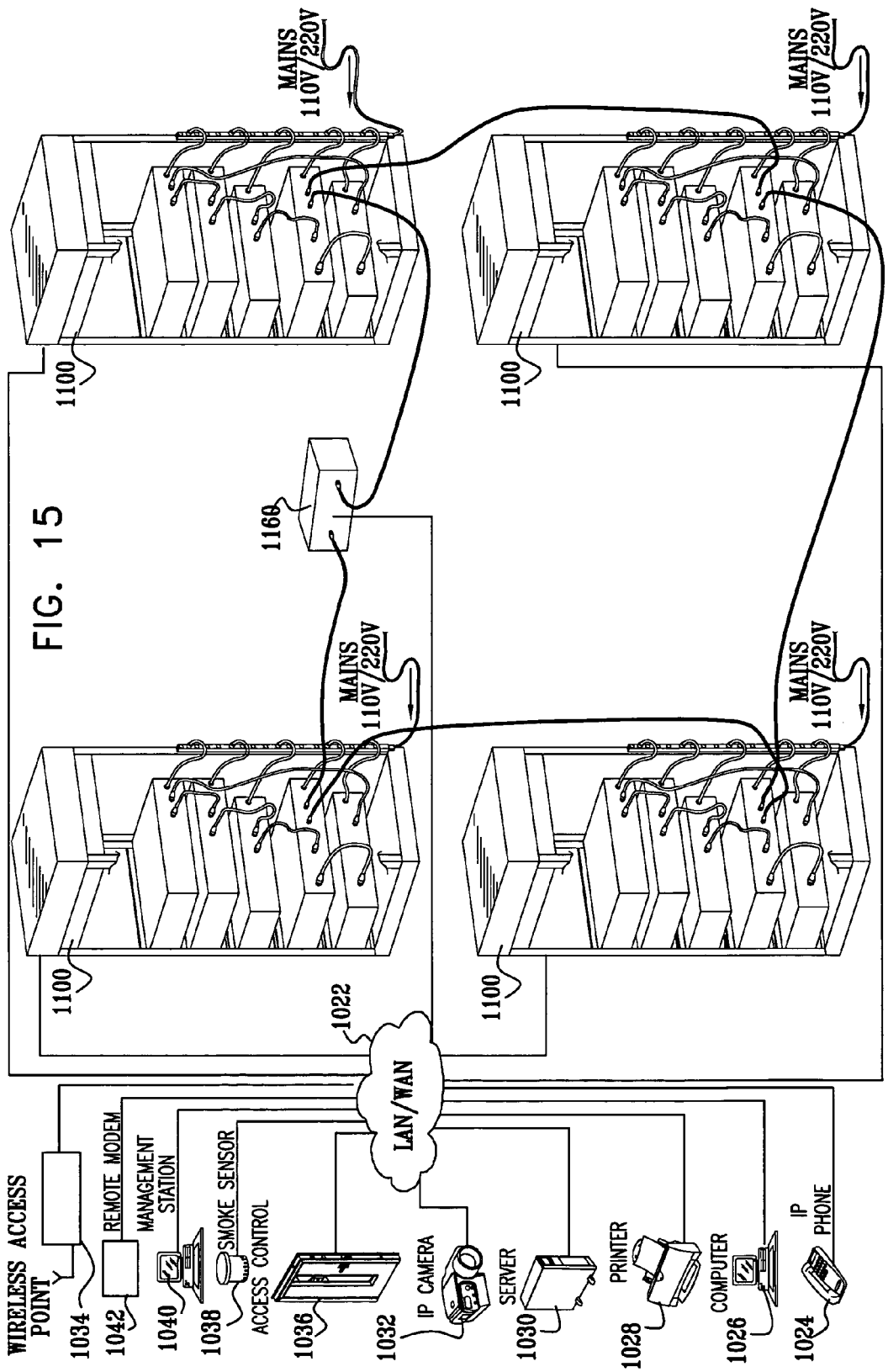
FIG. 15 is a simplified pictorial illustration of a multiple rack mounted system constructed and operative in accordance with another embodiment of the present invention.

Reference is now made to FIG. 15, which is a simplified pictorial illustration of a multiple rack mounted system constructed and operative in accordance with another embodiment of the present invention. FIG. 15 illustrates a system, which in an exemplary embodiment comprises a communication system, configured in a hierarchical ring configuration and preferably includes a plurality of ring configuration communication subsystem racks 1100, each of the type described hereinabove with reference to FIG. 12. Subsystem racks 1100 are interconnected in a ring configuration, preferably via a power spine interconnect node 1160 and are all preferably connected to LAN/WAN 1022. Power spine interconnect node 1160 is preferably connected to LAN/WAN 1022.

Via LAN/WAN 1022, the various data communication modules in the various subsystems 1100 communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and its constituent data communication modules, and which preferably receives backup power and communicates data via a LAN connection. Remote modem 1042 preferably communicates data and receives backup power via a WAN connection via the LAN/WAN 1022. Preferably, IP telephone 1024, computer 1026, IP camera 1032, wireless access point 1034, IP access controller 1036, smoke sensor 1038 and management station 1040 receive power in a manner consistent with IEEE 802.3af standard.

It is appreciated that the embodiment of FIG. 15 which illustrates an hierarchical ring topology, is applicable equally to single hierarchical ring and multiple hierarchical ring topologies.

Reference is now made to FIG. 16, which is a simplified pictorial illustration of a multiple rack mounted system constructed and operative in accordance with another embodiment of the present invention. FIG. 16 illustrates a system, which in an exemplary embodiment comprises a communications system, configured in a hierarchical star configuration and preferably includes a plurality of star configuration communication subsystem racks 1100, each of the type described hereinabove with reference to FIG. 13A. Subsystem racks 1100 are interconnected in a star configuration, preferably via a power spine interconnect node 1160 and are all preferably connected to LAN/WAN 1022. Power spine interconnect node 1160 is preferably connected to LAN/WAN 1022.

Via the LAN/WAN 1022, the various data communication modules in the various subsystem racks 1100 communicate with various elements, for example, an IP telephone 1024, which preferably receives operating power and communicates data via a LAN connection; a computer 1026, which preferably receives backup power and communicates data via a LAN connection; a printer 1028, which receives data via a LAN connection; a server 1030, which receives data via a LAN connection; an IP camera 1032, which preferably receives operating power and communicates data via a LAN connection; a wireless access point 1034, which preferably receives operating power and communicates data via a LAN connection; an IP access controller 1036, which preferably receives operating power and communicates data via a LAN connection; a smoke sensor 1038, which preferably receives operating power and communicates data via a LAN connection and a management station 1040, which governs the operation of the LAN/WAN 1022 and its constituent data communication modules, and which preferably receives backup power and communicates data via a LAN connection. Remote modem 1042 preferably communicates data and receives backup power via a WAN connection via the LAN/WAN 1022. Preferably, IP telephone 1024, computer 1026, IP camera 1032, wireless access point 1034, IP access controller 1036, smoke sensor 1038 and management station 1040 receive power in a manner consistent with IEEE 802.3af standard.

It is appreciated that the embodiment of FIG. 16 which illustrates an hierarchical star topology, is applicable equally to single hierarchical star and multiple hierarchical star topologies.

Reference is now made to FIG. 17, which is a simplified block diagram illustration of a communications system constructed and operative in accordance with an embodiment of the present invention. As seen in FIG. 17, in accordance with a preferred embodiment of the present invention, the communications system comprises a power spine node 1150, of the type described hereinabove in relation to FIG. 13A and FIG. 13B, which preferably provides power community functionality among a plurality of data communication nodes, which preferably, but not necessarily, each have their own internal power supplies which are connected directly to an AC mains through outlet strip 1120.

Examples of such data communication nodes include, but are not limited to, Ethernet switch 1104 and Ethernet switch having power over Ethernet functionality 1106. Preferably, Ethernet switch having power over Ethernet functionality 1106 conforms to IEEE 803.2af standard. Other data communication nodes that may be in operative engagement with power spine node 1150 include modem 1102 and a router 1240. No connection is illustrated between modem 1102 and power strip 1120, since in the exemplary embodiment shown modem 1102 receives power exclusively from power spine node 1150 in accordance with the principle of the current invention.

Power spine node 1150 preferably comprises a bi-directional power bus 1210 that interconnects the various data communication nodes, such as modem 1102, Ethernet switch 1104, Ethernet switch having power over Ethernet functionality 1106 and router 1240. Bi-directional power bus 1210 preferably also connects the various data communication modules to power bus power supply module 1140 and to battery pack 1108 providing back up battery power as well as peak power. Power bus power supply module 1140 and battery pack 1108 may be mounted on the same rack as one or more of nodes 1102, 1104, 1106 and 1240 or may be located elsewhere.

Operation of bi-directional power bus 1210 is preferably governed by a power pooling controller 1230 which monitors and controls energy flows through power bus 1210 between the various data communication nodes, such as nodes 1102, 1104, 1106 and 1240, power bus power supply module 1140 and battery pack 1108 in a manner to be described further hereinto below.

Preferably and optionally, power spine node 1150 also comprises a data communication switch 1220, which governs non-power related data communication over the data portion of bi-directional power bus 1210, among the various data communication nodes, such as nodes 1102, 1104, 1106 and 1240 and between power spine node 1150 and power bus power supply module 1140. The combination of optional data communication switch 1220 and the data portion of bi-directional power bus 1210 provides an alternative or addition to a conventional uplink connection conventionally employed by Ethernet switches.

One or more of the various data communication nodes, such as nodes 1104, 1106 and 1240 as well as the power bus power supply module 1140 and the battery pack 1108 are each, individually, connected to AC power mains, typically via a outlet strip 1120. Preferably, power spine node 1150, all of the various data communication nodes, such as nodes 1102, 1104, 1106 and 1240 as well as power bus power supply module 1140 and battery pack 1108 are each, individually, connected to a LAN/WAN 1022.

Via LAN/WAN 1022, power spine node 1150, and the various data communication nodes, such as nodes 1102, 1104, 1106 and 1240 communicate with various elements, for example, IP telephone 1024, which preferably receives operating power and communicates data via a LAN connection; computer 1026, which preferably receives backup power and communicates data via a LAN connection; printer 1028, which receives data via a LAN connection; server 1030, which receives data via a LAN connection; IP camera 1032, which preferably receives operating power and communicates data via a LAN connection; wireless access point 1034, which preferably receives operating power and communicates data via a LAN connection; IP access controller 1036, which preferably receives operating power and communicates data via a LAN connection; smoke sensor 1038, which preferably receives operating power and communicates data via a LAN connection and management station 1040, which governs the operation of the LAN/WAN 1022 and of data communication nodes 1102, 1104, 1106 and 1240, and which preferably receives backup power and communicates data via a LAN connection. Remote modem 1042 preferably communicates data and receives backup power via a WAN connection via the LAN/WAN 1022. Preferably, IP telephone 1024, computer 1026, IP camera 1032, wireless access point 1034, IP access controller 1036, smoke sensor 1038 and management station 1040 receive power from Ethernet switch having power over Ethernet functionality 1106 in a manner consistent with IEEE 802.3af standard.

The present invention constitutes an important contribution to bringing reliability of data communication into line with that presently existing in conventional telephony, also called plain old telephone service (POTS). An important factor in reliability is percentage uptime of a communications system for each user. POTS telephony has long been characterized by 99.999% uptime. This is not presently the case in data communication, inter alia due to failures in the supply of power to the communications system and to elements thereof.

In order to try to overcome failures in the supply of power, designers have mandated the use of UPS (uninterrupted power supply) and RPS (redundant power supply) modules. The use of UPS modules involves multiple voltage and current conversions, which are energy wasteful. The use of UPS and RPS modules both result in significant energy waste.

The present invention also addresses another design issue that has long plagued designers of equipment, and in particular communication equipment, namely the requirement that the power supplies provided within such equipment be capable of handling peak power requirements, even though peak power operation rarely or never occurred. Aside from the resultant increased cost and lowered efficiency, significant issues of lowered mean time between failures (MTBF) arise due to significant generation of heat within the equipment caused by the required high peak power. A further problem involves the increased electromagnetic interference from having multiple switching power supplies in close proximity, thus necessitating additional shielding.

The present invention addresses the afore the long-felt design issues by providing a power community wherein nodes of a system obtain back-up power and peak power from each other or from one or more common sources interconnected by power spine node 1150 of FIGS. 13A and 13B, or power spine module 1122 of FIGS. 11 and 12. The present invention thus provides diversity of power sources available to each node of the data communications system at any given time, with minimal redundancy in equipment and minimal voltage and current conversions. Thus, failure of an internal power source for any communication module connected to power spine node 1150 of FIGS. 13A and 13B, or power spine module 1122 of FIGS. 11 and 12, need not result in the failure of the communication node, since power may be supplied to the communication node over power spine node 1150 or power spine module 1122, from one or more common sources interconnected by power spine node 1150 or power spine module 1122. The present invention further enables the use of power supplies in communication which are incapable of meeting peak power requirements of such equipment, by providing a reserve source of peak power from one or more common source interconnected by power spine node 1150 or power spine module 1122. The present invention further provides for a distributed uninterruptible power supply, with battery pack 1108 being useable by any communication module connected to power spine node 1150, or power spine module 1122, without the requirement for conversion to AC power. The present invention also enables some of the system equipment, which currently includes an AC/DC power supply, to be provided without such a power supply, the DC power being supplied from one or more common source interconnected by power spine node 1150, or power spine module 1122. System equipment so supplied without an internal AC/DC power supply may thus be made substantially smaller, particularly in critical dimensions, such as height, which can thus be below one height unit in a 19 inch rack-mount environment (1 U).

Figure 18B:
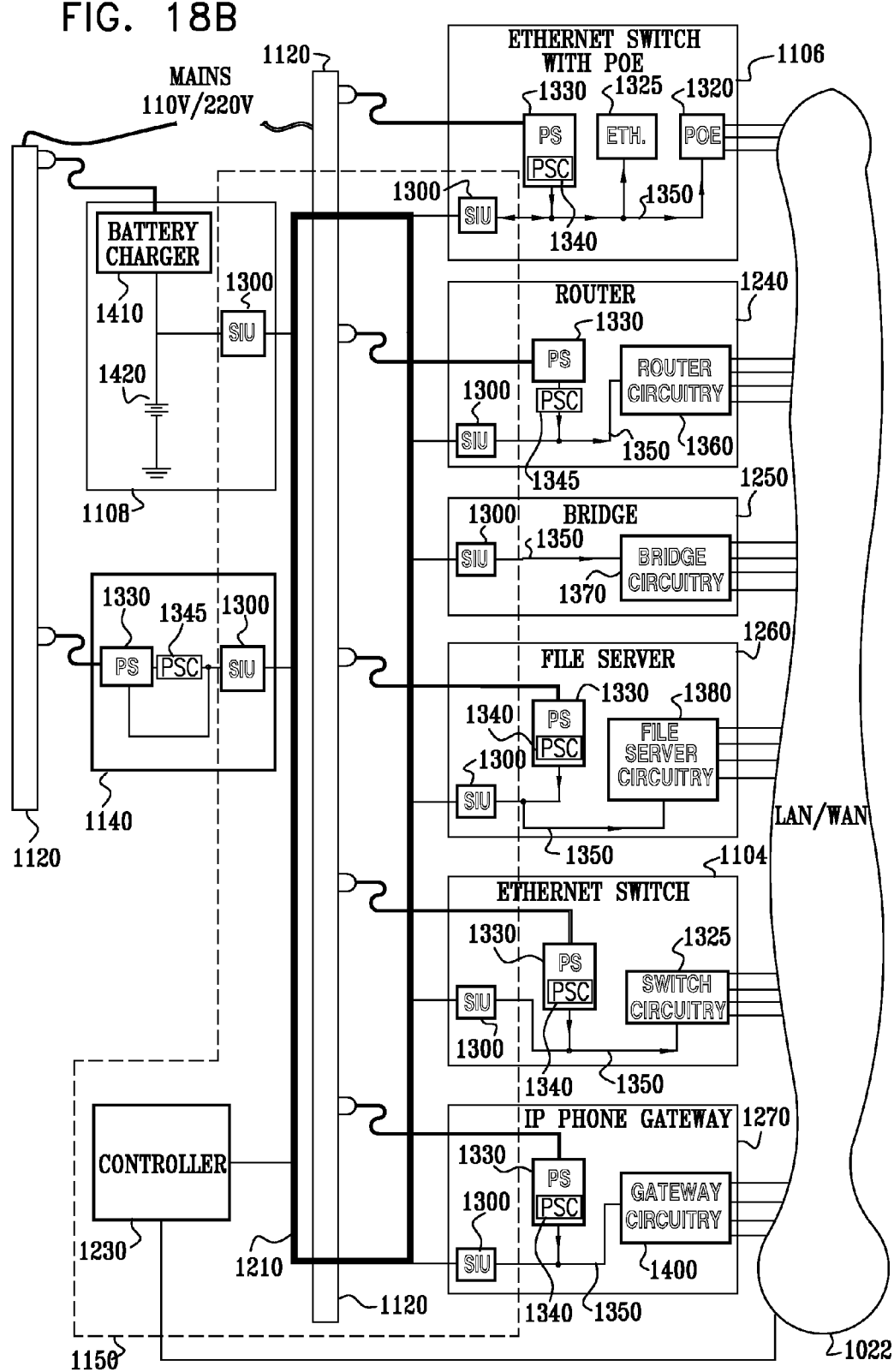

Reference is now made to FIGS. 18A and 18B, which are simplified block diagram illustrations of two alternative embodiments of a communications system of the type shown in FIG. 17 constructed and operative in a ring topology as shown in FIG. 13b and providing power distribution.

FIG. 18A illustrates a communications system of the type illustrated in FIG. 17, comprising a power spine node 1150, which preferably provides power community functionality among a plurality of data communication nodes, which preferably, but not necessarily, each have their own internal power supplies which are connected directly to AC mains at a outlet strip 1120.

Examples of such data communication nodes include an Ethernet switch 1104 and an Ethernet switch having power over Ethernet functionality 1106. Preferably, Ethernet switch having power over Ethernet functionality 1106 conforms to IEEE 803.2af standard. Other data communication nodes that may be in operative engagement with power spine node 1150 include router 1240, a bridge 1250, a file server 1260 and an IP phone gateway 1270. One or more of the various data communication nodes, such as nodes 1104, 1106, 1240, 1260 and 1270 as well as power bus power supply module 1140 and battery pack 1108 are each, individually, connected to AC power mains, typically via outlet strip 1120. No connection is illustrated between bridge 1250 and outlet strip 1120, since bridge 1250 receives power exclusively from power spine node 1150 in accordance with the principle of the current invention.

Power spine node 1150 preferably comprises a bi-directional power bus designated generally by reference numeral 1210 which interconnects data communication nodes in a ring topology, preferably via respective input and output supply interface units (SIUs) 1300, each SIU 1300 being associated with one of the various data communication nodes, such as nodes 1104, 1106, 1240–1270, and permits power sharing therebetween. Bi-directional power bus 1210 is completed through each individual SIU 1300, thus each SIU 1300 provides protection for bi-directional power bus 1210. In one embodiment, each SIU 1300 is located within the data communication node with which it is associated. In another embodiment, one or more SIU 1300 are collocated within power spine node 1150, without exceeding the scope of the invention. In yet another embodiment, one or more SIU 1300 are physically collocated on bi-directional power bus 1210, without exceeding the scope of the invention. Bi-directional power bus 1210 preferably also connects the various data communication nodes to power bus power supply module 1140 and to battery pack 1108 providing back up battery power as well as peak power. Power bus power supply module 1140 and battery pack 1108 may be mounted on the same rack as one or more of nodes 1104, 1106, 1240–1270 or may be located elsewhere.

Bi-directional power bus 1210 comprises a data portion and a power portion. Operation of bi-directional power bus 1210 is preferably governed by a power pooling controller 1230 which monitors and controls energy flows through the bus between the various data communication nodes modules, such as nodes 1104, 1106, 1240–1270, power bus power supply module 1140 and battery pack 1108 in a manner to be described further hereinto below over the data portion of bi-directional power bus 1210. Preferably, for power spine node 1150, all of the various data communication nodes 1104, 1106, 1240–1270 as well as power bus power supply module 1140 and battery pack 1108 are each, individually, connected to a LAN/WAN 1022. Power pooling controller 1230 communicates via the power spine node 1150 Ethernet connection with LAN/WAN 1022.

Ethernet switch having power over Ethernet functionality 1106 preferably comprises power over Ethernet circuitry 1320, which governs the supply of electrical power over the LAN/WAN 1022, Ethernet switch circuitry 1325 which performs Ethernet communication switching, and an internal power supply 1330, which receives AC mains power from outlet strip 1120 and which preferably, but not necessarily, is insufficient for peak power requirements of Ethernet switch having power over Ethernet functionality 1106. Internal power supply 1330 preferably includes power sharing circuit (PSC) 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Both power over Ethernet circuitry 1320 and Ethernet switch circuitry 1325 receive DC power over internal power bus 1350. DC power is supplied by internal power supply 1330 and/or by bi-directional power bus 1210 via one or both SIU 1300, located at input and output ring ports of Ethernet switch having power over Ethernet functionality 1106, which are coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via one or both SIU 1300 and via bi-directional power bus 1210 to any other suitable one or more of the various data communication nodes, such as nodes 1104 and 1240–1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each of SIU 1300 to limit or terminate the passage of current therethrough as appropriate.

Router 1240 preferably comprises router circuitry 1360, which routes communication messages to and from the LAN/WAN 1022, and an internal power supply 1330, which receives AC mains power from outlet strip 1120 and which preferably, but not necessarily, is insufficient for peak power requirements of router 1240. Internal power supply 1330 preferably is connected to an internal power bus 1350 via PSC 1345, whose structure and operation is described hereinto below with reference to FIG. 25B–FIG. 25C. PSC 1345 preferably is responsive to outputs from power pooling controller 1230 transmitted over the data portion of bi-directional power bus 1210 via the data portion of internal power bus 1350 to limit the power output of power supply 1330 reaching internal power bus 1350 in order to participate optimally in the power sharing community.

Router circuitry 1360 receives DC power over internal power bus 1350 from internal power supply 1330 via PSC 1345 and/or from bi-directional power bus 1210 via one or both SIU 1300 located at the input and output ring ports of router 1240, which are each coupled to a section of bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive to outputs from power pooling controller 1230 transmitted over the data portion of bi-directional power bus 1210 and the data portion of internal power bus 1350, provides DC power via one or both SIU 1300 and bi-directional power bus 1210 to any other suitable one or more of the various data communication nodes, such as nodes 1104, 1106, 1250–1270, as well as to battery pack 1108.

Bridge 1250 preferably comprises bridging circuitry 1370, which performs a bridging functionality on communication messages to and from the LAN/WAN 1022. It is a particular feature of the present invention that the bridge 1250 need not contain an internal power supply. Rather, in accordance with a preferred embodiment of the present invention, bridge circuitry 1370 receives DC power over an internal power bus 1350 from bi-directional power bus 1210 via one or both SIU 1300 located at input and output ring ports of bridge 1250, which are coupled to bi-directional power bus 1210. Bi-directional power bus 1210 receives power from battery pack 1108, power bus power supply module 1140, and/or any of the internal power supplies of the other communication nodes connected to bi-directional power bus 1210.

File server 1260 preferably comprises file server circuitry 1380 which serves communication messages over the LAN/WAN 1022, and an internal power supply 1330, which receives AC mains power from outlet strip 1120 and which preferably, but not necessarily, is insufficient for peak power requirements of file server 1260. Internal power supply 1330 preferably includes power sharing circuit (PSC) 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

File server circuitry 1380 receives DC power over internal power bus 1350. DC power is supplied by internal power supply 1330 and/or by bi-directional power bus 1210 via one or both SIU 1300, located at input and output ring ports of file server 1260, which are coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via one or both SIU 1300 and via bi-directional power bus 1210 to any other suitable one or more of the various data communication nodes, such as nodes 1104, 1106, 1240, 1250 and 1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each of SIU 1300 to limit or terminate the passage of current there through as appropriate.

Switch 1104 preferably comprises Ethernet switch circuitry 1325 which switches communication messages over LAN/WAN 1022, and internal power supply 1330, which receives AC mains power from outlet strip 1120 and which preferably, but not necessarily, is insufficient for peak power requirements of switch 1104. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Ethernet switch circuitry 1325 receives DC power over internal power bus 1350. DC power is supplied by internal power supply 1330 and/or by bi-directional power bus 1210 via one or both SIU 1300, located at input and output ring ports of switch 1104, which are coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via one or both SIU 1300 and via bi-directional power bus 1210 to any other suitable one or more of the various data communication nodes, such as nodes 1106 and 1240–1270 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each of SIU 1300 to limit or terminate the passage of current there through as appropriate.

IP phone gateway 1270 preferably comprises gateway circuitry 1400, which manages communication messages over the LAN/WAN 1022, and internal power supply 1330, which receives AC mains power from outlet strip 1120 and which preferably, but not necessarily, is insufficient for peak power requirements of IP phone gateway 1270. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Gateway circuitry 1400 receives DC power over internal power bus 1350. DC power is supplied by internal power supply 1330 and/or by bi-directional power bus 1210 via one or both SIU 1300, located at input and output ring ports of IP phone gateway 1270, which are coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via one or both SIU 1300 and via bi-directional power bus 1210 to any other suitable one or more of the various data communication nodes, such as nodes 1104, 1106 and 1240–1260 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each of SIU 1300 to limit or terminate the passage of current there through as appropriate.

Battery pack 1108 is in an exemplary embodiment a rechargeable battery pack and is preferably provided with a pair of SIUs 1300, located at input and output ring ports of battery pack 1108. Battery pack 1108 comprises multiple rechargeable batteries 1420 which are charged from AC mains by a battery charger 1410 or by DC current received via one or both SIU 1300 via bi-directional power bus 1210 from one or more of the various data communication nodes, such as nodes 1104, 1106, 1240–1270 or from the power bus power supply module 1140.

Power bus power supply module 1140 comprises one or more internal power supplies 1330 which are associated with PSC 1345 whose structure and operation is described hereinto below with reference to FIG. 25B–FIG. 25C. Power bus power supply module 1140 is preferably provided with a pair of SIUs 1300, located at input and output ring ports of power bus power supply module 1140. Power bus power supply module 1140 typically is operable to supply power to bi-directional power bus 1210 of power spine node 1150 for distribution as required. PSC 1345 preferably is responsive in combination with internal power supply 1330 to outputs from power pooling controller 1230 transmitted over the data portion of bi-directional power bus 1210 to control the amount of power supplied to bi-directional power bus 1210 by internal power supply 1330 in order to participate optimally in the power sharing community.

Power pooling controller 1230 is preferably a logic-based controller. A preferred embodiment thereof is described hereinto below with reference to FIG. 21D.

FIG. 18B illustrates a communications system of the type illustrated in FIG. 17, comprising a power spine node 1150, which preferably provides power community functionality among a plurality of data communication nodes, which preferably, but not necessarily, each have their own internal power supplies which are connected directly to AC mains at a outlet strip 1120.

Examples of such data communication nodes include an Ethernet switch 1104 and an Ethernet switch having power over Ethernet functionality 1106. Preferably, Ethernet switch having power over Ethernet functionality 1106 conforms to IEEE 803.2af standard. Other data communication nodes that may be in operative engagement with power spine node 1150 include router 1240, a bridge 1250, a file server 1260 and an IP phone gateway 1270. One or more of the various data communication nodes, such as nodes 1104, 1106, 1240, 1260 and 1270 as well as power bus power supply module 1140 and battery pack 1108 are each, individually, connected to AC power mains, typically via outlet strip 1120. No connection is illustrated between bridge 1250 and outlet strip 1120, since bridge 1250 receives power exclusively from power spine node 1150 in accordance with the principle of the current invention.

Power spine node 1150 preferably comprises a bi-directional power bus designated generally by reference numeral 1210 which interconnects data communication nodes in a ring topology, preferably via respective input and output supply interface units (SIUs) 1300, each SIU 1300 being associated with one of the various data communication nodes, such as nodes 1104, 1106, 1240–1270, and permits power sharing therebetween. Bi-directional power bus 1210 is connected to the individual SIU 1300, thus bus protection is not provided by SIU 1300, however failure of a single SIU 1300 does not compromise bi-directional power bus 1210. In one embodiment, each SIU 1300 is located within the data communication node with which it is associated. In another embodiment, one or more SIUs 1300 are collocated within power spine node 1150, without exceeding the scope of the invention. In yet another embodiment, one or more SIUs 1300 are physically collocated on bi-directional power bus 1210, without exceeding the scope of the invention. Bi-directional power bus 1210 preferably also connects the various data communication nodes to power bus power supply module 1140 and to battery pack 1108 providing back up battery power as well as peak power. Power bus power supply module 1140 and battery pack 1108 may be mounted on the same rack as one or more of nodes 1104, 1106, 1240–1270 or may be located elsewhere.

Bi-directional power bus 1210 comprises a data portion and a power portion. Operation of bi-directional power bus 1210 is preferably governed by a power pooling controller 1230 which monitors and controls energy flows through power bus 1210 between the various data communication nodes modules, such as nodes 1104, 1106, 1240–1270, power bus power supply module 1140 and battery pack 1108 in a manner to be described further hereinto below over the data portion of bi-directional power bus 1210. Preferably, power spine node 1150, all of the various data communication nodes 1104, 1106, 1240–1270 as well as power bus power supply module 1140 and battery pack 1108 are each, individually, connected to a LAN/WAN 1022. Power pooling controller 1230 communicates via the power spine node 1150 Ethernet connection with LAN/WAN 1022.

Ethernet switch having power over Ethernet functionality 1106 preferably comprises power over Ethernet circuitry 1320, which governs the supply of electrical power over the LAN/WAN 1022, Ethernet switch circuitry 1325 which performs Ethernet communication switching, and an internal power supply 1330, which receives AC mains power from outlet strip 1120 and which preferably, but not necessarily, is insufficient for peak power requirements of Ethernet switch having power over Ethernet functionality 1106. Internal power supply 1330 preferably includes power sharing circuit (PSC) 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Both power over Ethernet circuitry 1320 and Ethernet switch circuitry 1325 receive DC power over internal power bus 1350. DC power is supplied by internal power supply 1330 and/or by bi-directional power bus 1210 via SIU 1300, located at a ring port of Ethernet switch having power over Ethernet functionality 1106, which are coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1104 and 1240–1270 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Router 1240 preferably comprises router circuitry 1360, which routes communication messages to and from the LAN/WAN 1022, and an internal power supply 1330, which receives AC mains power from outlet strip 1120 and which preferably, but not necessarily, is insufficient for peak power requirements of router 1240. Internal power supply 1330 preferably is connected to an internal power bus 1350 via PSC 1345, whose structure and operation is described hereinto below with reference to FIG. 25B–FIG. 25C. PSC 1345 preferably is responsive to outputs from power pooling controller 1230 transmitted over the data portion of bi-directional power bus 1210 via the data portion of internal power bus 1350 to limit the power output of power supply 1330 reaching internal power bus 1350 in order to participate optimally in the power sharing community.

Router circuitry 1360 receives DC power over internal power bus 1350 from internal power supply 1330 via PSC 1345 and/or from bi-directional power bus 1210 via SIU 1300 located at a ring port of router 1240, which are each coupled to a section of bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive to outputs from power pooling controller 1230 transmitted over the data portion of bi-directional power bus 1210 and the data portion of internal power bus 1350, provides DC power via SIU 1300 and bi-directional power bus 1210 to any other suitable one or more of the various data communication nodes, such as nodes 1104, 1106, 1250–1270, as well as to battery pack 1108.

Bridge 1250 preferably comprises bridging circuitry 1370, which performs a bridging functionality on communication messages to and from the LAN/WAN 1022. It is a particular feature of the present invention that the bridge 1250 need not contain an internal power supply. Rather, in accordance with a preferred embodiment of the present invention, bridge circuitry 1370 receives DC power over an internal power bus 1350 from bi-directional power bus 1210 via SIU 1300 located at a ring port of bridge 1250, which is coupled to bi-directional power bus 1210. Bi-directional power bus 1210 receives power from battery pack 1108, power bus power supply module 1140, and/or any of the internal power supplies of the other communication nodes connected to bi-directional power bus 1210.

File server 1260 preferably comprises file server circuitry 1380 which serves communication messages over the LAN/WAN 1022, and an internal power supply 1330, which receives AC mains power from outlet strip 1120 and which preferably, but not necessarily, is insufficient for peak power requirements of file server 1260. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

File server circuitry 1380 receives DC power over internal power bus 1350. DC power is supplied by internal power supply 1330 and/or by bi-directional power bus 1210 via SIU 1300, located at a ring port of file server 1260, and SIU 1300 is coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1104, 1106, 1240, 1250 and 1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Switch 1104 preferably comprises Ethernet switch circuitry 1325 which switches communication messages over LAN/WAN 1022, and internal power supply 1330, which receives AC mains power from outlet strip 1120 and which preferably, but not necessarily, is insufficient for peak power requirements of switch 1104. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Ethernet switch circuitry 1325 receives DC power over internal power bus 1350. DC power is supplied by internal power supply 1330 and/or by bi-directional power bus 1210 via SIU 1300, located at a ring port of switch 1325, and SIU 1300 is coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1106 and 1240–1270 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

IP phone gateway 1270 preferably comprises gateway circuitry 1400, which manages communication messages over the LAN/WAN 1022, and internal power supply 1330, which receives AC mains power from outlet strip 1120 and which preferably, but not necessarily, is insufficient for peak power requirements of IP phone gateway 1270. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Gateway circuitry 1400 receives DC power over internal power bus 1350. DC power is supplied by internal power supply 1330 and/or by bi-directional power bus 1210 via SIU 1300, located at a ring port of IP phone gateway 1270, and SIU 1300 is coupled to bi-directional power bus 1210. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1104, 1106 and 1240–1260 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Battery pack 1108 is in an exemplary embodiment a rechargeable battery pack and is preferably provided with SIU 1300, located at a ring port of battery pack 1108. Battery pack 1108 comprises multiple rechargeable batteries 1420 which are charged from AC mains by a battery charger 1410 or by DC current received via SIU 1300 via bi-directional power bus 1210 from one or more of the various data communication nodes, such as nodes 1104, 1106, 1240–1270 or from the power bus power supply module 1140.

Power bus power supply module 1140 comprises one or more internal power supplies 1330 which are associated with PSC 1345 whose structure and operation is described hereinto below with reference to FIG. 25B–FIG. 25C. Power bus power supply module 1140 is preferably provided with SIU 1300, located at a ring port of power bus power supply module 1140. Power bus power supply module 1140 typically is operable to supply power to bi-directional power bus 1210 of power spine node 1150 for distribution as required.

PSC 1345 preferably is responsive in combination with internal power supply 1330 to outputs from power pooling controller 1230 transmitted over the data portion of bi-directional power bus 1210 to control the amount of power supplied to bi-directional power bus 1210 by internal power supply 1330 in order to participate optimally in the power sharing community.

Power pooling controller 1230 is preferably a logic-based controller. A preferred embodiment thereof is described hereinto below with reference to FIG. 21D.

It is appreciated that the embodiments of FIGS. 18A and 18B which illustrate a ring topology, are applicable equally to single ring and multiple ring topologies.

Figure 19A:
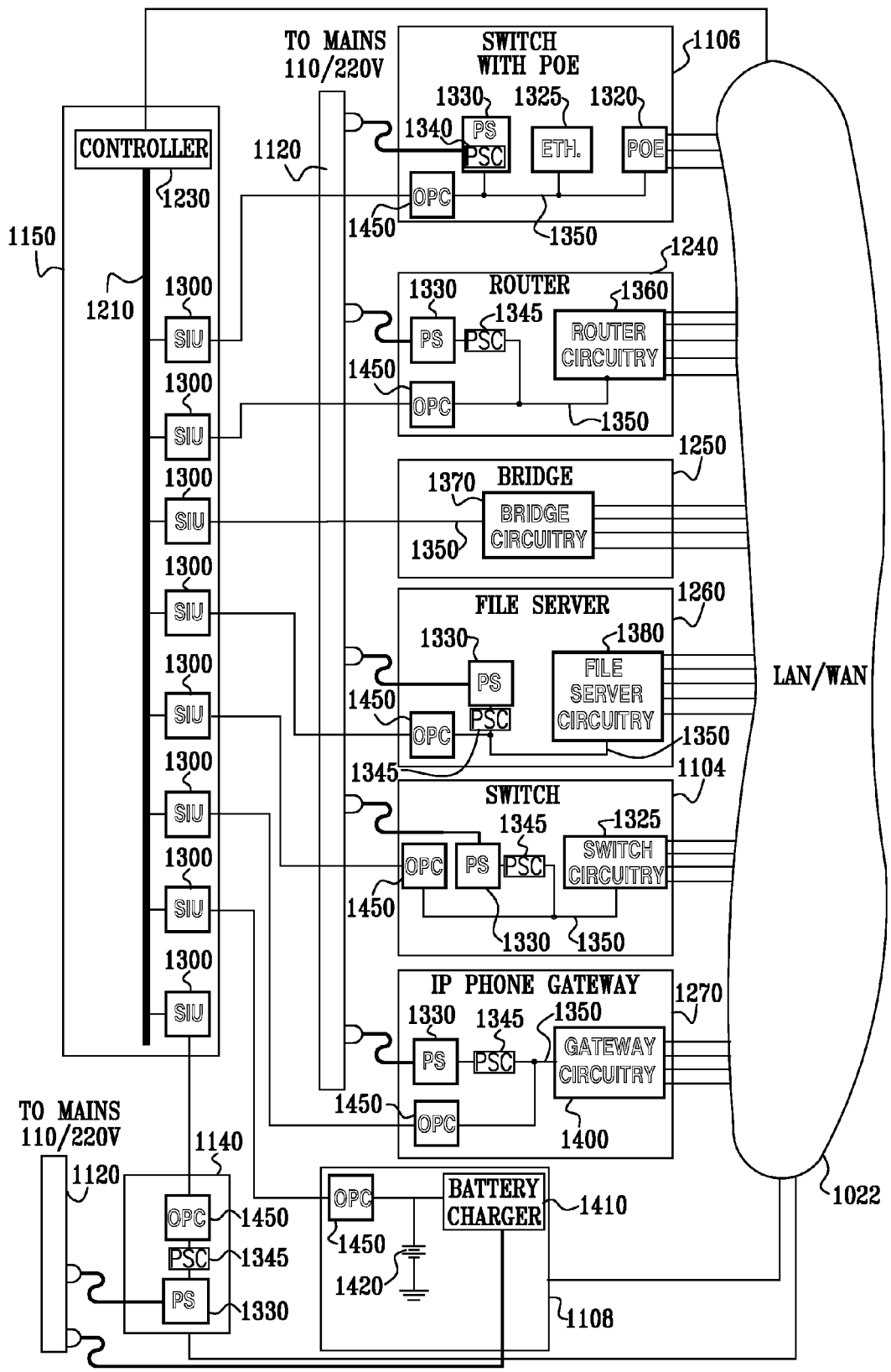
FIGS. 19A and 19B are simplified block diagram illustrations of two alternative embodiments of a system of the type shown in FIG. 17 constructed and operative in a star topology and providing power distribution.
Figure 19B:
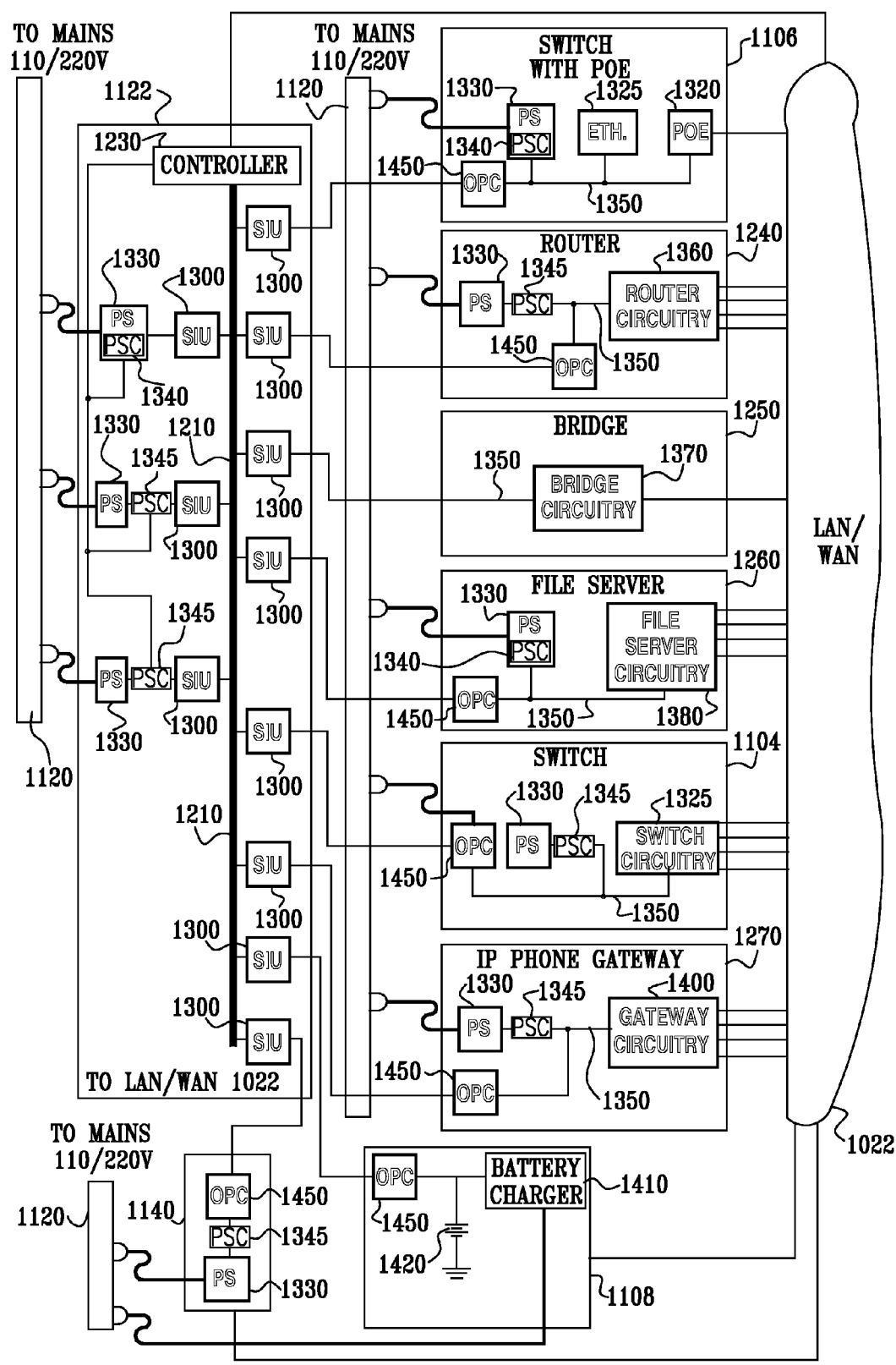

Reference is now made to FIGS. 19A and 19B, which are simplified block diagram illustrations of two alternative embodiments of a communications system of the type shown in FIG. 17 constructed and operative in a star topology as shown in FIGS. 11 and 13A, respectively, and providing power distribution.

FIG. 19A illustrates a communications system of the type illustrated in FIG. 17, constructed and operative in a star topology as shown in FIG. 13A, comprising power spine node 1150, which preferably provides power community functionality among a plurality of data communication nodes, which preferably, but not necessarily, each have their own internal power supplies which are connected directly to AC mains at a outlet strip 1120.

Examples of such data communication nodes include an Ethernet switch 1104 and an Ethernet switch having power over Ethernet functionality 1106. Preferably, Ethernet switch having power over Ethernet functionality 1106 conforms to IEEE 803.2af standard. Other data communication nodes that may be in operative engagement with power spine node 1150 include router 1240, a bridge 1250, a file server 1260 and an IP phone gateway 1270. One or more of the various data communication nodes, such as nodes 1104, 1106, 1240, 1260 and 1270 as well as power bus power supply module 1140 and battery pack 1108 are each, individually, connected to AC power mains, typically via outlet strip 1120. No connection is illustrated between bridge 1250 and outlet strip 1120, since bridge 1250 receives power exclusively from power spine node 1150 in accordance with the principle of the current invention.

Power spine node 1150 preferably comprises a bi-directional power bus designated generally by reference numeral 1210 which interconnects data communication nodes in a star topology, preferably via a respective SIU 1300, each SIU 1300 being associated with one of the various data communication nodes, such as nodes 1104, 1106, 1240–1270, and permits power sharing therebetween. In one embodiment, each SIU 1300 is located within the data communication node with which it is associated. In another embodiment, one or more SIUs 1300 are collocated within power spine node 1150, without exceeding the scope of the invention. In yet another embodiment, one or more SIUs 1300 are physically collocated on bi-directional power bus 1210, without exceeding the scope of the invention. Bi-directional power bus 1210 preferably also connects the various data communication nodes to power bus power supply module 1140 and to battery pack 1108 providing back up battery power as well as peak power. Power bus power supply module 1140 and battery pack 1108 may be mounted on the same rack as one or more of nodes 1104, 1106, 1240–1270 or may be located elsewhere.

Bi-directional power bus 1210 comprises a data portion and a power portion. Operation of bi-directional power bus 1210 is preferably governed by power pooling controller 1230 which monitors and controls energy flows through the bus between the various data communication nodes modules, such as nodes 1104, 1106, 1240–1270, power bus power supply module 1140 and battery pack 1108 in a manner to be described further hereinto below over the data portion of bi-directional power bus 1210. Preferably, power spine node 1150, all of the various data communication nodes 1104, 1106, 1240–1270 as well as power bus power supply module 1140 and battery pack 1108 are each, individually, connected to a LAN/WAN 1022. Power pooling controller 1230 communicates via the power spine node 1150 Ethernet connection with LAN/WAN 1022.

Ethernet switch having power over Ethernet functionality 1106 preferably comprises power over Ethernet circuitry 1320, which governs the supply of electrical power over the LAN/WAN 1022, Ethernet switch circuitry 1325 which performs Ethernet communication switching, and an internal power supply 1330, which receives AC mains power from outlet strip 1120 and which preferably, but not necessarily, is insufficient for peak power requirements of Ethernet switch having power over Ethernet functionality 1106. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Both power over Ethernet circuitry 1320 and Ethernet switch circuitry 1325 receive DC power over internal power bus 1350. DC power is supplied by internal power supply 1330 and/or by bi-directional power bus 1210 via SIU 1300 through overcurrent protection circuit (OPC) 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via OPC 1450, to SIU 1300 and via bi-directional power bus 1210 to any other suitable one or more of the various data communication nodes, such as nodes 1104 and 1240–1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Router 1240 preferably comprises router circuitry 1360, which routes communication messages to and from the LAN/WAN 1022, and an internal power supply 1330, which receives AC mains power from outlet strip 1120 and which preferably, but not necessarily, is insufficient for peak power requirements of router 1240. Internal power supply 1330 preferably is connected to an internal power bus 1350 via PSC 1345, whose structure and operation is described hereinto below with reference to FIG. 25B–FIG. 25C. PSC 1345 preferably is responsive to outputs from power pooling controller 1230 transmitted over the data portion of bi-directional power bus 1210 via the data portion of internal power bus 1350 to limit the power output of power supply 1330 reaching internal power bus 1350 in order to participate optimally in the power sharing community.

Router circuitry 1360 receives DC power over internal power bus 1350. DC power is supplied by internal power supply 1330 and/or by bi-directional power bus 1210 via SIU 1300 through overcurrent protection circuit (OPC) 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140 and/or any of the internal power supplies of the other communication nodes connected to bi-directional power bus 1210.

Internal power supply 1330, responsive to outputs from power pooling controller 1230 transmitted over the data portion of bi-directional power bus 1210 and the data portion of internal power bus 1350, provides DC power via OPC 1450 through SIU 1300 and bi-directional power bus 1210 to any other suitable one or more of the various data communication nodes, such as nodes 1104, 1106, 1250–1270, as well as to battery pack 1108.

Bridge 1250 preferably comprises bridging circuitry 1370, which performs a bridging functionality on communication messages to and from the LAN/WAN 1022. It is a particular feature of the present invention that the bridge 1250 need not contain an internal power supply. Rather, in accordance with a preferred embodiment of the present invention, bridge circuitry 1370 receives DC power over an internal power bus 1350 from bi-directional power bus 1210 via SIU 1300 located at a port of bridge 1250, which is coupled to bi-directional power bus 1210. Bi-directional power bus 1210 receives power from battery pack 1108, power bus power supply module 1140, and/or any of the internal power supplies of the other communication nodes connected to bi-directional power bus 1210.

File server 1260 preferably comprises file server circuitry 1380 which serves communication messages over the LAN/WAN 1022, and an internal power supply 1330, which receives AC mains power from outlet strip 1120 and which preferably, but not necessarily, is insufficient for peak power requirements of file server 1260. Internal power supply 1330 is connected to internal power bus 1350 through PSC 1345, whose structure and operation is described hereinto below with reference to FIGS. 25B–25C. PSC 1345, preferably, is responsive to outputs from power pooling controller 1230 over the data portion of bi-directional power bus 1210 and a data portion of an internal power bus 1350 to govern the amount of power supplied by power supply 1330 to internal power bus 1350 in order to participate optimally in the power sharing community.

File server circuitry 1380 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1345 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1104, 1106, 1240, 1250 and 1270 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Switch 1104 preferably comprises Ethernet switch circuitry 1325 which switches communication messages over LAN/WAN 1022, and internal power supply 1330, which receives AC mains power from outlet strip 1120 and which preferably, but not necessarily, is insufficient for peak power requirements of switch 1104. Internal power supply 1330 preferably is connected to internal power bus 1350 through PSC 1345, whose structure and operation is described hereinto below with reference to FIGS. 25B–25C. PSC 1345, preferably, is responsive to outputs from power pooling controller 1230 over the data portion of bi-directional power bus 1210 and a data portion of an internal power bus 1350 to govern the output of power supply 1330 placed on internal power bus 1350 in order to participate optimally in the power sharing community.

Ethernet switch circuitry 1325 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1345 to outputs from power pooling controller 1230 transmitted over the data portion of bi-directional power bus 1210 and the data portion of internal power bus 1350, provides DC power via OPC 1450 through SIU 1300 and via bi-directional power bus 1210 to any other suitable one or more of the various data communication nodes, such as nodes 1106 and 1240–1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

IP phone gateway 1270 preferably comprises gateway circuitry 1400, which manages communication messages over the LAN/WAN 1022, and internal power supply 1330, which receives AC mains power from outlet strip 1120 and which preferably, but not necessarily, is insufficient for peak power requirements of IP phone gateway 1270. Internal power supply 1330 preferably has its output connected through PSC 1345, whose structure and operation is described hereinto below with reference to FIGS. 25B–25C. PSC 1345, preferably, is responsive to outputs from power pooling controller 1230 over the data portion of bi-directional power bus 1210 and a data portion of an internal power bus 1350 to govern the output of power supply 1330 placed on internal power bus 1350 in order to participate optimally in the power sharing community.

Gateway circuitry 1400 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140 and/or any of the internal power supplies of the other communication nodes connected to bi-directional power bus 1210.

Internal power supply 1330, responsive in combination with PSC 1345 to outputs from power pooling controller 1230 transmitted over the data portion of bi-directional power bus 1210 and the data portion of internal power bus 1350, provides DC power via OPC 1450 through SIU 1300 and via bi-directional power bus 1210 to any other suitable one or more of the various data communication nodes, such as nodes 1104, 1106 and 1240–1260 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Battery pack 1108 is in an exemplary embodiment a rechargeable battery pack and is preferably provided with OPC 1450, located at a port of battery pack 1108. Battery pack 1108 comprises multiple rechargeable batteries 1420 which are charged from AC mains by a battery charger 1410 or by DC current received via OPC 1450 through SIU 1300 via bi-directional power bus 1210 from one or more of the various data communication nodes, such as nodes 1104, 1106, 1240–1270 or from the power bus power supply module 1140.

Power bus power supply module 1140 comprises one or more internal power supplies 1330 which are associated with PSC 1345 whose structure and operation is described hereinto below with reference to FIG. 25B–FIG. 25C. Power bus power supply module 1140 is preferably provided with OPC 1450, located at a port of power bus power supply module 1140. Power bus power supply module 1140 typically is operable to supply power to bi-directional power bus 1210 through OPC 1450 and SIU 1300 to power spine node 1150 for distribution as required. PSC 1345 preferably is responsive in combination with internal power supply 1330 to outputs from power pooling controller 1230 transmitted over the data portion of bi-directional power bus 1210 to control the amount of power supplied to bi-directional power bus 1210 by internal power supply 1330 in order to participate optimally in the power sharing community.

Power pooling controller 1230 is preferably a logic-based controller. A preferred embodiment thereof is described hereinto below with reference to FIG. 21D.

FIG. 19B illustrates a communications system of the type illustrated in FIG. 17, constructed and operative in a star topology as shown in FIG. 11, comprising power spine module 1122, which preferably provides power community functionality among a plurality of data communication nodes, which preferably, but not necessarily, each have their own internal power supplies which are connected directly to AC mains at a outlet strip 1120.

Examples of such data communication nodes include an Ethernet switch 1104 and an Ethernet switch having power over Ethernet functionality 1106. Preferably, Ethernet switch having power over Ethernet functionality 1106 conforms to IEEE 803.2af standard. Other data communication nodes that may be in operative engagement with power spine module 1122 include router 1240, a bridge 1250, a file server 1260 and an IP phone gateway 1270. One or more of the various data communication nodes, such as nodes 1104, 1106, 1240, 1260 and 1270 as well as power bus power supply module 1140 and battery pack 1108 are each, individually, connected to AC power mains, typically via outlet strip 1120. No connection is illustrated between bridge 1250 and outlet strip 1120, since bridge 1250 receives power exclusively from power spine module 1122 in accordance with the principle of the current invention.

Power spine module 1122 preferably comprises a bi-directional power bus designated generally by reference numeral 1210 which interconnects data communication nodes in a star topology, preferably via a respective SIU 1300, each SIU 1300 being associated with one of the various data communication nodes, such as nodes 1104, 1106, 1240–1270, and permits power sharing therebetween. In one embodiment, each SIU 1300 is located within the data communication node with which it is associated. In another embodiment, one or more SIUs 1300 are collocated within power spine module 1122, without exceeding the scope of the invention. In yet another embodiment, one or more SIUs 1300 are physically collocated on bi-directional power bus 1210, without exceeding the scope of the invention. Bi-directional power bus 1210 preferably also connects the various data communication nodes to power bus power supply module 1140 and to battery pack 1108 providing back up battery power as well as peak power. Power bus power supply module 1140 and battery pack 1108 may be mounted on the same rack as one or more of nodes 1104, 1106, 1240–1270 or may be located elsewhere.

Bi-directional power bus 1210 comprises a data portion and a power portion. Operation of bi-directional power bus 1210 is preferably governed by power pooling controller 1230 which monitors and controls energy flows through the bus between the various data communication nodes modules, such as nodes 1104, 1106, 1240–1270, power bus power supply module 1140 and battery pack 1108 in a manner to be described further hereinto below over the data portion of bi-directional power bus 1210. Preferably, power spine module 1122, all of the various data communication nodes 1104, 1106, 1240–1270 as well as power bus power supply module 1140 and battery pack 1108 are each, individually, connected to a LAN/WAN 1022. Power pooling controller 1230 communicates via the power spine module 1122 Ethernet connection with LAN/WAN 1022.

Power spine module 1122 further comprises one or more internal power supplies 1330, which receives AC mains power from outlet strip 1120. The output of internal power supply 1330 is coupled to bi-directional power bus 1210 through an associated SIU 1300. In one embodiment internal power supply 1330 comprises PSC 1340 whose structure and operation is described hereinto below with reference to FIG. 25A. PSC 1340, preferably, is responsive to outputs from power pooling controller 1230 over the data portion of bi-directional power bus 1210 to govern the output of internal power supply 1330 in order to participate optimally in the power sharing community. In another embodiment internal power supply 1330 preferably is connected to SIU 1300 and from there to bi-directional power bus 1210 via PSC 1345, whose structure and operation is described hereinto below with reference to FIG. 25B–FIG. 25C. PSC 1345 preferably is responsive to outputs from power pooling controller 1230 transmitted over the data portion of bi-directional power bus 1210 to limit the power output of internal power supply 1330 reaching SIU 1300 and subsequently bi-directional power bus 1210 in order to participate optimally in the power sharing community.

Ethernet switch having power over Ethernet functionality 1106 preferably comprises power over Ethernet circuitry 1320, which governs the supply of electrical power over the LAN/WAN 1022, Ethernet switch circuitry 1325 which performs Ethernet communication switching, and an internal power supply 1330, which receives AC mains power from outlet strip 1120 and which preferably, but not necessarily, is insufficient for peak power requirements of Ethernet switch having power over Ethernet functionality 1106. Internal power supply 1330 preferably includes PSC 1340, whose structure and operation is described hereinto below with reference to FIG. 25A. PSC 1340, preferably, is responsive to outputs from power pooling controller 1230 over the data portion of bi-directional power bus 1210 and a data portion of an internal power bus 1350 to govern the output of power supply 1330 in order to participate optimally in the power sharing community.

Both power over Ethernet circuitry 1320 and Ethernet switch circuitry 1325 receive DC power over internal power bus 1350. DC power is supplied by internal power supply 1330 and/or by bi-directional power bus 1210 via SIU 1300 through overcurrent protection circuit (OPC) 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140, one or more internal power supply 1330 of power spine module 1122 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via OPC 1450, to SIU 1300 and via bi-directional power bus 1210 to any other suitable one or more of the various data communication nodes, such as nodes 1104 and 1240–1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Router 1240 preferably comprises router circuitry 1360, which routes communication messages to and from the LAN/WAN 1022, and an internal power supply 1330, which receives AC mains power from outlet strip 1120 and which preferably, but not necessarily, is insufficient for peak power requirements of router 1240. Internal power supply 1330 preferably is connected to an internal power bus 1350 via PSC 1345, whose structure and operation is described hereinto below with reference to FIG. 25B–FIG. 25C. PSC 1345 preferably is responsive to outputs from power pooling controller 1230 transmitted over the data portion of bi-directional power bus 1210 via the data portion of internal power bus 1350 to limit the power output of power supply 1330 reaching internal power bus 1350 in order to participate optimally in the power sharing community.

Router circuitry 1360 receives DC power over internal power bus 1350. DC power is supplied by internal power supply 1330 and/or by bi-directional power bus 1210 via SIU 1300 through overcurrent protection circuit (OPC) 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140, one or more internal power supply 1330 of power spine module 1122 and/or any of the internal power supplies of the other communication nodes connected to bi-directional power bus 1210.

Internal power supply 1330, responsive to outputs from power pooling controller 1230 transmitted over the data portion of bi-directional power bus 1210 and the data portion of internal power bus 1350, provides DC power via OPC 1450 through SIU 1300 and bi-directional power bus 1210 to any other suitable one or more of the various data communication nodes, such as nodes 1104, 1106, 1250–1270, as well as to battery pack 1108.

Bridge 1250 preferably comprises bridging circuitry 1370, which performs a bridging functionality on communication messages to and from the LAN/WAN 1022. It is a particular feature of the present invention that the bridge 1250 need not contain an internal power supply. Rather, in accordance with a preferred embodiment of the present invention, bridge circuitry 1370 receives DC power over an internal power bus 1350 from bi-directional power bus 1210 via SIU 1300 located at a port of bridge 1250, which is coupled to bi-directional power bus 1210. Bi-directional power bus 1210 receives power from battery pack 1108, power bus power supply module 1140, one or more internal power supply 1330 of power spine module 1122 and/or any of the internal power supplies of the other communication nodes connected to bi-directional power bus 1210.

File server 1260 preferably comprises file server circuitry 1380 which serves communication messages over the LAN/WAN 1022, and an internal power supply 1330, which receives AC mains power from outlet strip 1120 and which preferably, but not necessarily, is insufficient for peak power requirements of file server 1260. Internal power supply 1330 preferably comprises PSC 1340, whose structure and operation is described hereinto below with reference to FIG. 25A, and is connected to internal power bus 1350. PSC 1340, preferably, is responsive to outputs from power pooling controller 1230 over the data portion of bi-directional power bus 1210 and a data portion of an internal power bus 1350 to govern the amount of power supplied by power supply 1330 to internal power bus 1350 in order to participate optimally in the power sharing community.

File server circuitry 1380 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140, one or more internal power supply 1330 of power spine module 1122 and/or any of the internal power supplies of the other communication nodes connected to bi-directional power bus 1210.

Internal power supply 1330, responsive in combination with PSC 1340 to outputs from power pooling controller 1230 transmitted over the data portion of bi-directional power bus 1210 and the data portion of internal power bus 1350, provides DC power via SIU 1300 and via bi-directional power bus 1210 to any other suitable one or more of the various data communication nodes, such as nodes 1104, 1106, 1240, 1250 and 1270 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Switch 1104 preferably comprises Ethernet switch circuitry 1325 which switches communication messages over LAN/WAN 1022, and internal power supply 1330, which receives AC mains power from outlet strip 1120 and which preferably, but not necessarily, is insufficient for peak power requirements of switch 1104. Internal power supply 1330 preferably is connected to internal power bus 1350 through PSC 1345, whose structure and operation is described hereinto below with reference to FIGS. 25B–25C. PSC 1345, preferably, is responsive to outputs from power pooling controller 1230 over the data portion of bi-directional power bus 1210 and a data portion of an internal power bus 1350 to govern the output of power supply 1330 placed on internal power bus 1350 in order to participate optimally in the power sharing community.

Ethernet switch circuitry 1325 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140, one or more internal power supplies 1330 of power spine module 1122 and/or any of the internal power supplies of the other communication nodes connected to bi-directional power bus 1210.

Internal power supply 1330, responsive in combination with PSC 1345 to outputs from power pooling controller 1230 transmitted over the data portion of bi-directional power bus 1210 and the data portion of internal power bus 1350, provides DC power via OPC 1450 through SIU 1300 and via bi-directional power bus 1210 to any other suitable one or more of the various data communication nodes, such as nodes 1106 and 1240–1270 as well as to battery pack 1108.

Preferably, SIU 1300 provides fault tolerant performance by limiting the amount of current passing therethrough, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

IP phone gateway 1270 preferably comprises gateway circuitry 1400, which manages communication messages over the LAN/WAN 1022, and internal power supply 1330, which receives AC mains power from outlet strip 1120 and which preferably, but not necessarily, is insufficient for peak power requirements of IP phone gateway 1270. Internal power supply 1330 preferably has its output connected through PSC 1345, whose structure and operation is described hereinto below with reference to FIGS. 25B–25C. PSC 1345, preferably, is responsive to outputs from power pooling controller 1230 over the data portion of bi-directional power bus 1210 and a data portion of an internal power bus 1350 to govern the output of power supply 1330 placed on internal power bus 1350 in order to participate optimally in the power sharing community.

Gateway circuitry 1400 receives DC power over internal power bus 1350. DC power is supplied by internal power supply 1330 and/or by bi-directional power bus 1210 via SIU 1300 through OPC 1450, located at a port of Ethernet switch having power over Ethernet functionality 1106, which are coupled to bi-directional power bus 1210. OPC 1450, which will be described further hereinto below with respect to FIG. 21F, functions as a data buffer between the data portion of bi-directional power bus 1210 and the data portion of internal bus 1350, and to prevent excess current flows between bi-directional power bus 1210 and internal bus 1350. Bi-directional power bus 1210 receives power from battery pack 1108, power bus power supply module 1140, one or more internal power supplies 1330 of power spine module 1122 and/or any of the internal power supplies of the other communication nodes connected to bi-directional power bus 1210.

Internal power supply 1330, responsive in combination with PSC 1345 to outputs from power pooling controller 1230 transmitted over the data portion of bi-directional power bus 1210 and the data portion of internal power bus 1350, provides DC power via OPC 1450 through SIU 1300 and via bi-directional power bus 1210 to any other suitable one or more of the various data communication nodes, such as nodes 1104, 1106 and 1240–1260 as well as to battery pack 1108.

Preferably, SIU 1300 provides fault tolerant performance by limiting the amount of current passing there through, and in an exemplary embodiment provide a telemetry output representing the current level and direction. This telemetry output is preferably communicated via the data portion of bi-directional power bus 1210 to power pooling controller 1230, which instructs each SIU 1300 to limit or terminate the passage of current there through as appropriate.

Battery pack 1108 is in an exemplary embodiment a rechargeable battery pack and is preferably provided with OPC 1450, located at a port of battery pack 1108. Battery pack 1108 comprises multiple rechargeable batteries 1420 which are charged from AC mains by a battery charger 1410 or by DC current received via OPC 1450 through SIU 1300 via bi-directional power bus 1210 from one or more of the various data communication nodes, such as nodes 1104, 1106, 1240–1270, from one or more internal power supplies 1330 of power spine module 1122 or from the power bus power supply module 1140.

Power bus power supply module 1140 comprises one or more internal power supplies 1330 which are associated with PSC 1345 whose structure and operation is described hereinto below with reference to FIG. 25B–FIG. 25C. Power bus power supply module 1140 is preferably provided with OPC 1450, located at a port of power bus power supply module 1140. Power bus power supply module 1140 typically is operable to supply power to bi-directional power bus 1210 through OPC 1450 and SIU 1300 to power spine module 1122 for distribution as required. PSC 1345 preferably is responsive in combination with internal power supply 1330 to outputs from power pooling controller 1230 transmitted over the data portion of bi-directional power bus 1210 to control the amount of power supplied to bi-directional power bus 1210 by internal power supply 1330 in order to participate optimally in the power sharing community.

Power pooling controller 1230 is preferably a logic-based controller. A preferred embodiment thereof is described hereinbelow with reference to FIG. 21D.

It is appreciated that the embodiments of FIGS. 19A and 19B, which illustrate a star topology, are applicable equally to single star and multiple star topologies.

Figure 20A:
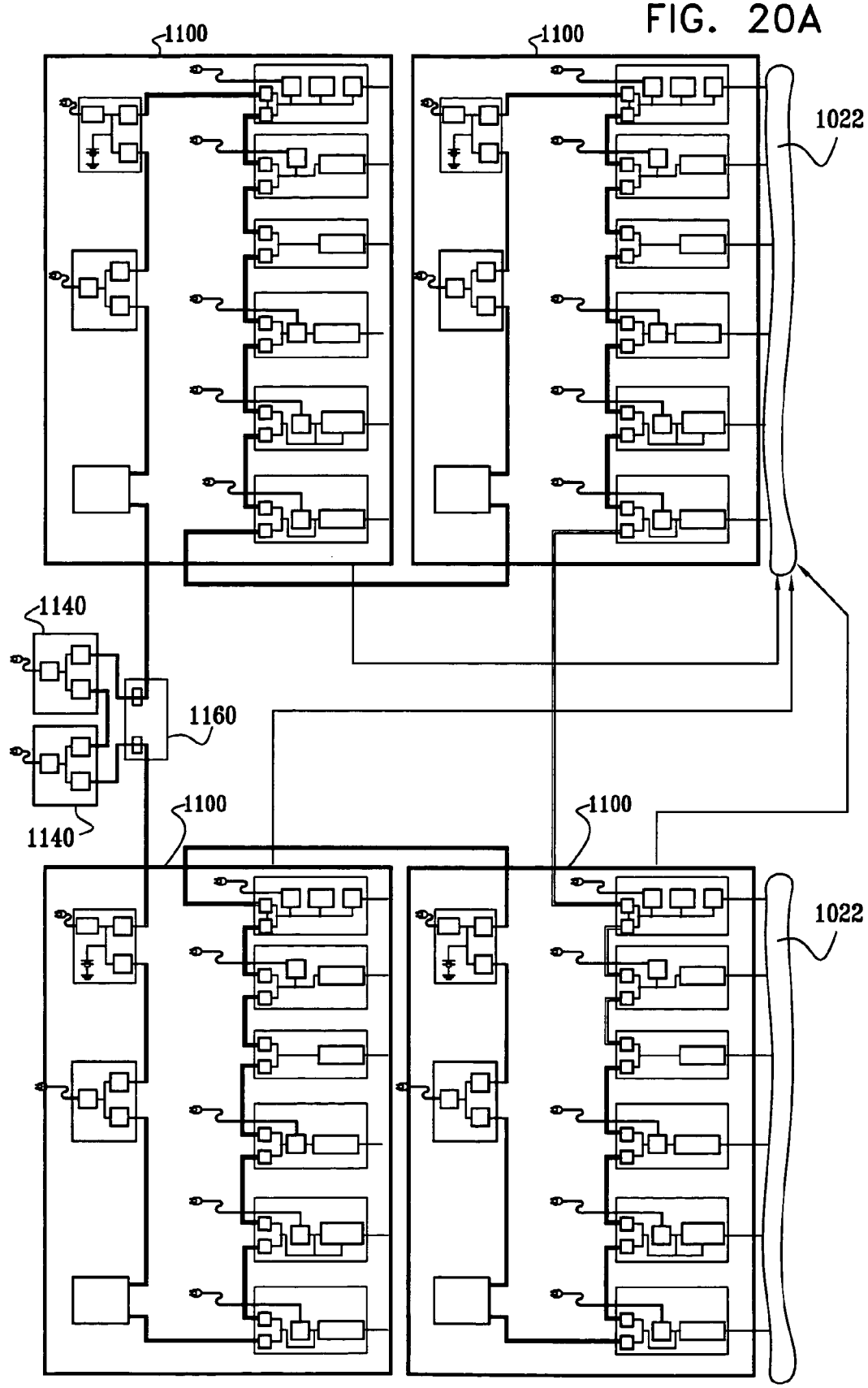

Reference is now made to FIG. 20A which is a simplified block diagram illustration of an embodiment of a system of the type shown in FIG. 15 and FIG. 18A constructed and operative in a hierarchical ring topology and providing power distribution in accordance with the principle of the invention. The system of FIG. 20A comprises a plurality of ring configuration communication subsystem racks 1100, each of the type described hereinabove with reference to FIG. 18A. Subsystem racks 1100 are interconnected in a ring configuration, preferably via a power spine interconnect node 1160 and are all preferably connected to LAN/WAN 1022. Power spine interconnect node 1160 is preferably also connected to at least one power bus power supply module 1140. It is appreciated that the embodiment of FIG. 20A which illustrates an hierarchical ring topology, is applicable equally to single hierarchical ring and multiple hierarchical ring topologies.

Reference is now made to FIG. 20B which is a simplified block diagram illustration of an embodiment of a system of the type shown in FIGS. 14, 16, and 19B constructed and operative in a hierarchical star topology and providing power distribution in accordance with the principle of the invention. The system of FIG. 20B comprises a plurality of star configuration communication subsystem racks 1100, each of the type described hereinabove with reference to FIG. 19B. Subsystem racks 1100 are interconnected in a star configuration, preferably via a power spine interconnect node 1160, which is of the type described hereinabove with reference to FIG. 19A, and are all preferably connected to LAN/WAN 1022. Power spine interconnect node 1160 is preferably also connected to at least one external battery pack 1108 to supply battery back up for all connected subsystem racks 1100. It is appreciated that the embodiment of FIG. 20B which illustrates a hierarchical star topology, is applicable equally to single hierarchical star and multiple hierarchical star topologies.

It is appreciated that the system of FIG. 20A or 20B enable a distributed UPS, because the failure of any power supply or mains does not cause the failure of any components. The bi-directional power bus supplies DC power to all components from any available source, including from battery pack 1108 (FIG. 20B) which is operable to supply power in the absence of mains power.

It is further appreciated that in the system of FIG. 20B, a node may be connected to more than one bus, however operationally only one controller is to be treated as a master controller for each node. Furthermore, in the event of multiple power supply busses, preferably a single controller acts as a master controller.

Reference is now made to FIGS. 21A, 21B, 21C, 21D and 21E, which are simplified block diagram illustrations of elements in the system illustrated in FIGS. 19A and 19B.

Figure 21A:
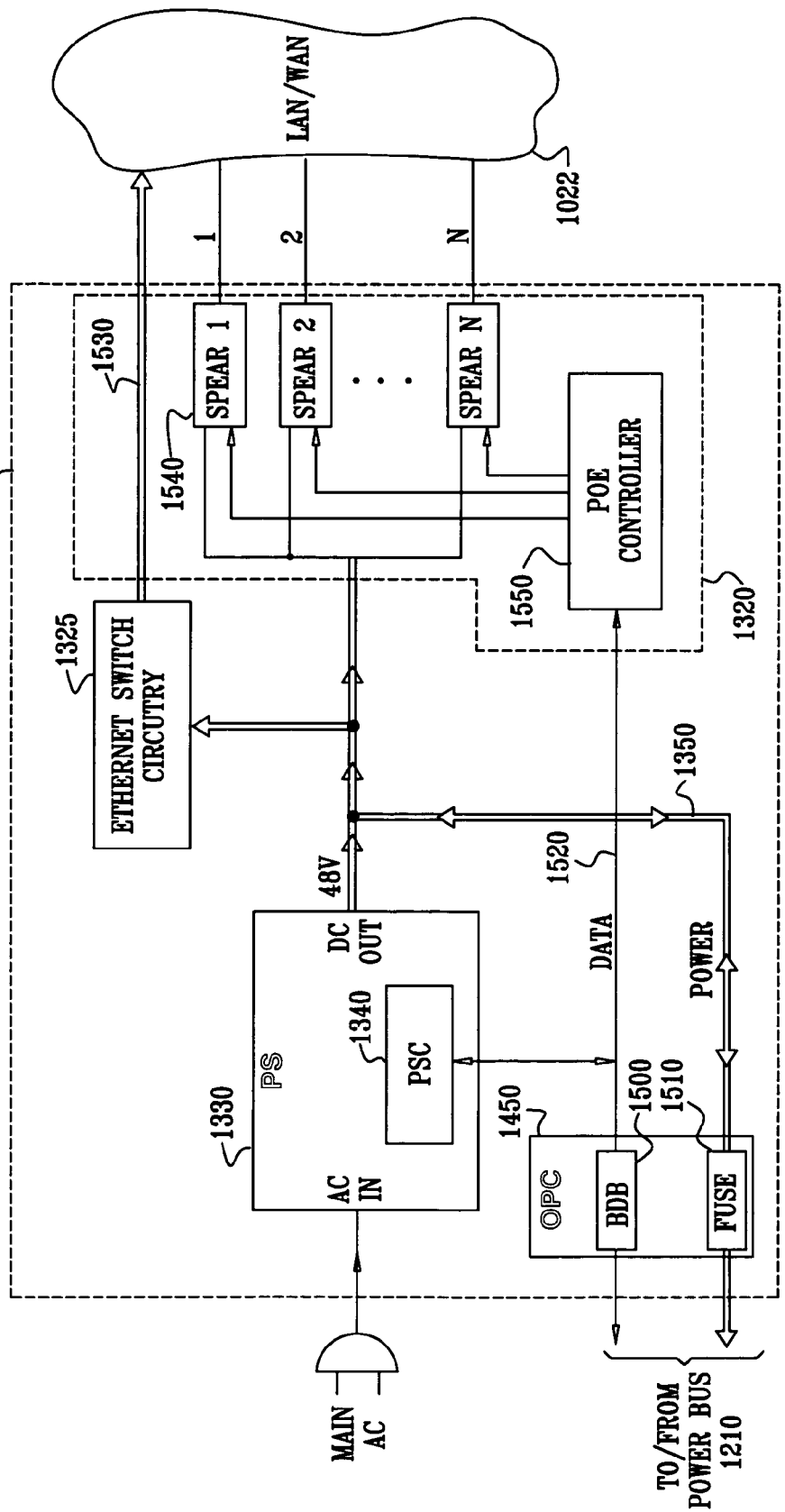
FIGS. 21A, 21B, 21C, 21D, 21E and 21F are simplified block diagram illustrations of elements in the system illustrated in FIGS. 19A and 19B.

As seen in FIG. 21A, Ethernet switch including power over Ethernet functionality 1106, preferably comprises power supply 1330, which receives mains AC power and provides a DC output, at a variable voltage, typically 48 volts. PSC 1340 governs the operation of power supply 1330 to vary the output voltage thereof in accordance with control data received from power pooling controller 1230 of power spine node 1150, or power spine module 1122, of FIG. 19A and FIG. 19B, respectively, via the data portion of bi-directional power bus 1210 in order to affect desired power sharing in accordance with a preferred embodiment of the present invention. PSC 1340 is further operable over data line 1520 to communicate the current status of power supply 1330 to power pooling controller 1230.

OPC 1450 comprises bidirectional data buffer (BDB) 1500 on a data line 1520 forming data portion of internal power bus 1350 and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210.

In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

Ethernet switch circuitry 1325 receives power from at least one and preferably both of power supply 1330 and bi-directional power bus 1210 via OPC 1450 over internal power bus 1350, and communicates via a data line 1530 to LAN/WAN 1022.

Power over Ethernet circuitry 1320 preferably is of the type described in U.S. Pat. No. 6,473,608 issued to Lehr et al., whose contents are incorporated herein by reference, and includes a Power over Ethernet (POE) controller 1550 which receives a data input, preferably along data line 1520, and provides control outputs to a plurality of SPEAR circuits 1540, which, in turn, receives power from at least one and preferably both of power supply 1330 and bi-directional power bus 1210 via OPC 1450 over internal power bus 1350, and which provide power outputs via LAN/WAN 1022 to those Ethernet nodes which require power, such as those illustrated, for example, in FIGS. 11, 12, 13A, 13B, and 17. POE controller 1550 is further operable over data line 1520 to communicate with power pooling controller 1230 regarding power requirements of power over Ethernet circuitry 1320.

Figure 21B:
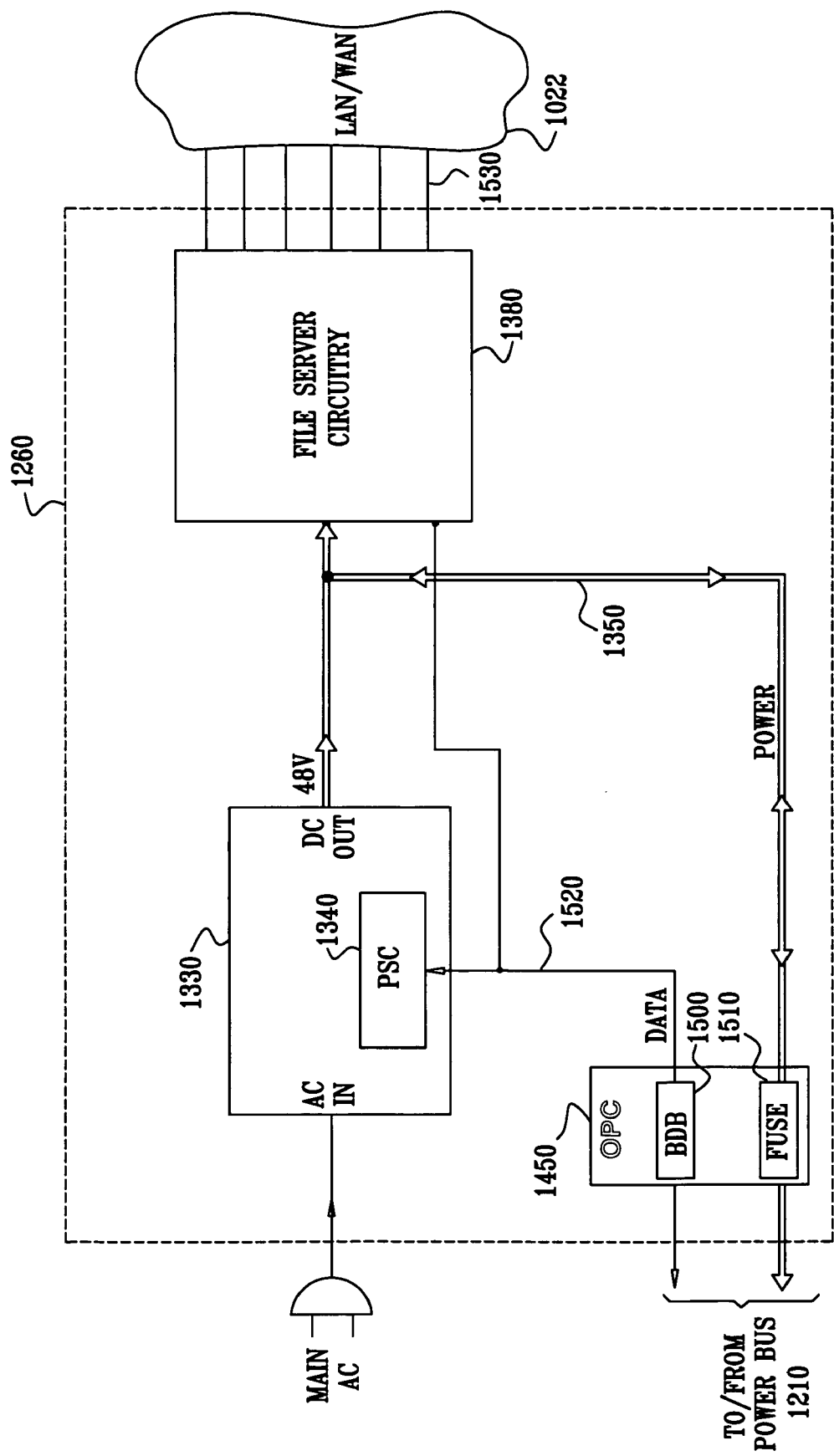

Reference is now made to FIG. 21B, which illustrates the general structure of file server 1260 of FIGS. 19A and 19B. File server 1260 comprises power supply 1330, which receives mains AC power and provides a DC output, at a variable voltage, typically 48 volts. PSC 1340 governs the operation of power supply 1330 to vary the output voltage thereof in accordance with control data received from power pooling controller 1230 via the data portion of power bus 1210 in order to affect desired power sharing in accordance with a preferred embodiment of the present invention. PSC 1340 is further operable over data line 1520 to communicate the current status of power supply 1330 to power pooling controller 1230.

OPC 1450 comprises bidirectional data buffer (BDB) 1500 on a data line 1520 forming data portion of internal power bus 1350 connecting OPC 1450 to PSC 1340, and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210. In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

File server circuitry 1380 receives power from at least one and preferably both of power supply 1330 and bi-directional power bus 1210 via OPC 1450 over internal power bus 1350, and communicates via a data line 1530 with LAN/WAN 1022. File server circuitry 1520 is further operable to communicate power requirements to power pooling controller 1230 over data line 1520. In an alternative embodiment, not shown, two datum selected from the current DC electrical power consuming needs, the current DC electrical power providing abilities and the current DC excess providing ability or shortfall are transmitted to power pooling controller 1230, thus advising power pooling controller 1230 of the current status.

Figure 21C:
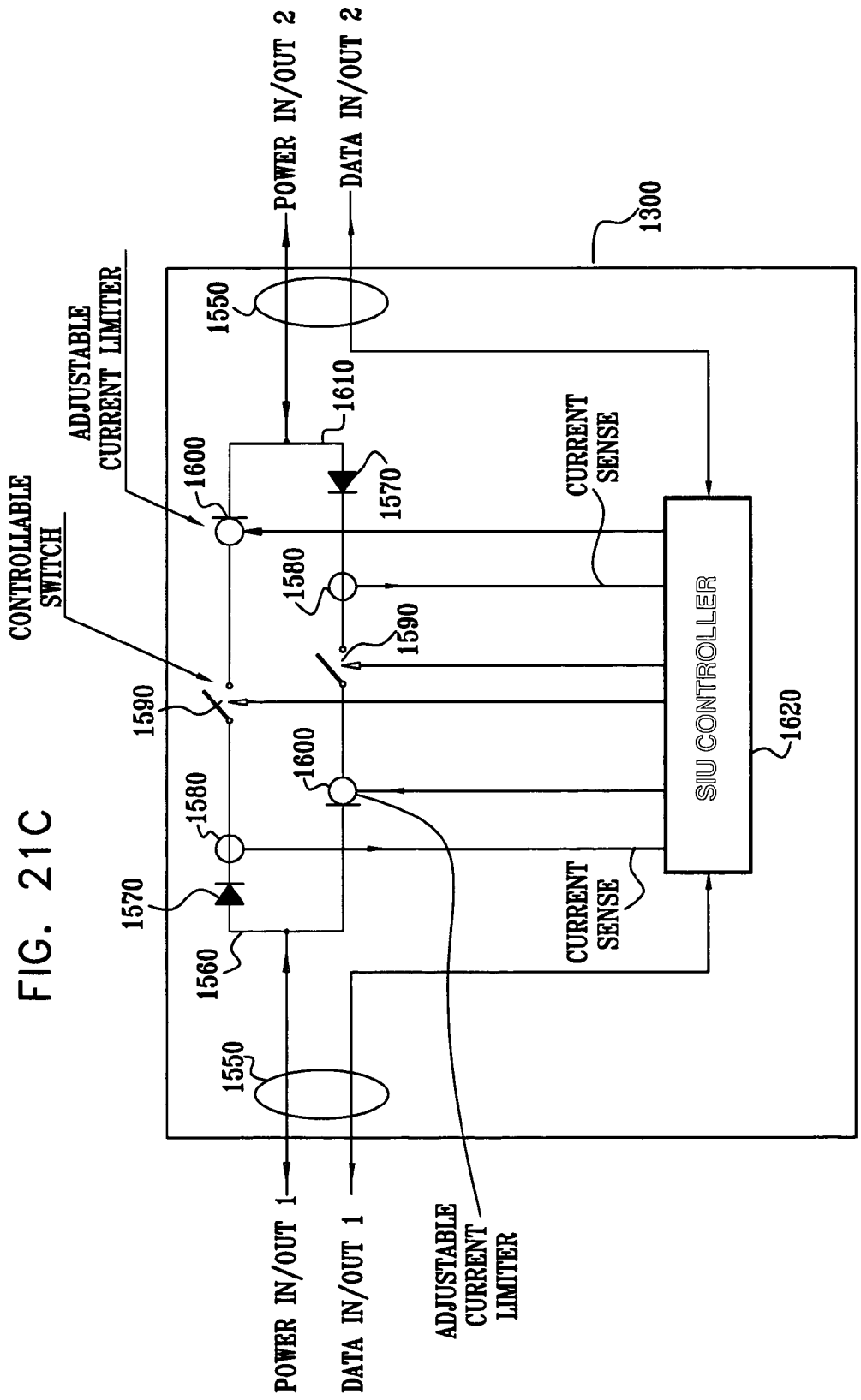

FIG. 21C illustrates a high level schematic diagram of a non-limiting embodiment of SIU 1300. SIU 1300 is operable to control the electrical power flow in response to pooling controller 1230, and in a preferred embodiment is operative to control both the extent and direction of current flow. In the non-limiting embodiment illustrated in FIG. 21C, SIU 1300 is a symmetrical circuit having first and second data and power input/output ports 1550. Power entering via first port 1550 travels over a pathway 1560, via a first diode 1570, a first current sensor 1580, a first controllable switch 1590 and a first adjustable current limiter 1600 to the output portion of second port 1550. Power entering via second port 1550 travels over a pathway 1610, via a second diode 1570, a second current sensor 1580, a second controllable switch 1590 and a second adjustable current limiter 1600 to the output portion of first port 1550.

An SIU controller 1620, typically in the form of a microprocessor, communicates control data to/from power pooling controller 1230 of power spine node 1150 of FIG. 19A, or power spine module 1122 of FIG. 19B via first or second ports 1550, receives current sensor outputs from first and second current sensors 1580, provides current switch outputs to first and second controllable switches 1590 and provides current limiting output to first and second adjustable current limiters 1600.

In another embodiment (not shown) SIU 1300 further comprises overcurrent protection, which preferably comprises a fuse or circuit breaker to prevent an excess current condition. Such a condition may occur, for example, in an uncontrolled start up mode in which a short circuit is connected in place of a node prior to pooling controller 1230 setting SIU 1300 to an off mode.

Figure 21D:
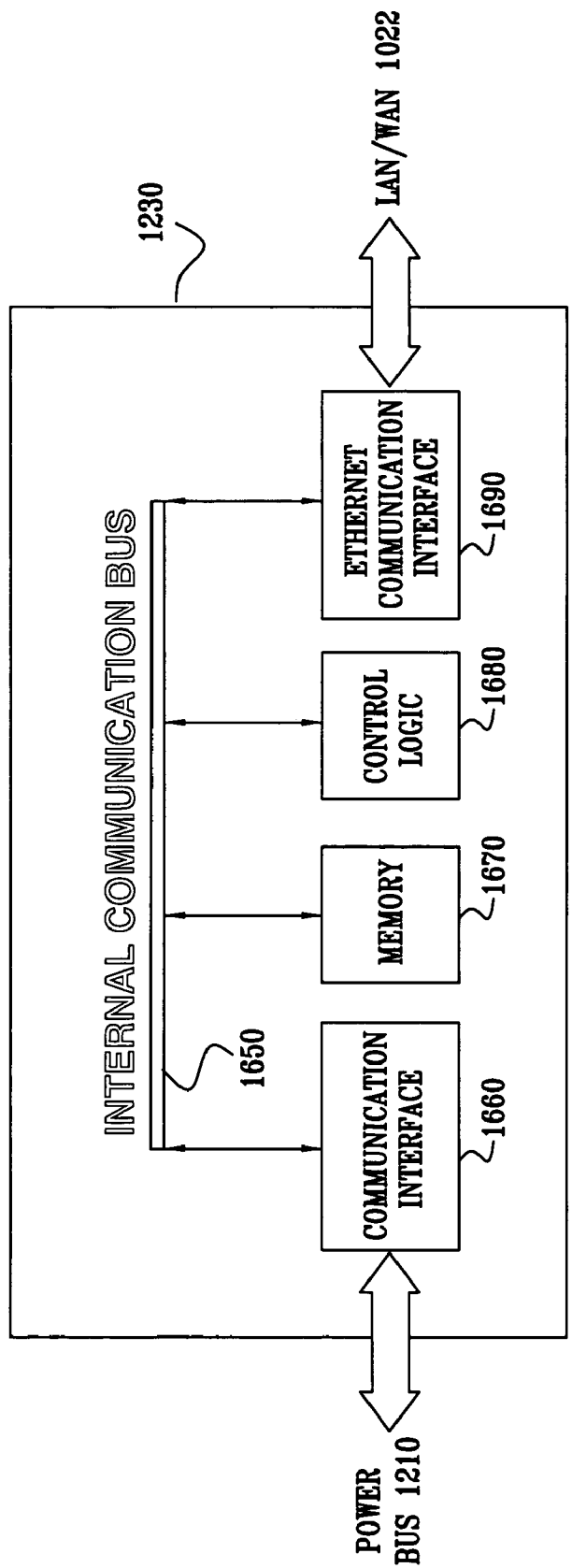

Reference is now made to FIG. 21D, which illustrates power pooling controller 1230 (FIGS. 17, 18A, 18B, 19A, 19B). As seen in FIG. 21D, power pooling controller 1230 preferably comprises an internal communication bus 1650, which provides communication between a communication interface 1660, which in turn communicates with the data portion of bi-directional power bus 1210, a memory 1670, control logic 1680 and an Ethernet communication interface 1690, which in turn communicates with LAN/WAN 1022.

Figure 21E:
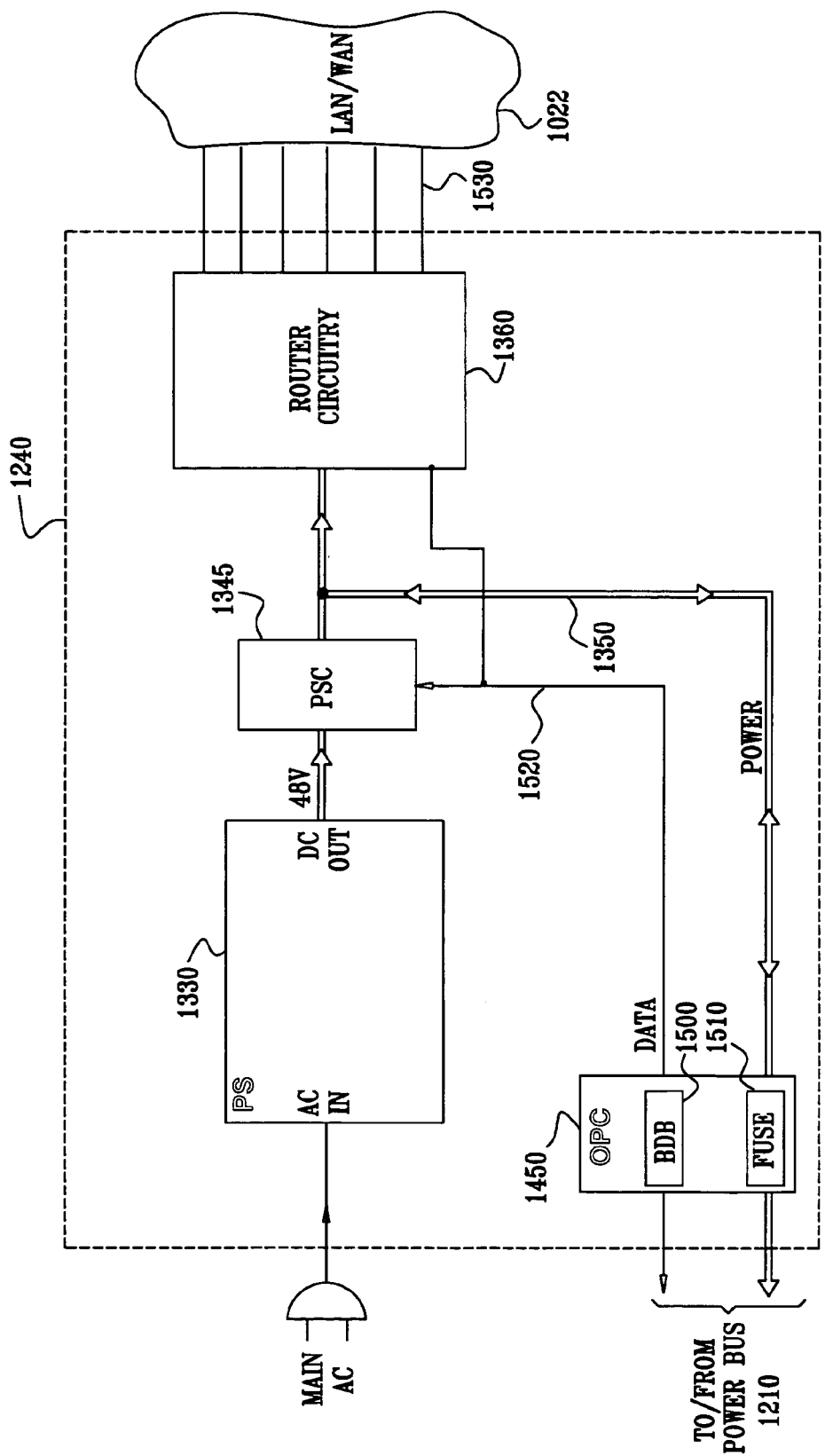

As seen in FIG. 21E, the router designated by reference numeral 1240 in FIGS. 19A and 19B, preferably includes an internal conventional power supply 1330, which receives mains AC power and provides a DC output, typically 48 volts. PSC 1345 governs the output of power supply 1330 to vary the output voltage thereof in accordance with control data received from the power pooling controller 1230 via the data portion of bi-directional power bus 1210 in order to affect desired power sharing in accordance with a preferred embodiment of the present invention. PSC 1345, or in alternative embodiment not shown power supply 1330 is further operable to communicate over data line 1520 with power pooling controller 1230 regarding the current status of power supply 1330.

OPC 1450 comprises bidirectional data buffer (BDB) 1500 on a data line 1520 forming data portion of internal power bus 1350 connecting OPC 1450 to PSC 1345, and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210. In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

Router circuitry 1360 receives power from at least one and preferably both of power supply 1330 via PSC 1345, and bi-directional power bus 1210 via OPC 1450 over internal power bus 1350, and communicates via a data line 1530 with LAN/WAN 1022. Router circuitry is further operable to communicate over data line 1520 with power pooling controller 1230 regarding power requirements. In an alternative embodiment, not shown, router 1240 communicates datum selected from among the group consisting of the current DC electrical power consuming needs, the current DC electrical power providing abilities and the current DC excess providing ability or shortfall to power pooling controller 1230, thus notifying power pooling controller 1230 information relating indicating DC electrical power needs and DC electrical power providing capabilities of router 1240.

FIG. 21E has been described in relation to router 1240, however this is not meant to be limiting in any way, and is instead meant to be an exemplary example of a node comprising and internal power supply 1330 being connected to an internal power bus 1350 via PSC 1345.

Figure 21F:
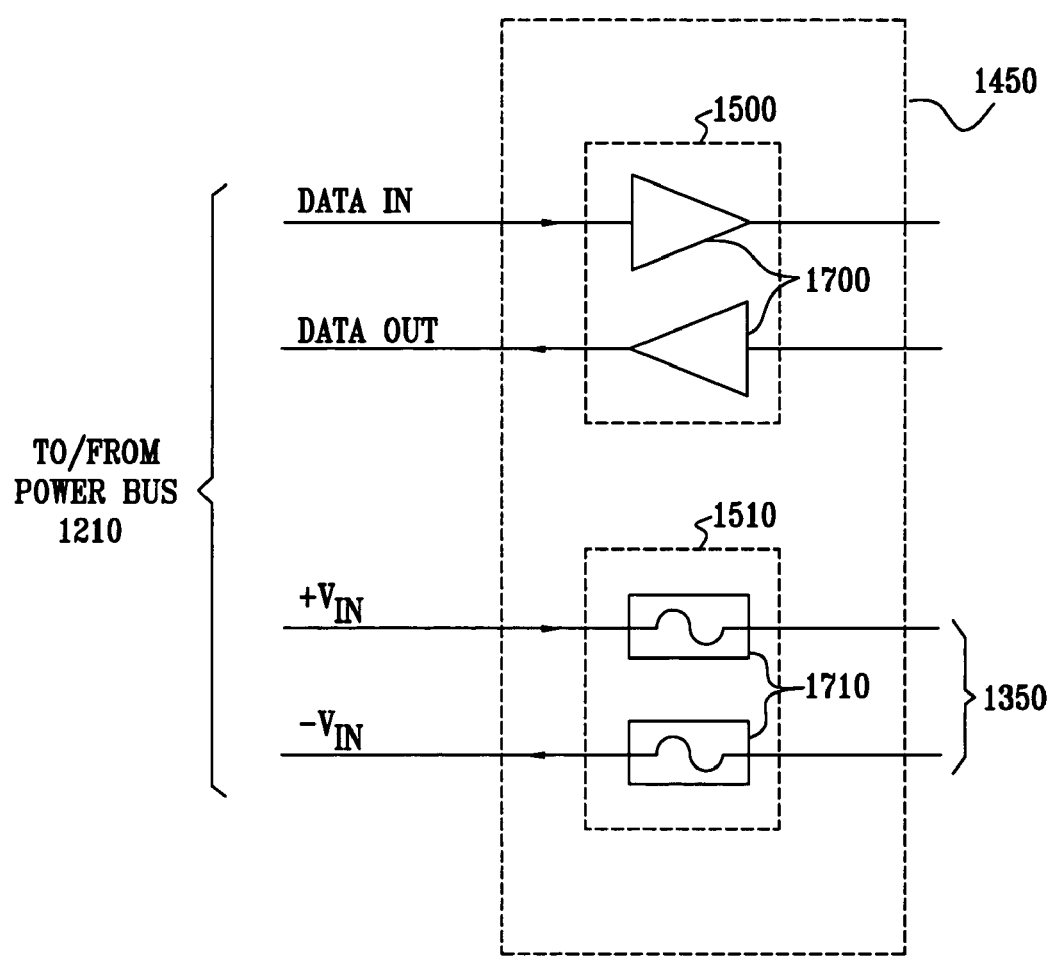

Reference is now made to FIG. 21F, which illustrates a high level schematic diagram of a preferred embodiment of OPC 1450 of FIGS. 19A–19B. For clarity, reference is made to OPC 1450 in the context of FIG. 21E. As seen in FIG. 21F, OPC 1450 includes BDB 1500 comprising multiple data line amplifiers 1700 which amplify data signals in multiple directions. OPC 1450 also includes fuse portion 1510 which comprise conventional metal or electronic circuit breakers 1710 connected in series connected bi-directional power bus 1210 to internal power bus 1350.

Figure 22A:
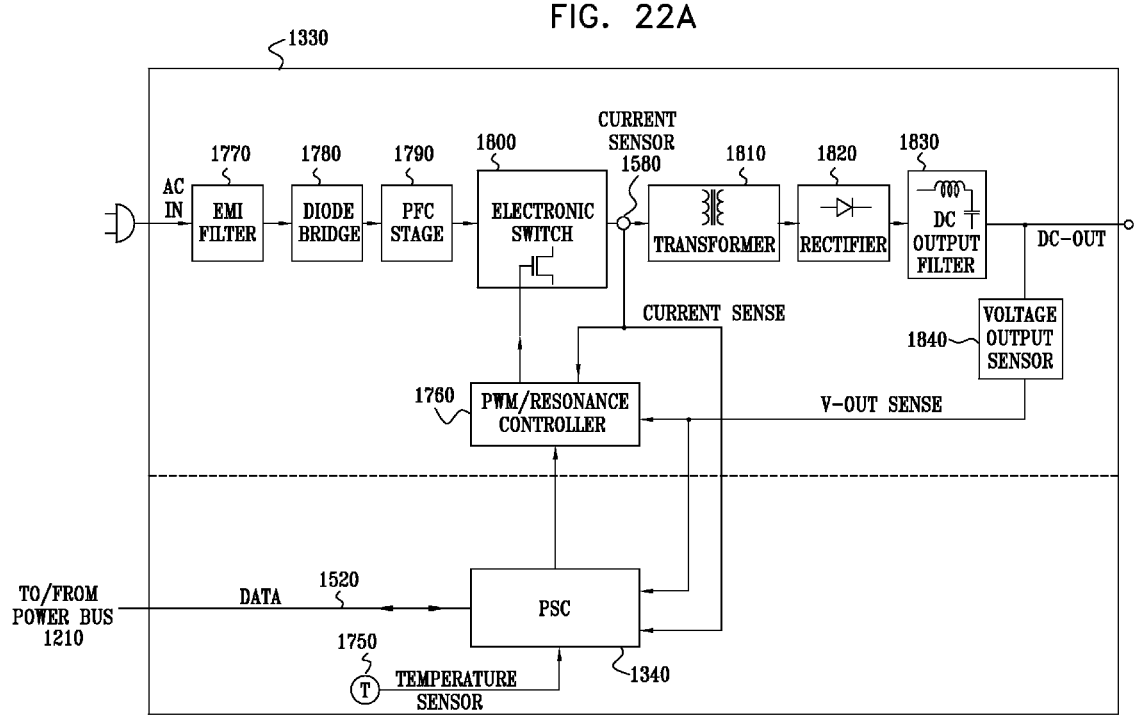
FIGS. 22A and 22B are simplified block diagram illustrations of portions of elements in the system illustrated in FIGS. 19A and 19B and shown in FIGS. 21A, 21B and 21E.
Figure 22B:
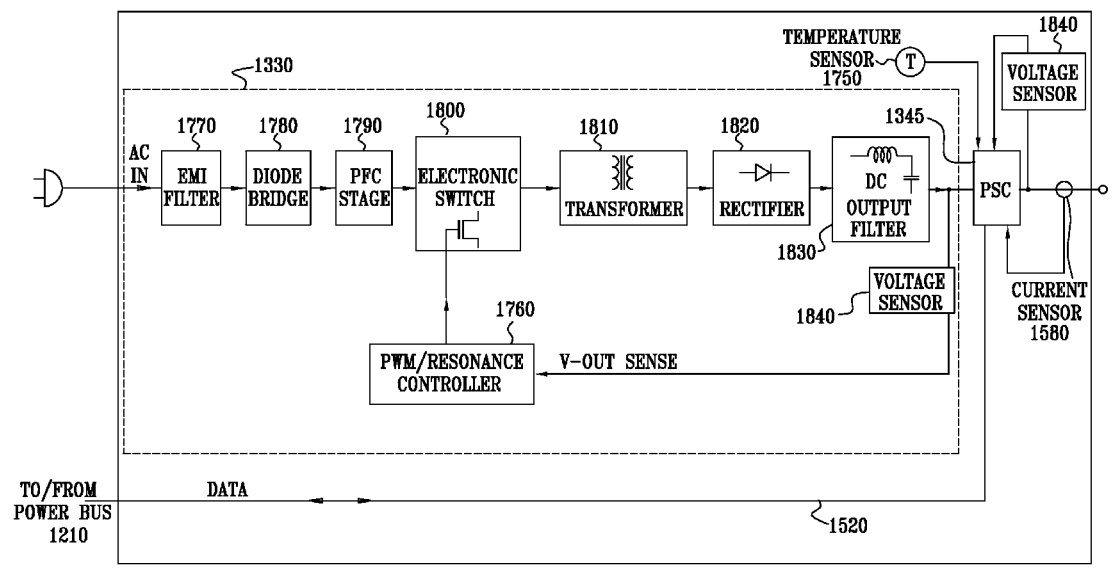

Reference is now made to FIGS. 22A and 22B, which are simplified block diagram illustrations of portions of elements in the communications system illustrated in FIGS. 19A and 19B, shown in FIGS. 21A and 21B, and 21E, respectively.

Referring to FIG. 22A, it is seen that power supply 1330 (FIGS. 21A and 21B) preferably comprise an EMI filter 1770 which receives AC mains power and provides an EMI filtered output to a diode bridge rectifier 1780. The diode bridge rectifier 1780 outputs to a power factor correction (PFC) stage 1790.

An output of the power factor correction stage 1790 is supplied to electronic switch 1800 which receives a control input from a pulse width modulation (PWM) or resonance controller 1760, generally power supply controller 1760 which in turn receives inputs from a current sensor 1580, connected downstream of electronic switch 1800, an output voltage sensor 1840 and from PSC 1340, which in turn receives a control input via the data portion of bi-directional power bus 1210 from power pooling controller 1230 (FIG. 17, 18A, 18B, 19A and 19B) and an input from a temperature sensor 1750. Temperature sensor 1750 is operative to detect the operating temperature of internal power supply 1330, thus providing data input useful in preventing early failure of internal power supply 1330.

Electronic switch 1800 is operative to modulate the voltage output of PFC stage 1790 and to provide a voltage modulated output to a transformer 1810 which outputs via a rectifier 1820 and a DC output filter 1830. The output voltage is sensed by voltage output sensor 1840, which as indicated above is an input to pulse width modulation or resonance controller 1760, generally power supply controller 1760. Power supply 1330 having PSC 1340 thus affects desired power sharing in accordance with a preferred embodiment of the present invention, being adaptable by commands received from power pooling controller 1230 in real time to various operational modes of the system.

FIG. 22B illustrates a high level schematic diagram of an embodiment of power supply 1330 of FIG. 21E, having its output fed to PSC 1345. Power supply 1330 is of a conventional power supply and preferably comprises an EMI filter 1770 that receives AC mains power and provides an EMI filtered output to a diode bridge rectifier 1780. The diode bridge rectifier 1780 outputs to a PFC stage 1790. An output of PFC stage 1790 is supplied to an electronic switch 1800, which receives a control input from a pulse width modulation or resonance controller 1760, generally power supply controller 1760 that in turn receives inputs from a first output voltage sensor 1840.

Electronic switch 1800 is operative to modulate the voltage output of PFC stage 1790 and to provide a voltage modulated output to a transformer 1810 which outputs via a rectifier 1820 and a DC output filter 1830. The output of DC output filter 1830, which is the output of conventional power supply 1330, is sensed by first voltage sensor 1840, and as described above is fed as an input to pulse width modulation or resonance controller 1760, generally power supply controller 1760. The output of DC output filter 1830 is supplied to an external PSC 1345 of FIG. 21E, which in turn receives a control input via the data portion 1520 of internal power bus 1350, via bi-directional power bus 1210 from power pooling controller 1230, an input from a temperature sensor 1750, an input from an output current sensor 1580 and an input from second voltage output sensor 1840. Temperature sensor 1750 is operative to detect the operating temperature of internal power supply 1330, thus providing data input useful in preventing early failure of internal power supply 1330. PSC 1345 thus affects desired power sharing in accordance with a preferred embodiment of the present invention, being adaptable by commands received from power pooling controller 1230 in real time to various operational modes of the system.

Figure 23A:
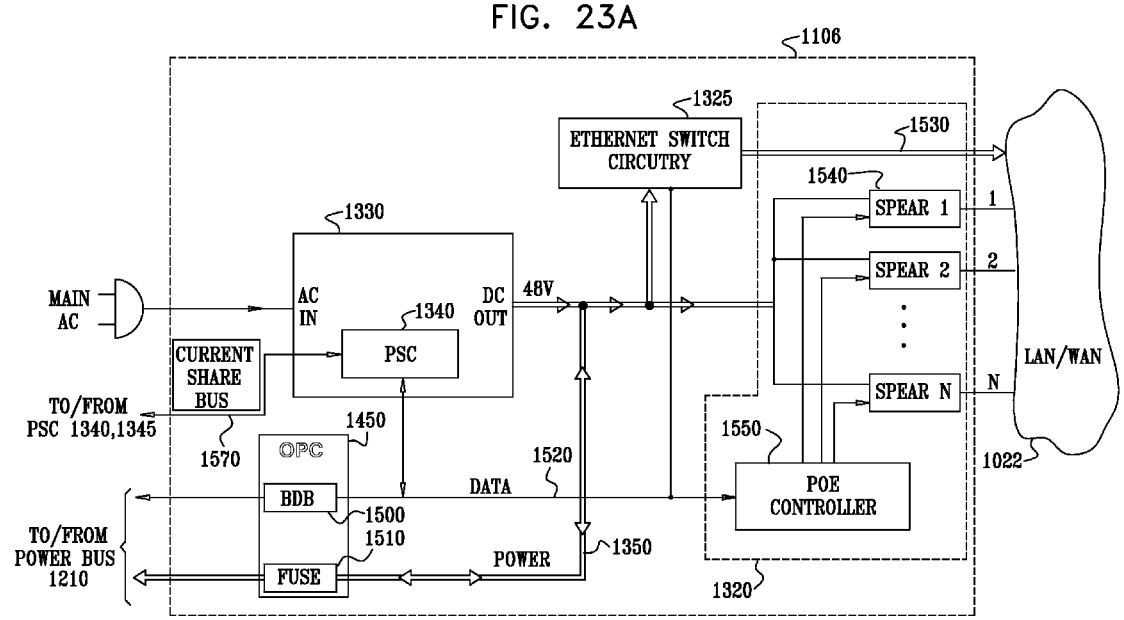
FIGS. 23A, 23B and 23C are simplified block diagram illustrations of elements in the system illustrated in FIGS. 19A and 19B, which are alternatives to those illustrated in FIGS. 21A, 21B and 21E, respectively.
Figure 23B:
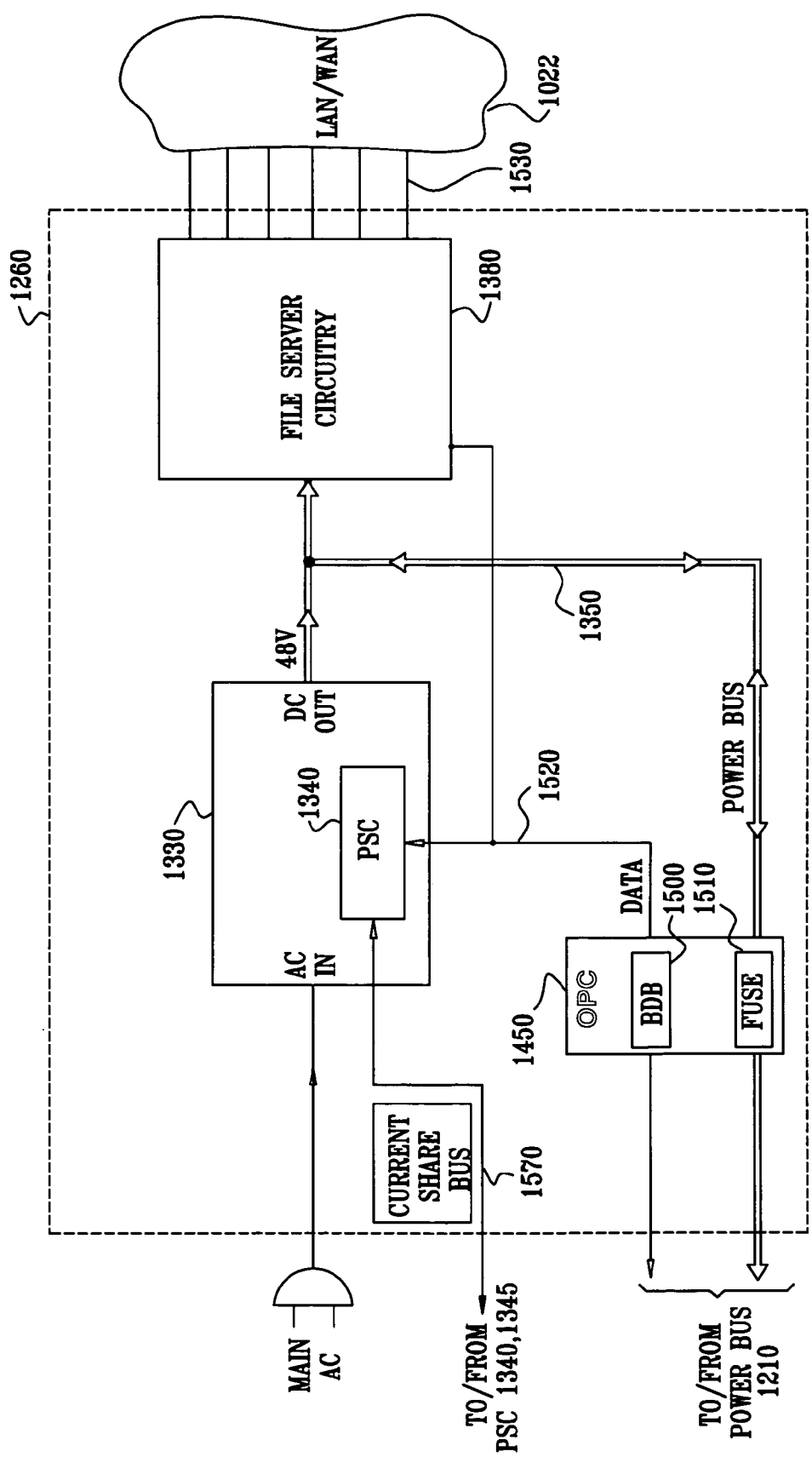
Figure 23C:
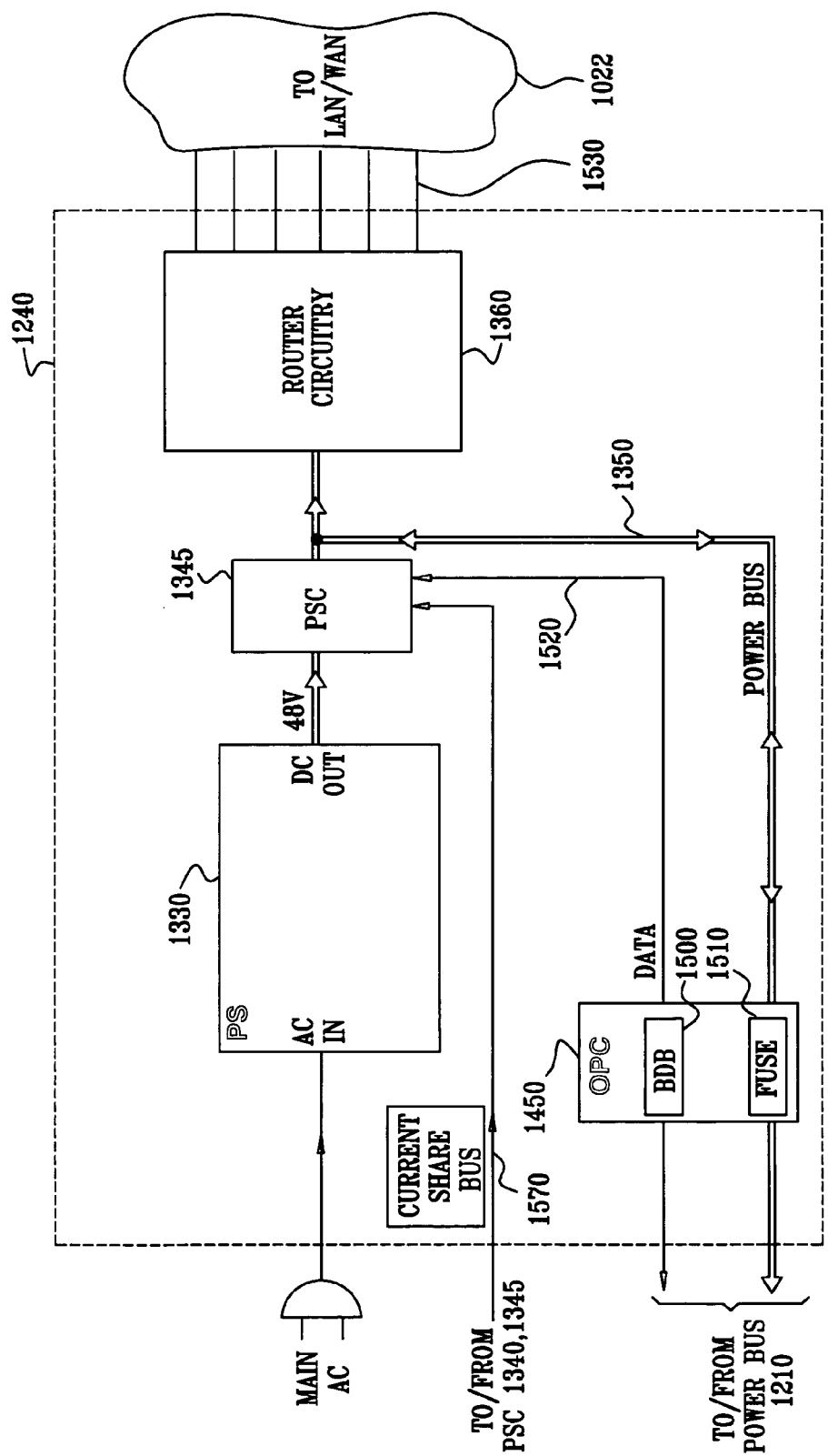

Reference is now made to FIGS. 23A, 23B and 23C, which are simplified block diagram illustrations of elements in the communications system illustrated in FIGS. 19A and 19B and are alternatives to those illustrated in FIGS. 21A, 21B and 21E, respectively, implementing a current share bus connected to at least some of the PSCs 1340 and 1345. Such a power share bus arrangement allows for immediate load balancing among the nodes of the system of FIG. 19A and FIG. 19B, without any delay attributable to the reaction time of power pooling controller 1230.

As seen in FIG. 23A, Ethernet switch including power over Ethernet functionality 1106, preferably comprises power supply 1330, which receives mains AC power and provides a DC output, at a variable voltage, typically 48 volts. PSC 1340 governs the operation of power supply 1330 to vary the output voltage thereof in accordance with control data received from power pooling controller 1230 of power spine node 1150, or power spine module 1122, of FIG. 19A and FIG. 19B, respectively, via the data portion of bi-directional power bus 1210 in order to affect desired power sharing in accordance with a preferred embodiment of the present invention. PSC 1340 in this embodiment further comprises a current share bus connection 1570, connected to at least some of the PSCs 1340 and 1345 of other nodes of the system of FIGS. 19A and 19B. Such a current share bus arrangement allows for immediate load balancing among the nodes of the system of FIG. 19A and FIG. 19B, without any delay attributable to the reaction time of power pooling controller 1230. PSC 1340 is further operable to communicate over data line 1520 with power pooling controller 1230 regarding the current status of power supply 1330.

OPC 1450 comprises bidirectional data buffer (BDB) 1500 on a data line 1520 forming data portion of internal power bus 1350 and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210. In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

Ethernet switch circuitry 1325 receives power from at least one and preferably both of power supply 1330 and bi-directional power bus 1210 via OPC 1450 over internal power bus 1350, and communicates via a data line 1530 with LAN/WAN 1022. Ethernet switch circuitry 1325 is further operable to communicate over data line 1520 with power pooling controller 1230 regarding current power needs of Ethernet switch circuitry 1325.

Power over Ethernet circuitry 1320 preferably is of the type described in U.S. Pat. No. 6,473,608 issued to Lehr et al., whose contents are incorporated herein by reference, and includes a power over Ethernet (POE) controller 1550 which receives a data input, preferably along data line 1520, and provides control outputs to a plurality of SPEAR circuits 1540, which, in turn, receives power from at least one and preferably both of power supply 1330 and bi-directional power bus 1210 via OPC 1450 over internal power bus 1350, and which provide power outputs via LAN/WAN 1022 to those Ethernet nodes which require power, such as those illustrated, for example, in FIGS. 11, 12, 13A, 13B, and 17. Power over Ethernet circuitry 1320 is further operable to communicate over data line 1520 with power pooling controller 1230 regarding power requirements. In an alternative embodiment, not shown, Ethernet switch including power over Ethernet functionality 1106 communicates datum selected from among the group consisting of the current DC electrical power consuming needs, the current DC electrical power providing abilities and the current DC excess providing ability or shortfall to power pooling controller 1230, thus notifying power pooling controller 1230 of information relating to DC electrical power needs and DC electrical power providing capabilities of Ethernet switch including power over Ethernet functionality 1106.

Reference is now made to FIG. 23B, which illustrates the general structure of file server 1260 of FIG. 19B, and illustrates an improved version of file server 1260 as compared to FIG. 21B. File server 1260 comprises power supply 1330, which receives mains AC power and provides a DC output, at a variable voltage, typically 48 volts. PSC 1340 governs the operation of power supply 1330 to vary the output voltage thereof in accordance with control data received from power pooling controller 1230 via the data portion of power bus 1210 in order to affect desired power sharing in accordance with a preferred embodiment of the present invention. PSC 1340 in this embodiment further comprises a current share bus connection 1570, connected to at least some of the PSCs 1340 and 1345 of other nodes of the system of FIGS. 19A and 19B. Such a power share bus arrangement allows for immediate load balancing among the nodes of the system of FIG. 19A and FIG. 19B, without any delay attributable to the reaction time of power pooling controller 1230. PSC 1340 is further operable to communicate over data line 1520 with power pooling controller 1230 regarding the current status of power supply 1330.

OPC 1450 comprises bidirectional data buffer (BDB) 1500 on a data line 1520 forming data portion of internal power bus 1350 connecting OPC 1450 to PSC 1340, and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210. In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

File server circuitry 1380 receives power from at least one and preferably both of power supply 1330 and bi-directional power bus 1210 via OPC 1450 over internal power bus 1350, and communicates via a data line 1530 to LAN/WAN 1022. File server circuitry 1380 is further operable to communicate over data line 1520 with power pooling controller 1230 regarding power requirements. In an alternative embodiment, not shown, file server 1260 communicates datum selected from among the group consisting of the current DC electrical power consuming needs, the current DC electrical power providing abilities and the current DC excess providing ability or shortfall to power pooling controller 1230, thus notifying power pooling controller 1230 of information relating to DC electrical power needs and DC electrical power providing capabilities of file server 1260.

Reference is now made to FIG. 23C, which illustrates the general structure of an improved router 1240 of FIGS. 19A and 19B, and illustrates an improvement over the embodiment of FIG. 21E. Router 1240 preferably includes an internal conventional power supply 1330, which receives mains AC power and provides a DC output, typically 48 volts. PSC 1345 governs the output of power supply 1330 to vary the output voltage thereof in accordance with control data received from the power pooling controller 1230 via the data portion of bi-directional power bus 1210 in order to affect desired power sharing in accordance with a preferred embodiment of the present invention. PSC 1345 in this embodiment further comprises a current share bus connection 1570, connected to at least some of the PSCs 1340 and 1345 of other nodes of the system of FIGS. 19A and 19B. Such a current share bus arrangement allows for immediate load balancing among the nodes of the system of FIG. 19A and FIG. 19B, without any delay attributable to the reaction time of power pooling controller 1230. PSC 1345, or in an alternative embodiment not shown, power supply 1330, is further operable to communicate over data line 1520 with power pooling controller 1230 regarding the current status of power supply 1330.

OPC 1450 comprises bidirectional data buffer (BDB) 1500 on a data line 1520 forming data portion of internal power bus 1350 connecting OPC 1450 to PSC 1345, and in an exemplary embodiment also comprises a fuse or circuit breaker 1510 on internal power bus 1350. In another embodiment data line 1520 is a logical line formed by data superimposed on internal power bus 1350, and BDB 1500 thus includes means to remove the data from the power carrier, and to superimpose data on to the power carrier. Similarly, bi-directional power bus 1210 comprises in one embodiment a separate data line, and BDB 1500 functions to buffer data coming from, or being transmitted to the data portion of bi-directional power bus 1210. In an exemplary embodiment, the data portion of power bus 1210 comprises a controller area network serial data bus (CANbus), available from Phillips Semiconductors, Eindhoven, The Netherlands. In another embodiment, the data portion of bi-directional power bus 1210 comprises a logical line formed by data superimposed on bi-directional power bus 1210, and BDB 1500 thus includes means to remove the data from the power carrier, and to superimpose data on to the power carrier.

Router circuitry 1360 receives power from at least one and preferably both of power supply 1330 via PSC 1345, and bi-directional power bus 1210 via OPC 1450 over internal power bus 1350, and communicates via a data line 1530 with LAN/WAN 1022. Router circuitry 1360 is further operable to communicate over data line 1520 with power pooling controller 1230 regarding power requirements. In an alternative embodiment, not shown, router 1240 communicates datum selected from among the group consisting of the current DC electrical power consuming needs, the current DC electrical power providing abilities and the current DC excess providing ability or shortfall to power pooling controller 1230, thus notifying power pooling controller 1230 of information relating to DC electrical power needs and DC electrical power providing capabilities of router 1240.

FIG. 23C has been described in relation to router 1240, however this is not meant to be limiting in any way, and is intended to be an exemplary example of a node comprising and internal power supply 1330 being connected to an internal power bus 1350 via PSC 1345.

Figure 24A:
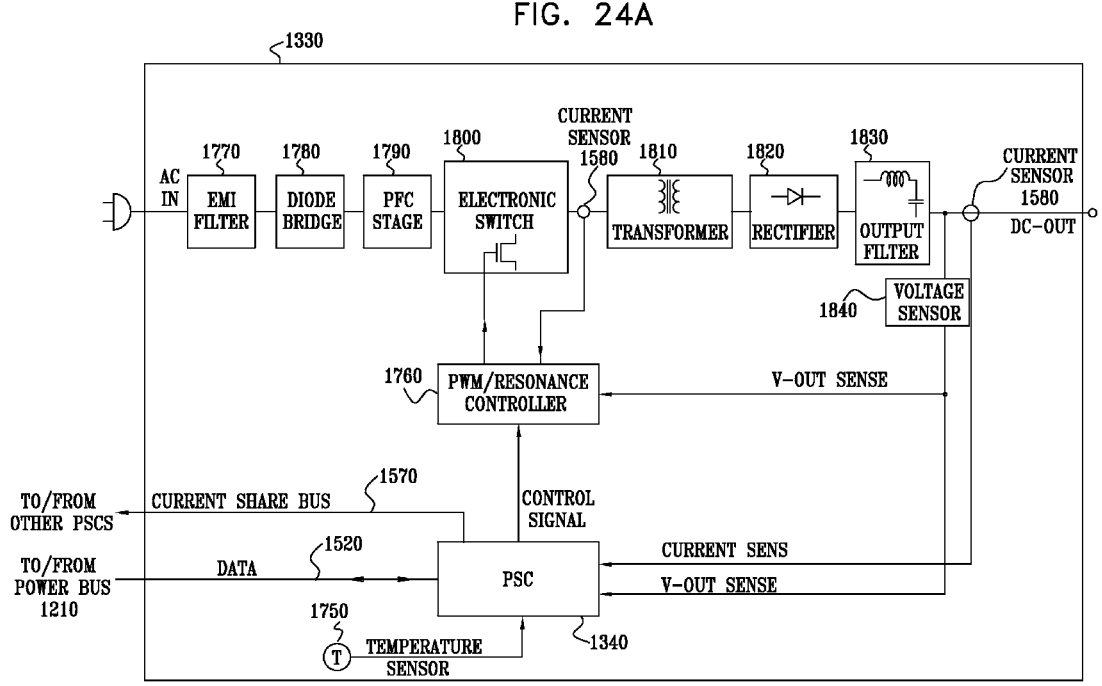
FIGS. 24A and 24B are simplified block diagram illustrations of alternative elements in the system illustrated in FIGS. 19A and 19B corresponding to FIGS. 23A and 23B, and FIG. 23C, respectively.
Figure 24B:
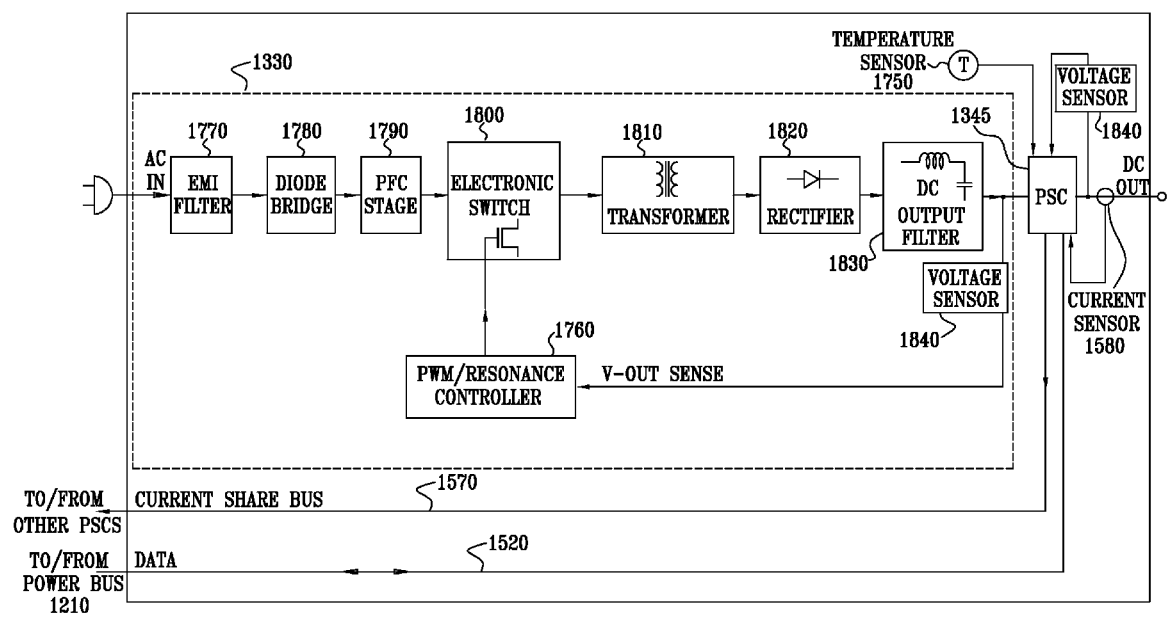

Reference is now made to FIGS. 24A and 24B, which are simplified block diagram illustrations of alternative portions of elements in the communications system illustrated in FIGS. 19A and 19B, implementing the current share bus as described above in relation to FIGS. 23A, 23B and 23C. In particular FIGS. 24A and 24B represent simplified block diagram illustrations similar to those described above in relation to FIGS. 22A and 22B, respectively, with the addition of the current share bus.

Referring now to FIG. 24A, it is seen that power supply 1330 of FIGS. 22A and 22B, preferably comprises an EMI filter 1770 which receives AC mains power and provides an EMI filtered output to a diode bridge rectifier 1780. Diode bridge rectifier 1780 outputs to a PFC stage 1790. An output of PFC stage 1790 is supplied as an input to an electronic switch 1800 which receives a control input from a pulse width modulation or resonance controller 1760, generally power supply controller 1760 which in turn receives inputs from a first current sensor 1580, connected downstream of electronic switch 1800. Pulse width modulation or resonance controller 1760, generally power supply controller 1760 receives further inputs from an output voltage sensor 1840 connected at the output of power supply 1330, and from a power supply controller 1340. Electronic switch 1800 is operative to modulate the voltage output of PFC stage 1790 and to provide a voltage modulated output, to a transformer 1810 which outputs via a rectifier 1820 and a DC output filter 1830.

Power supply controller 1340 receives a control input 1520 via the data portion of power bus 1210 from power pooling controller 1230 (FIGS. 17, 18A, 18B, 19A and 19B), an input from a temperature sensor 1750, an input from voltage sensor 1840 connected at the output of power supply 1330 and an input from a second current sensor 1580 connected at the output of power supply 1330 to sense the total output current. PSC 1340 has additional connection to a current share bus 1570, connected to at least some of the PSCs 1340 and 1345 of other nodes of the system of FIGS. 18A, 18B, 19A and 19B. Such a power share bus arrangement allows for immediate load balancing among the nodes of the system of FIG. 19A and FIG. 19B, without any delay attributable to the reaction time of power pooling controller 1230. Temperature sensor 1750 is operative to detect the operating temperature of internal power supply 1330, thus providing data input useful in preventing early failure of internal power supply 1330. Power supply 1330 having PSC 1340 thus affects desired power sharing in accordance with a preferred embodiment of the present invention, being adaptable by commands received from power pooling controller 1230 in real time to various operational modes of the system, and having immediate response to the operation of other nodes through current share bus 1570.

FIG. 24B illustrates a high level schematic diagram of an embodiment of power supply 1330 of FIG. 23C, having its output fed to PSC 1345. Power supply 1330 is in a preferred embodiment a conventional power supply and preferably comprises an EMI filter 1770 that receives AC mains power and provides an EMI filtered output to a diode bridge rectifier 1780. Diode bridge rectifier 1780 outputs to a PFC stage 1790. An output of PFC stage 1790 is supplied as an input to an electronic switch 1800, which receives a control input from a pulse width modulation or resonance controller 1760, generally power supply controller 1760 which in turn receives an input from a voltage sensor 1840 connected across the output of power supply 1330.

Electronic switch 1800 is operative to modulate the voltage output of PFC stage 1790 and to provide a voltage modulated output to a transformer 1810 which outputs via a rectifier 1820 and a DC output filter 1830. The output of DC output filter 1830, which is the output of power supply 1330, is supplied to an external PSC 1345, which receives a control input via the data portion 1520 of power bus 1210 from power pooling controller 1230 (FIGS. 17, 18A, 18B, 19A and 19B), an input from a temperature sensor 1750, an input from voltage sensor 1840 connected at the output of PSC 1345 and an input from a current sensor 1580 connected at the output of PSC 1345 to sense the total output current. PSC 1345 has an additional connection to a current share bus 1570, connected to at least some of the PSCs 1340 and 1345 of other nodes of the system of FIGS. 18A, 18B, 19A and 19B. Such a power share bus arrangement allows for immediate load balancing among the nodes of the system of FIG. 19A and FIG. 19B, without any delay attributable to the reaction time of power pooling controller 1230. Temperature sensor 1750 is operative to detect the operating temperature of internal power supply 1330, thus providing data input useful in preventing early failure of internal power supply 1330. PSC 1345 thus affects desired power sharing in accordance with a preferred embodiment of the present invention, being adaptable by commands received from power pooling controller 1230 in real time to various operational modes of the system, and having immediate response to the operation of other nodes through current share bus 1570.

Reference is now made to FIGS. 25A–28B, which illustrate simplified schematic diagrams and output relationships implementing power sharing functionality among multiple power supplies in accordance with a preferred embodiment of the invention, wherein conventional power sharing circuit is modified with the addition of a controller to enable the power sharing functionality to be adapted in real time to various operational modes of the system.

Figure 25A:
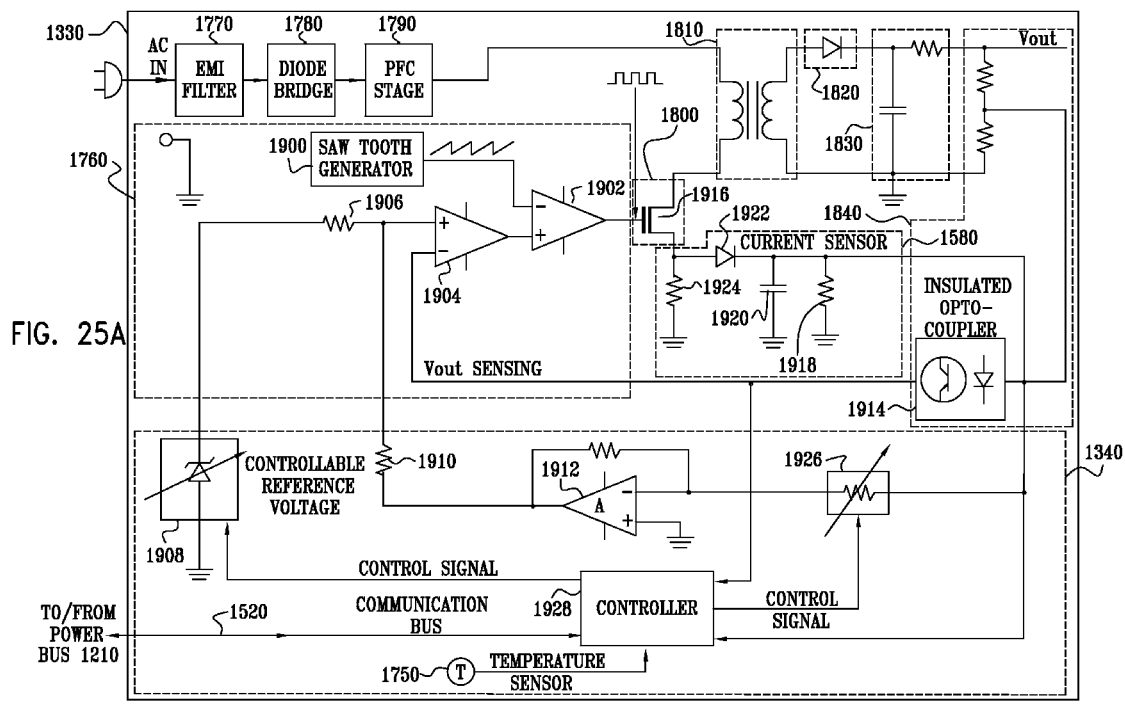
FIGS. 25A, 25B and 25C are simplified schematic illustrations of alternative elements in the system illustrated in FIGS. 19A and 19B corresponding to FIGS. 22A and 22B.

In particular, FIG. 25A illustrates a simplified schematic illustration of an embodiment of power supply 1330 of FIG. 24A. Power supply 1330 comprises an EMI filter 1770 which receives AC mains power and provides an EMI filtered output to a diode bridge rectifier 1780. The diode bridge rectifier 1780 outputs to a PFC stage 1790. The output of PFC stage 1790 is fed as an input to electronic switch 1800 through a first end of primary of transformer 1810. Electronic switch 1800 comprises power transistor 1916, and the second end of the primary of transformer 1810 is connected to the source of power transistor 1916.

Pulse width modulation or resonance controller 1760, generally power supply controller 1760 comprises a saw tooth generator 1900, which outputs to an analog comparator 1902, which comparator also receives an input from an analog error amplifier 1904. Analog error amplifier 1904 receives a reference voltage via a resistor 1906 from a controllable reference voltage source 1908 associated with PSC 1340, and receives a control signal connected in parallel via a resistor 1910 from an operational amplifier 1912 both associated with PSC 1340. Analog error amplifier 1904 also receives a Vout sensing input from voltage output sensor 1840 comprising an insulated opto-coupler 1914.

The output of analog comparator 1902 generates a pulse-width modulated signal, which is supplied at the output of pulse width modulation or resonance controller 1760, generally power supply controller 1760 to the gate of transistor 1916, at the input of electronic switch 1800. Transistor 1916 modulates the voltage output of PFC stage 1790 in accordance with the output of analog comparator 1902, and provides a voltage modulated output across the secondary of transformer 1810 which outputs via a rectifier 1820 and a DC output filter 1830.

Operational amplifier 1912 associated with PSC 1340, receives an input from current sensor 1580, which is connected at the drain of transistor 1916 of switch 1800, and is seen to include a sensing resistor 1924 connected between the drain of transistor 1916 of switch 1800 and ground. Current sensor 1580 further comprises diode 1922 having its anode connected at the drain of transistor 1916 of switch 1800, and a resistor 1918 and a capacitor 1920, connected in parallel to ground, connected to the cathode of diode 1922 representing the output of current sensor 1580. A controllable resistor 1926 associated with PSC 1340, is interposed between the output of current sensor 1580 and operational amplifier 1912 in order to enable control of the voltage/current relationship of power supply 1330.

PSC 1340 further comprises a PSC controller 1928 which receives inputs from voltage sensor 1840 at the output of insulated opto-coupler 1914, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 and the data portion of bi-directional power bus 1210 from power pooling controller 1230 (FIG. 17, 18A, 18B, 19A and 19B). Temperature sensor 1750 is operative to detect the operating temperature of internal power supply 1330, thus providing data input useful in preventing early failure of internal power supply 1330. Power supply 1330 having PSC 1340 thus affects desired power sharing in accordance with a preferred embodiment of the present invention, being adaptable by commands received from power pooling controller 1230 in real time to various operational modes of the system.

Figure 25B:
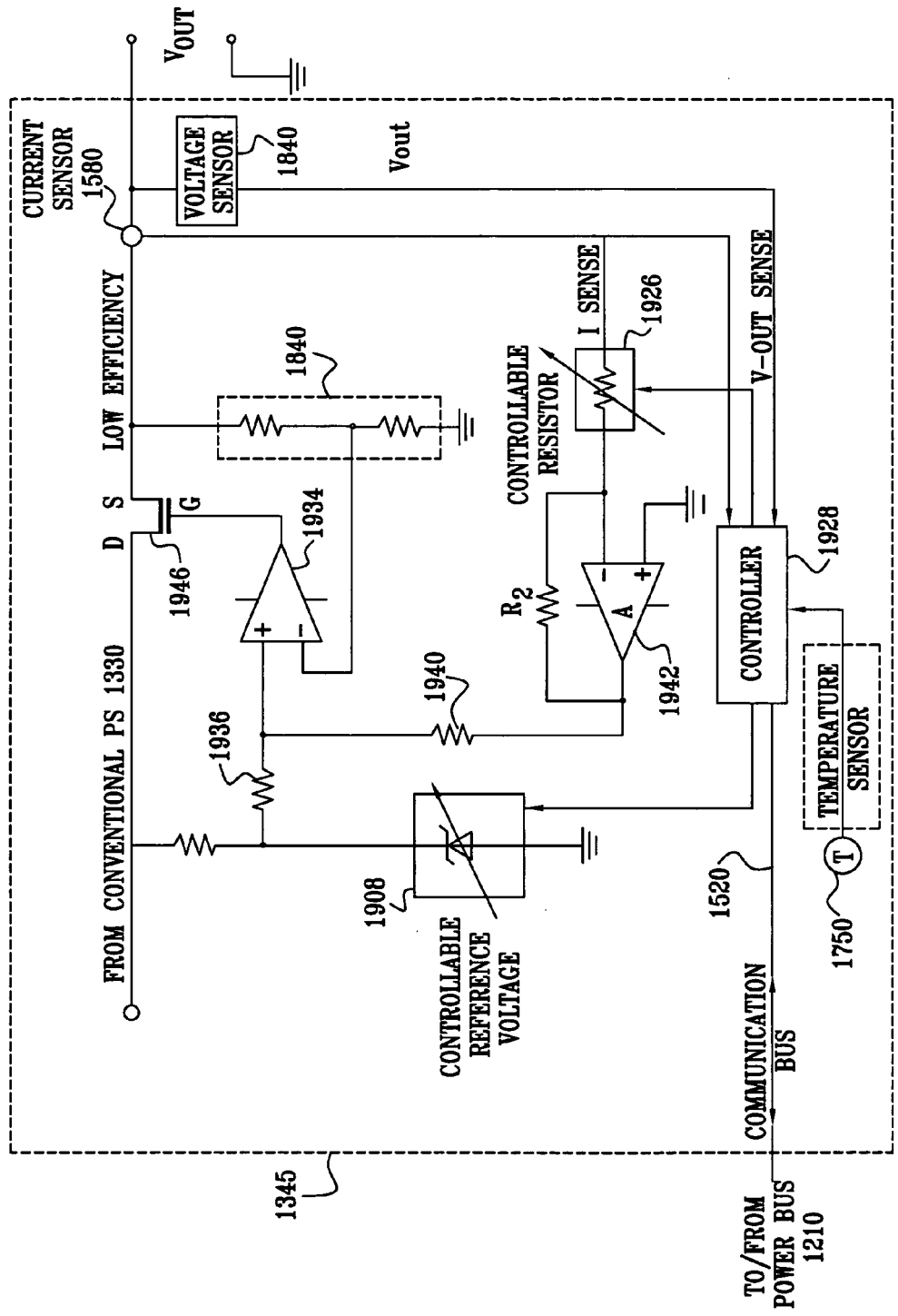

FIG. 25B illustrates a high level schematic diagram of an embodiment of PSC 1345 of FIG. 22B. The output of power supply 1330 is connected at the input of PSC 1345 to the drain of a transistor 1946. An analog error amplifier 1934 receives a reference voltage via a resistor 1936 from a controllable reference voltage source 1908 and receives in parallel a control signal via a resistor 1940 from an operational amplifier 1942. Analog error amplifier 1934 also receives a Vout sensing input from a first voltage sensor 1840, which preferably comprises a voltage divider connected at the source of transistor 1946 and acting as the output of PSC 1345. The output of analog error amplifier 1934 controls the gate of transistor 1946.

Operational amplifier 1942 receives an input from a current sensor 1580. A controllable resistor 1926 is interposed between current sensor 1580 and operational amplifier 1942 in order to enable control of the voltage/current relationship of PSC 1345. PSC 1345 further comprises a PSC controller 1928 which receives inputs from a second voltage sensor 1840 connected at the output of PSC 1345, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 and the data portion of bi-directional power bus 1210 from power pooling controller 1230 (FIG. 17, 18A, 18B, 19A and 19B). Temperature sensor 1750 is operative to detect the operating temperature of internal power supply 1330, thus providing data input useful in preventing early failure of internal power supply 1330. PSC 1345 thus affects desired power sharing in accordance with a preferred embodiment of the present invention, being adaptable by commands received from power pooling controller 1230 in real time to various operational modes of the system.

Figure 25C:
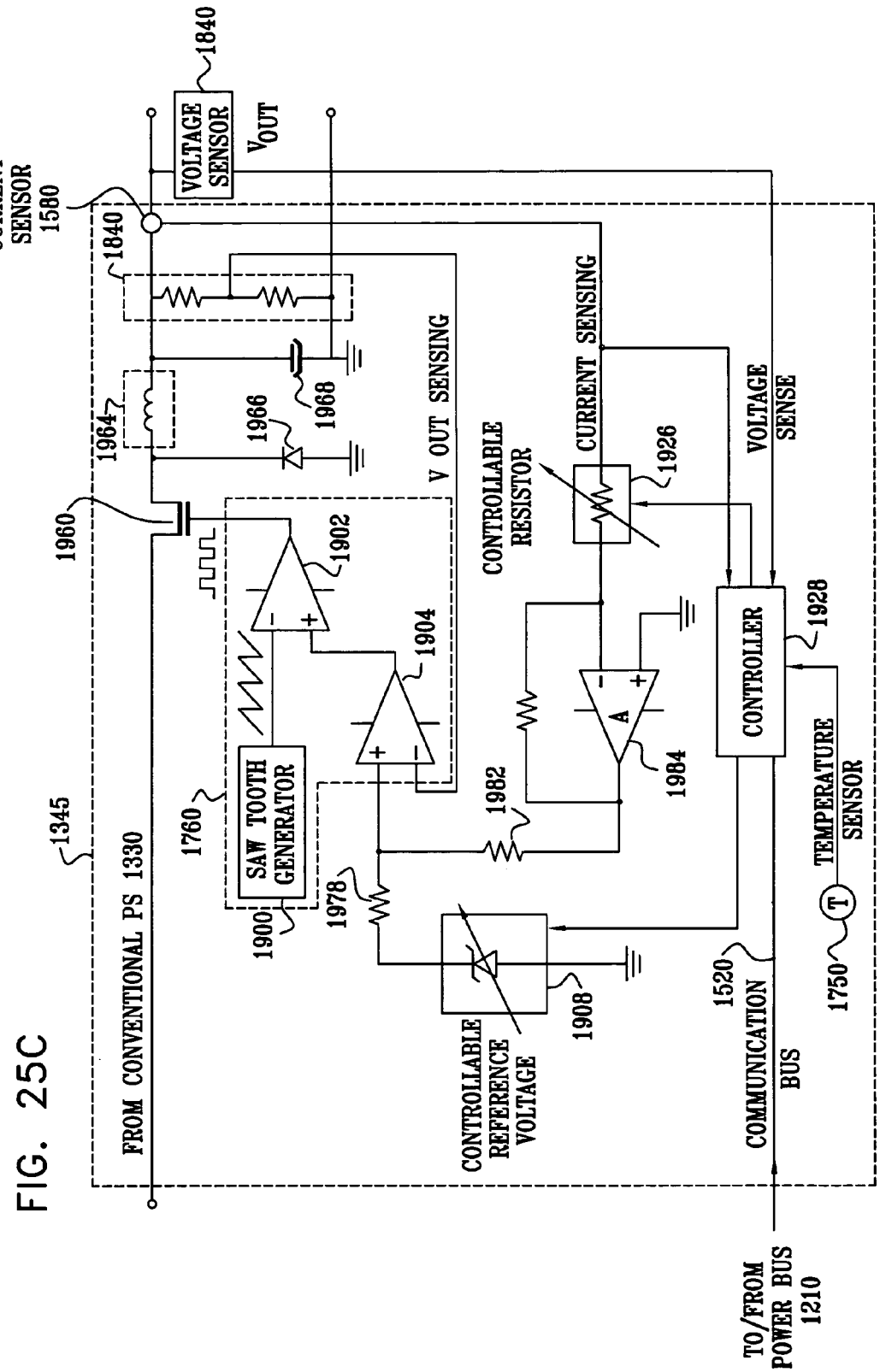

FIG. 25C illustrates a high power conversion efficiency alternative to the circuitry of FIG. 25B, thus illustrating a high level schematic diagram of an alternative embodiment of PSC 1345 of FIG. 22B. Pulse width modulation or resonance controller 1760, generally power supply controller 1760 comprises a saw tooth generator 1900 which outputs to an analog comparator 1902, which comparator also receives an input from an analog error amplifier 1904. Analog error amplifier 1904 receives a reference voltage via a resistor 1978 from a controllable reference voltage source 1908 and receives a control signal via a resistor 1982 from an operational amplifier 1984. Analog error amplifier 1904 also receives a Vout sensing input from first voltage sensor 1840 preferably comprising a resistor divider network.

The output of analog comparator 1902 generates a pulsewidth modulated signal which is supplied to a gate of transistor 1960 which modulates the voltage output of power supply 1330 connected to the drain of transistor 1960, and provides a voltage modulated output to induction coil 1964, which outputs via rectifier 1966 and DC output filter 1968 which are implemented connected between the input and output ends, respectively, of induction coil 1964 and ground. The output end of induction coil 1964 further serves as the output of PSC 1345.

Operational amplifier 1984 receives an input from current sensor 1580 connected at the output of PSC 1345. A controllable resistor 1926 is interposed between current sensor 1580 and operational amplifier 1984 in order to enable control of the voltage/current relationship of the power supply.

PSC controller 1928 receives inputs from second voltage sensor 1840 connected at the output of PSC 1345, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 and the data portion of bidirectional power bus 1210 from power pooling controller 1230 (FIG. 17, 18A, 18B, 19A and 19B). Temperature sensor 1750 is operative to detect the operating temperature of internal power supply 1330, thus providing data input useful in preventing early failure of internal power supply 1330. PSC 1345 thus affects desired power sharing in accordance with a preferred embodiment of the present invention, being adaptable by commands received from power pooling controller 1230 in real time to various operational modes of the system.

Reference is now made to FIGS. 26A, 26B and 26C, which illustrate the voltage/current relationship provided by the embodiments illustrated in FIGS. 25A–25C, in which the x-axis represents output current $I_{out}$, and the y-axis represents voltage output $V_{out}$. Turning initially to FIG. 26A, it is seen that a linear relationship, whose slope, defined as $\Delta V/\Delta I$, is established and varied by the embodiments illustrated in each of FIGS. 25A, 25B and 25C. Thus, an initial relationship as illustrated by line 1990 having a first slope, may be changed to a relationship having a steeper slope as illustrated by line 1994, or a relationship having a shallower slope as illustrated by line 1992. The specific relationship is realized by changing the voltage reference to an analog amplifier in each embodiment in response to the sensed output current. Various possible real-time modifications of the voltage current relationship in accordance with a preferred embodiment of the invention are thus represented by various dashed lines in FIG. 26A. These modifications are realized in the embodiments of FIGS. 25A–25C by control signals provided by PSC controller 1928 to controllable voltage reference 1908 and to respective controllable resistor 1926. The present invention enables the relative contributions of the power supplies engaged in current sharing to be modified in real time. This contrasts with conventional current sharing wherein the relative contributions of the power supplies are determined in advance.

FIG. 26B illustrates the behavior of a first of two power supplies of the types shown in any of FIGS. 25A–25C, and FIG. 26C illustrates the behavior of a second of two power supplies when their output voltages are connected in parallel to a load, thus establishing a common output voltage, $V_1$, with a shared output current. Line 1996 represents a first relationship of voltage and current for each of the first and second power supplies, illustrated in FIGS. 25B and 25C, respectively. The operation of PSC controller 1928 causes first power supply, as shown by line 1996 in FIG. 26B, to contribute 60% of its total output power and a second power supply, as shown by line 1996 in FIG. 26C, to contribute 20% of its total output power. It is a particular feature of the present invention that by controlling the voltage/current characteristics of multiple power supplies, which are connected in parallel, the relative contribution of each power supply to the load may thus be governed.

In accordance with a preferred embodiment of the present invention, under changed operating conditions, the controller functionality may prescribe a different sharing, such as that illustrated in line 1998 of FIGS. 26B and 26C, wherein the first power supply contributes 50% of its total output power, as illustrated by line 1998 of FIG. 26B, and the second power supply contributes 60 percent of its total output power, as illustrated by line 1998 of FIG. 26C.

Figure 27A:
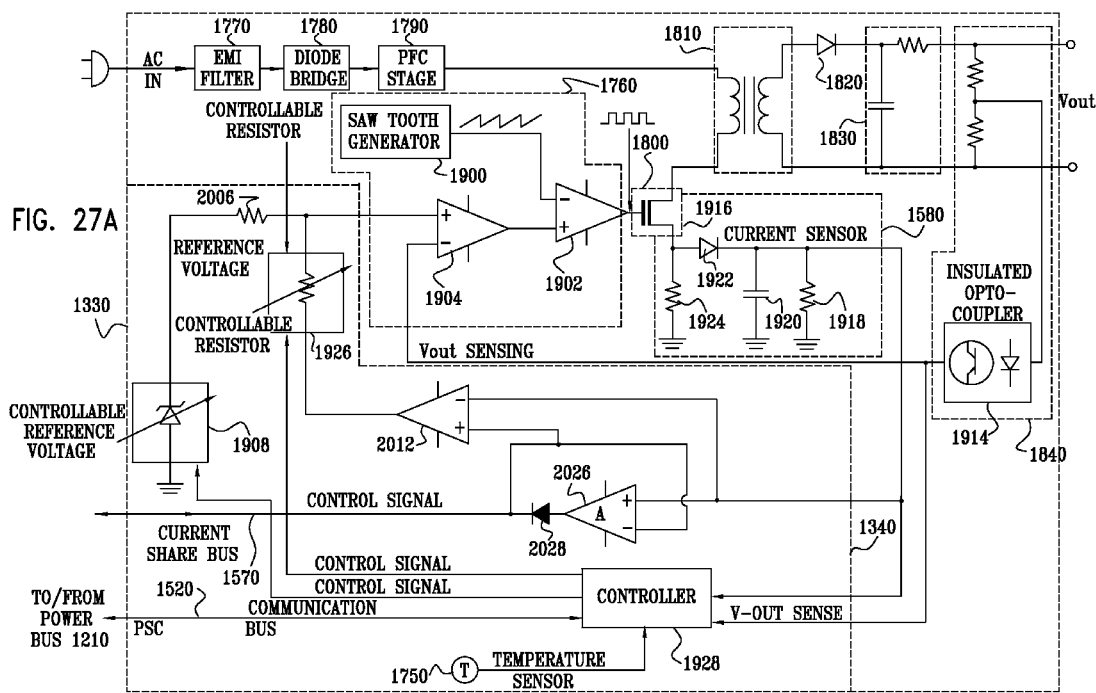
FIGS. 27A, 27B and 27C are simplified schematic illustrations of alternative elements in the system illustrated in FIGS. 19A and 19B corresponding to FIGS. 24A and 24B.

FIG. 27A illustrates a high level schematic diagram of an embodiment of power supply 1330 of FIG. 24A. Power supply 1330 preferably comprises an EMI filter 1770, which receives AC mains power and provides an EMI filtered output to a diode bridge rectifier 1780, which outputs to a PFC stage 1790. An output of PFC stage 1790 is connected to a first end of the primary of transformer 1810. Pulse width modulation or resonance controller 1760, generally power supply controller 1760 comprises a saw tooth generator 1900, which outputs to an analog comparator 1902, which comparator also receives an input from an analog error amplifier 1904.

Analog error amplifier 1904 receives a reference voltage via a resistor 2006, associated with PSC 1340, from a controllable reference voltage source 1908 and receives a control signal via a controllable resistor 1926 from an operational amplifier 2012 also associated with PSC 1340. Analog error amplifier 1904 also receives a Vout sensing input from voltage sensor 1840, which includes an insulated opto-coupler 1914 and preferably comprises a voltage divider network connected to the output of power supply 1330.

The output of analog comparator 1902 generates a pulsewidth modulated signal, which is supplied to the gate of a transistor 1916, forming electronic switch 1800. The source of transistor 1916 is connected to a second end of the primary of transformer 1810. Electronic switch 1800 modulates the voltage output of PFC stage 1790 and provides a voltage modulated output to transformer 1810 which outputs via a rectifier 1820 and a DC output filter 1830, whose output represents the output of power supply 1330.

Analog comparator 2012 associated with PSC 1340 receives an input from current sensor 1580, which is connected at the drain of transistor 1916 of switch 1800, and is seen to include a sensing resistor 1924 connected between the drain of transistor 1916 of switch 1800 and ground. Current sensor 1580 further comprises diode 1922 having its anode connected at the drain of transistor 1916 of switch 1800, and a resistor 1918 and a capacitor 1920, connected in parallel to ground, connected to the cathode of diode 1922 representing the output of current sensor 1580. Controllable resistor 1926, interposed between the output of analog comparator 2012 and the input of analog error amplifier 1904 associated with pulse width modulator or resonance controller 1760 enables control of the voltage/current relationship of the power supply. Analog comparator 2012 also receives an input from the current sharing bus 1570.

PSC 1340 further comprises an amplifier 2026, which receives an input from current sensor 1580 and outputs a current sharing control signal via a diode 2028 to a current share bus 1570 connected to other PSCs 1340 and 1345 of FIGS. 18A, 18B, 19A and 19B. The combination of amplifier 2026 and diode 2028 functions as an ideal diode.

PSC 1340 further comprises a PSC controller 1928 which receives inputs from voltage sensor 1840 at the output of insulated opto-coupler 1914, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 to communicate via the data portion of bi-directional power bus 1210 with power pooling controller 1230 (FIG. 17, 18A, 18B, 19A and 19B). Temperature sensor 1750 is operative to detect the operating temperature of internal power supply 1330, thus providing data input useful in preventing early failure of internal power supply 1330. Power supply 1330 having PSC 1340 thus affects desired power sharing in accordance with a preferred embodiment of the present invention, being adaptable by commands received from power pooling controller 1230 in real time to various operational modes of the system, and having immediate response to the operation of other nodes through current share bus 1570.

Figure 27B:
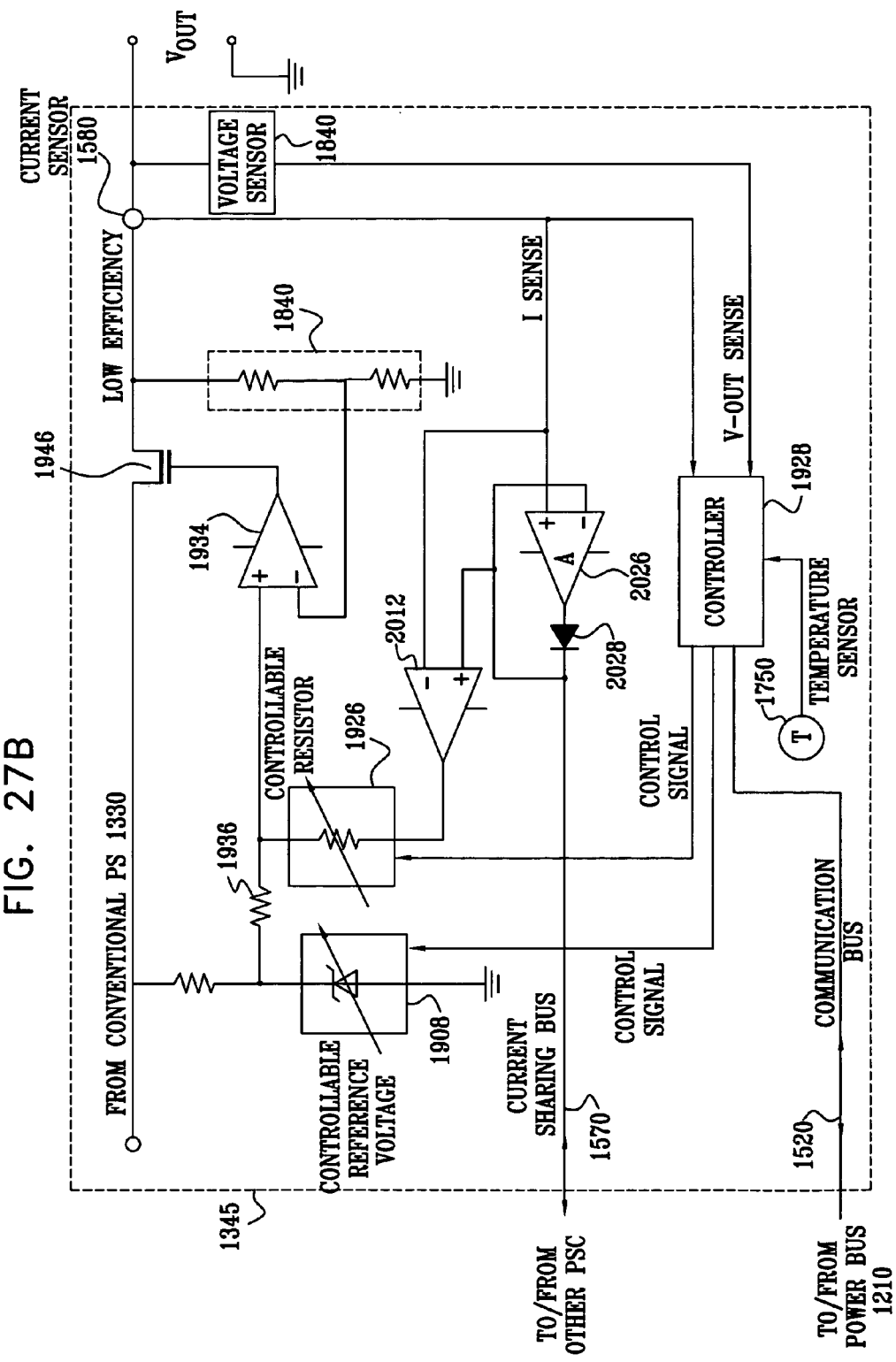

FIG. 27B illustrates a high level schematic diagram of an embodiment of PSC 1345 of FIG. 24B. The output of power supply 1330 is connected at the input of PSC 1345 to the drain of a transistor 1946. An analog error amplifier 1934 receives a reference voltage via a resistor 1936 from a controllable reference voltage source 1908 and receives in parallel a control signal via a controllable resistor 1926 from an analog comparator 2012. Analog amplifier 1934 also receives a Vout sensing input from a first voltage sensor 1840, which preferably comprises a voltage divider connected at the source of transistor 1946, further acting as the output of PSC 1345. The output of analog amplifier 1934 controls the gate of transistor 1946.

Analog comparator 2012 receives an input from a current sensor 1580 connected at the output of PSC 1345. A controllable resistor 1926 is interposed between analog comparator 2012 and analog error amplifier 1934 in order to enable control of the voltage/current relationship of PSC 1345. PSC 1345 further comprises an amplifier 2026, which receives an input from current sensor 1580 and outputs a current sharing control signal via a diode 2028 to a current share bus 1570 connected to other PSCs 1340 and 1345 of FIGS. 18A, 18B, 19A and 19B. The combination of amplifier 2026 and diode 2028 functions as an ideal diode. Analog comparator 2012 also receives an input from the current sharing bus 1570.

PSC 1345 further comprises a PSC controller 1928 which receives inputs from a second voltage sensor 1840 connected at the output of PSC 1345, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 of the internal bus and the data portion of bi-directional power bus 1210 with power pooling controller 1230 (FIG. 17, 18A, 18B, 19A and 19B). Temperature sensor 1750 is operative to detect the operating temperature of internal power supply 1330, thus providing data input useful in preventing early failure of internal power supply 1330. PSC 1345 thus affects desired power sharing in accordance with a preferred embodiment of the present invention, being adaptable by commands received from power pooling controller 1230 in real time to various operational modes of the system, and having immediate response to the operation of other nodes through current share bus 1570.

Figure 27C:
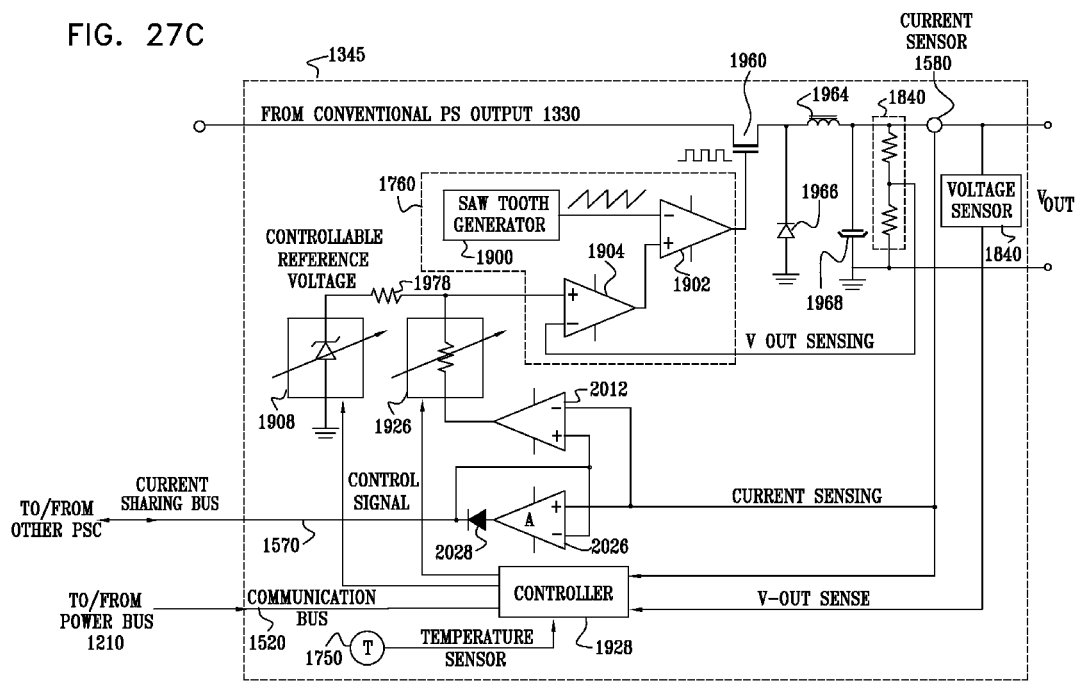

FIG. 27C illustrates a high power conversion efficiency alternative to the circuitry of FIG. 27B, thus illustrating a high level schematic diagram of an alternative embodiment of PSC 1345 of FIG. 24B. Pulse width modulation or resonance controller 1760, generally power supply controller 1760 comprises a saw tooth generator 1900 which outputs to an analog comparator 1902, which comparator also receives an input from an analog error amplifier 1904. Analog error amplifier 1904 receives a reference voltage via a resistor 1978 from a controllable reference voltage source 1908 and receives a control signal via a controllable resistor 1926 from an analog comparator 2012 in order to enable control of the voltage/current relationship of PSC 1345. Analog error amplifier 1904 also receives a Vout sensing input from first voltage sensor 1840 preferably comprising a resistor divider network.

The output of analog comparator 1902 generates a pulse-width modulated signal which is supplied to a gate of transistor 1960 which modulates the voltage output of power supply 1330 connected to the drain of transistor 1960, and provides a voltage modulated output to induction coil 1964, which outputs via rectifier 1966 and DC output filter 1968 which are implemented connected between the input and output ends, respectively, of induction coil 1964 and ground. The output end of induction coil 1964 further serves as the output of PSC 1345.

Analog comparator 2012 receives an input from a current sensor 1580 connected at the output of PSC 1345. PSC 1345 further comprises an amplifier 2026, which receives an input from current sensor 1580 and outputs a current sharing control signal via a diode 2028 to a current share bus 1570 connected to other PSCs 1340 and 1345 of FIGS. 18A, 18B, 19A and 19B. The combination of amplifier 2026 and diode 2028 functions as an ideal diode. Analog comparator 2012 also receives an input from the current sharing bus 1570.

PSC controller 1928 receives inputs from second voltage sensor 1840 connected at the output of PSC 1345, current sensor 1580 and a temperature sensor 1750. PSC controller 1928 provides a control signal output to controllable resistor 1926 and a control signal to controllable reference voltage source 1908. In addition, PSC controller 1928 communicates via data portion 1520 and the data portion of bi-directional power bus 1210 from power pooling controller 1230 (FIG. 17, 18A, 18B, 19A and 19B). Temperature sensor 1750 is operative to detect the operating temperature of internal power supply 1330, thus providing data input useful in preventing early failure of internal power supply

1330. PSC 1345 thus affects desired power sharing in accordance with a preferred embodiment of the present invention, being adaptable by commands received from power pooling controller 1230 in real time to various operational modes of the system, and having immediate response to the operation of other nodes through current share bus 1570.

Figure 27D:
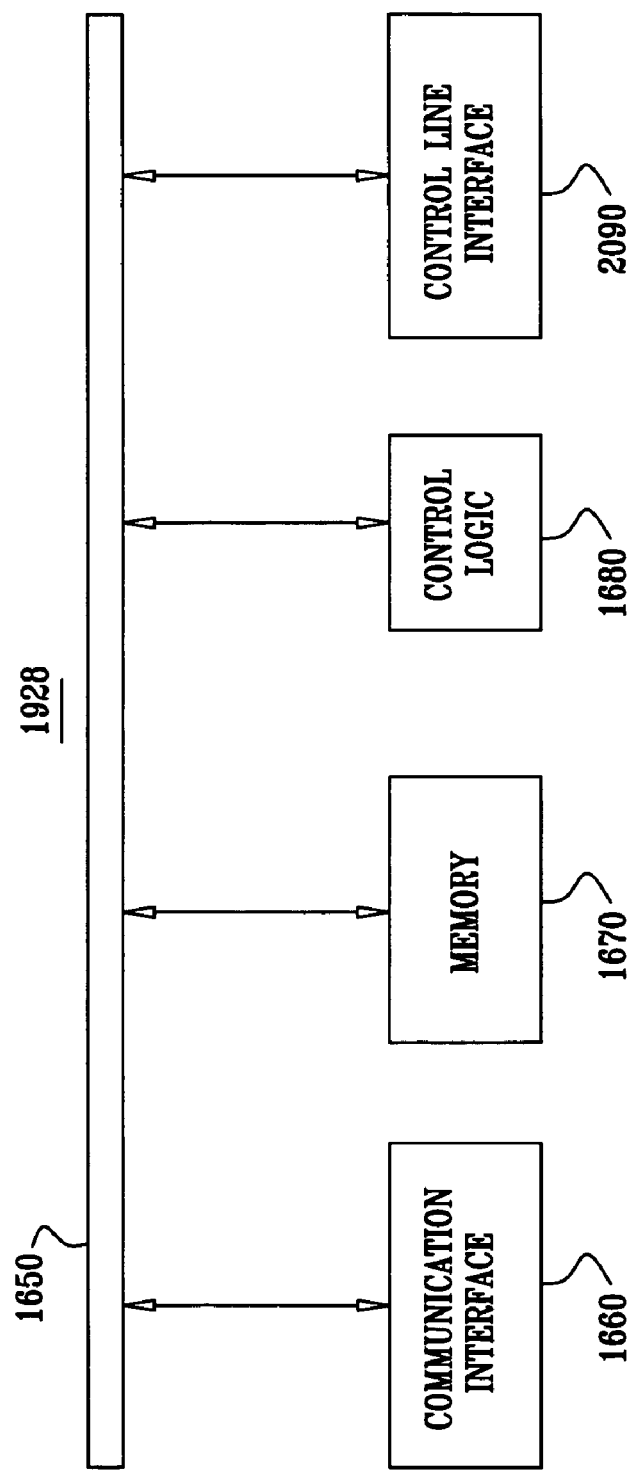
FIG. 27D is a high level block diagram of an embodiment of the controller of FIGS. 25A–25C and FIGS. 27A–27C.

FIG. 27D illustrates a high level block diagram of an embodiment of controller 1928 (FIGS. 25A–25C, FIGS. 27A–27C). As seen in FIG. 27D, controller 1928 preferably comprises an internal communication bus 1650, which provides communication between a communication interface 1660, which in turn communicates with the data portion of internal bus 1520, a memory 1670, which in a preferred embodiment is a non-volatile memory operable to retain a history of operating parameters, and acceptable operating ranges, control logic 1680 and a control line interface 2090 which is operative to connect to controllable reference voltage 1908, controllable resistor 1926 as well as connect to current sensor 1580, voltage sensor 1840 and temperature sensor 1750.

Figure 28A:
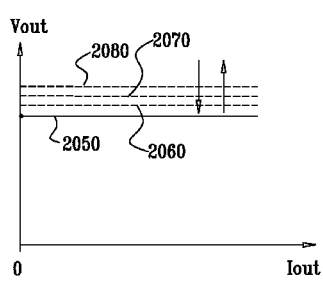
FIGS. 28A–28C are illustrations of voltage/current relationships useful in understanding the operation of the circuitry of FIGS. 27A–27C.
Figure 28B:
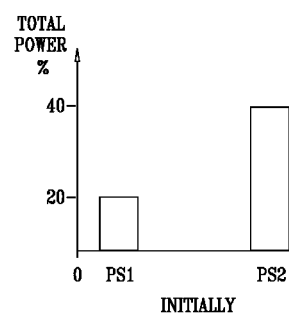
Figure 28C:
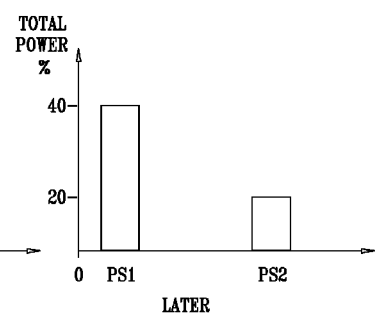

Reference is now made to FIGS. 28A, 28B and 28C, which illustrate the voltage/current relationship provided by the embodiments of FIGS. 27A–27C. Turning initially to FIG. 28A in which the x-axis represents output current and the y-axis represents output voltage, it is seen that a fixed voltage over a broad range of current is established provided in the embodiments shown in each of FIGS. 27A, 27B and 27C. This fixed voltage, as illustrated by line 2050, may be varied by changing the voltage reference to an analog amplifier in each embodiment in response to the sensed output current. Various possible real-time modifications of the voltage current relationship in accordance with a preferred embodiment of the invention are represented by various lines drawn 2060, 2070 and 2080 shown in FIG. 28A. The present invention enables the relative contributions of the power supplies engaged in current sharing to be modified in real time. This contrasts with conventional current sharing wherein the relative contributions of the power supplies are determined in advance.

FIGS. 28B and 28C illustrates the behavior of two power supplies of the types shown in any of FIGS. 27A–27C, when their output voltages are connected in parallel to a load, in which the x-axis is used to display the different power supplies, and the y-axis represents percentage of available power being supplied being supplied by the power supply. FIG. 28B illustrates an initial operating point, set under command of power pooling controller 1230 operating over the data portion of bi-directional power share bus 1210, in which a first power supply contributes 20% of its total available power, while a second power supply contributes 40% of its total available power. FIG. 28C illustrates a later stage, set under command of power pooling controller 1230 operating over the data portion of bi-directional power share bus 1210, in which the first power supply contributes 40% of its total available power, while a second power supply contributes 20% of its total available power.

It is to be noted that FIGS. 25A–28C illustrate only a few examples of power sharing modalities in which the present invention is applied. It is appreciated that the present invention is not limited to these two examples and is applicable to any suitable power sharing modality.

Figure 29:
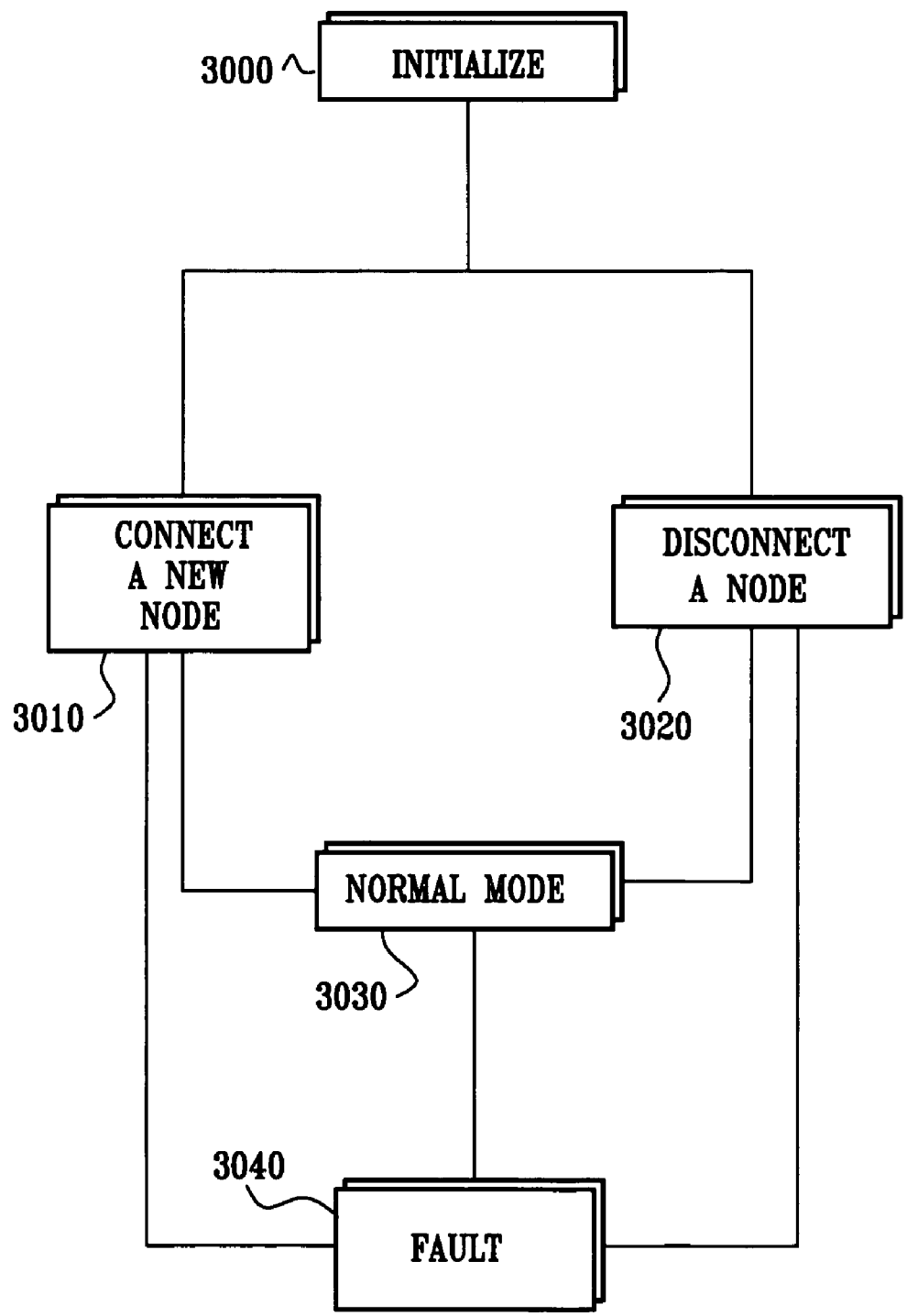
FIG. 29 is a simplified flow chart illustrating the operation of a controller governing the operation of a power spine in FIGS. 17–19B.

Reference is now made to FIG. 29, which is a simplified high level flow chart illustrating the operation of power pooling controller 1230 of FIGS. 17–19B. Upon receiving power, power pooling controller 1230 carries out an initialization stage 3000, which is described hereinto below with reference to FIG. 30. If a new node is connected, power pooling controller 1230 carries out stage 3010, which is further detailed hereinto below with reference to FIG. 31. If a node is disconnected, power pooling controller 1230 carries out stage 3020, which is further detailed hereinto below with reference to FIG. 32. If a fault situation arises during operation, power pooling controller 1230 carries out stage 3040, which is further detailed hereinto below with reference of FIG. 33. During normal continuous operation, power pooling controller 1230 carries out stage 3030, which is further detailed hereinto below with reference to FIG. 34.

Figure 30:
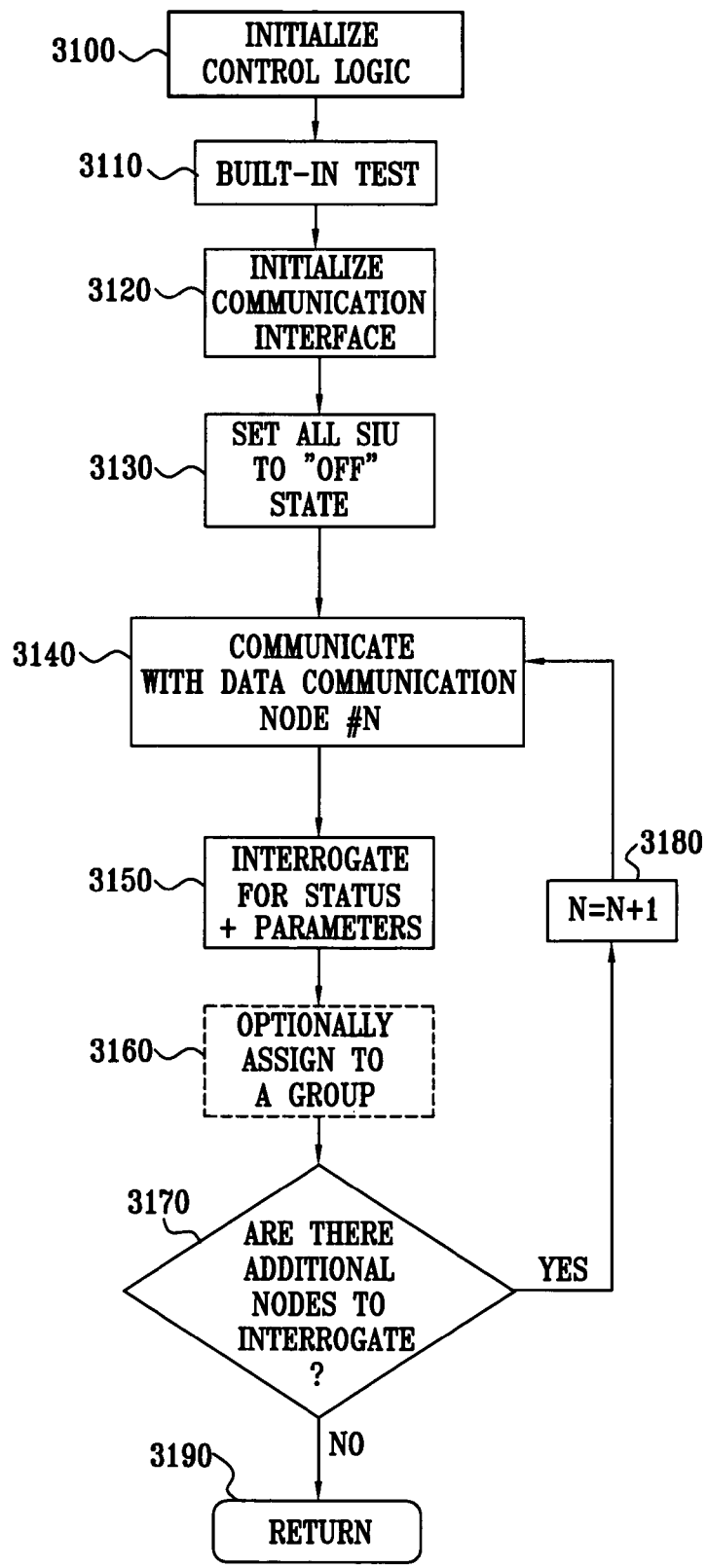
FIG. 30 is a simplified flow chart illustrating the initialize phase in the operation of the controller shown in FIG. 29.

Reference is now made to FIG. 30, which is a simplified flow chart illustrating the initialization phase in the operation of power pooling controller 1230 as described above in relation to stage 3000 of FIG. 29. In stage 3100, control logic 1680 of FIG. 21D is initialized. In stage 3110, following initialization of control logic 1680 within power pooling controller 1230, a built in test procedure is run. In stage 3120, communication interface 1660 of FIG. 21D is initialized, and the data portion of bi-directional power bus 1210 is initialized. In stage 3130, all SIU 1300 on bi-directional power bus 1210 are set to an initial "off-state" In a preferred embodiment, SIU 1300 is implemented with hardware having an initial off mode, thus initially any nodes connected to bi-directional power bus 1210 operate independently without transmitting power to or receiving power from bi-directional power bus 1210.

In stage 3140, power pooling controller 1230 then communicates with a first of a plurality of data communication nodes, such as nodes 1102, 1104, 1106, 1108, 1140 and 1240 in FIG. 17. In stage 3150, power pooling controller 1230 interrogates PSC controller 1928 of FIGS. 25A–25C and 27A–27C. Power pooling controller 1230 interrogates PSC controller 1928 in order to determine its operational status and its operational parameters. Preferably, PSC controller 1928 comprises local non-volatile memory operable for storage of status, operational parameters, and preferably historical information. Optionally, in stage 3160 the data communication node is assigned a group address, to enable high speed data communication by groups in addition to the nodes specific address on bi-directional power bus 1210.

In stage 3170 the nodes that have been communicated with are compared with the total number of nodes connected. In the event that additional nodes have not yet been interrogated, in stage 3180 a node counter is incremented and stage 3140 is again implemented. In the event that in stage 3170 no further nodes were identified that have not been interrogated, in stage 3190 the program returns to the main routine as described above in relation to FIG. 29.

Figure 31:
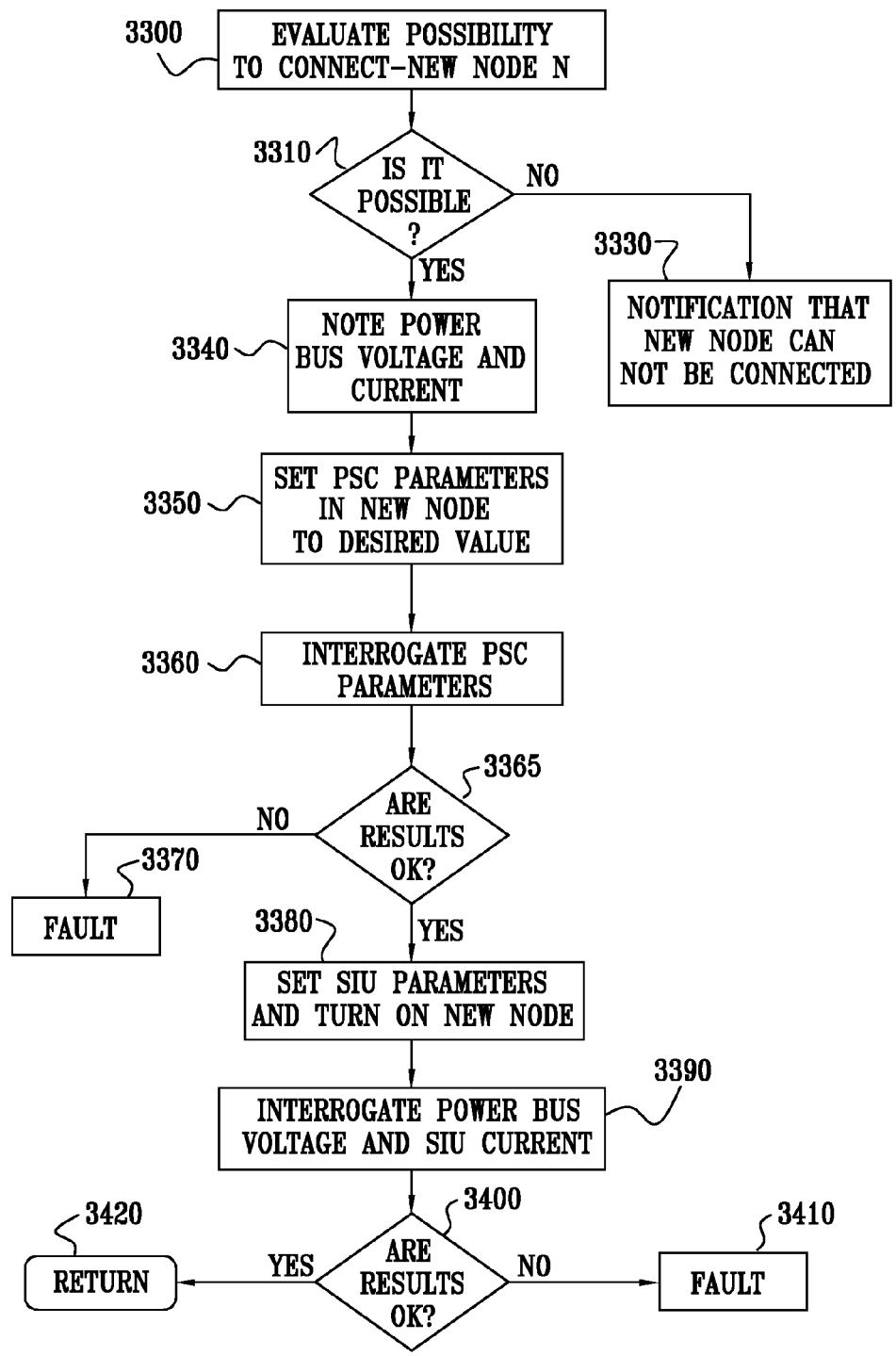
FIG. 31 is a simplified flow chart illustrating the connection of a new node in the operation of the controller shown in FIG. 29.

FIG. 31 illustrates a high level flow chart of the operation of power pooling controller 1230 in the event that a new node has been added to the system. A new node is detected as being added to the system either as a result of the initialization routine 3000 of FIG. 30, or as a result of normal operation of stage 3030 of FIG. 29. In stage 3300, power pooling controller 1230 evaluates whether it is possible to connect the new node inter alia by comparing power requirements of the new node with power availability in the system. As described above, available power in the system comprises power available from power bus power supply modules 1300, internal power supplies 1330 of power spine module 1122, and any excess power available from attached nodes shareable through SIU 1300, and optionally OPC 1450 by operation of PSC 1340 or PSC 1345 under command of power pooling controller 1230. In a preferred embodiment, power pooling controller 1230 is programmed to maintain a power reserve equal to or greater than the largest single power supply 1330 connected, thus acting as a reserve power supply.

In the event that in stage 3310 it is deemed that it is not possible to reliably connect the new node, in stage 3330 notification of the fault is sent to both the node over the data portion of bi-directional power bus 1210 and to a connected management station 1040 of FIG. 11–17 over LAN/WAN 1022.

Figure 33:
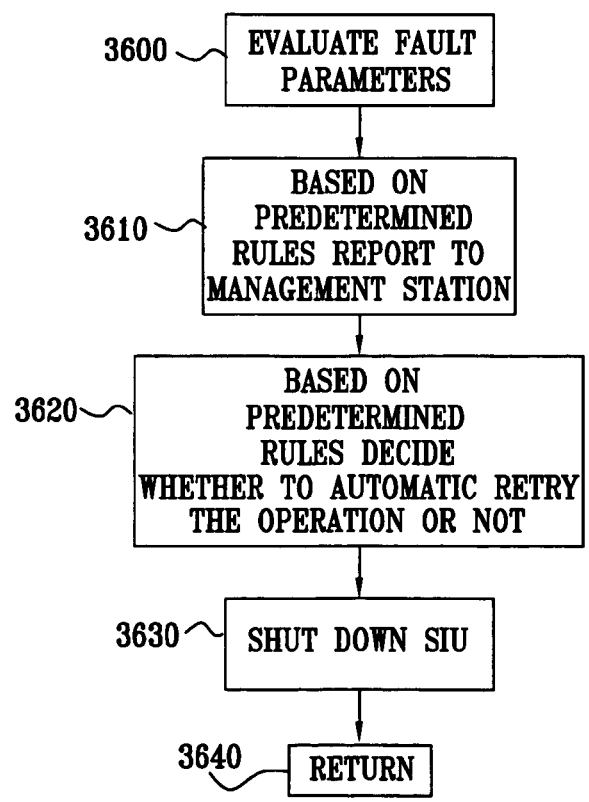
FIG. 33 is a simplified flow chart illustrating the fault phase in the operation of the controller shown in FIG. 29.

In the event that in stage 3310 it is deemed that the new node is deemed to be suitable for connection, in stage 3340 the voltage and current on bi-directional power bus 1210 are noted and in accordance therewith. In stage 3350 parameters of PSC 1340 or 1345 in the newly added node are set. In stage 3360, PSC 1340 or 1345 of the newly attached node is interrogated to report on current, voltage and optionally temperature parameters, to ensure that compliance with the parameters sent in stage 3340 is within the operational capability of PSC 1340 or 1345. In a preferred embodiment, PSC 1340 or 1345 comprises non-volatile memory, operable to store historical operating parameters. In stage 3365 compliance by the newly attached node as indicated by PSC controller 1928 through the data portion of bi-directional power bus 1210 is confirmed. In the event that in stage 3365 the operating parameters of the newly attached node are outside of the acceptable range, in stage 3370 a fault condition is indicated, and the fault routine of FIG. 33 is run.

In the event that in stage 3365 the operating parameters are confirmed to be within the operating capabilities of PSC 1340, 1345 of the newly detected node, in stage 3380 the associated SIU 1300 is set in line with the parameters set in stage 3340 and the new node is powered. In an exemplary embodiment, SIU controller 1620 of SIU 1300 is set with the direction and current limit of the power to be shared from or to the newly attached node.

In stage 3390 voltage and current on bi-directional power bus 1210 under operation of the newly connected node is checked, and the results reported to power pooling controller 1230. In stage 3400 the results reported in stage 3390 are analyzed to ensure proper operation of bi-directional power bus 1210 within acceptable operating parameters. In the event that in stage 3400 bi-directional power bus 1210 operating parameters are not within the acceptable range, in stage 3410 a fault condition is noted, and the fault routine as described in relation to FIG. 33 is run.

Figure 34:
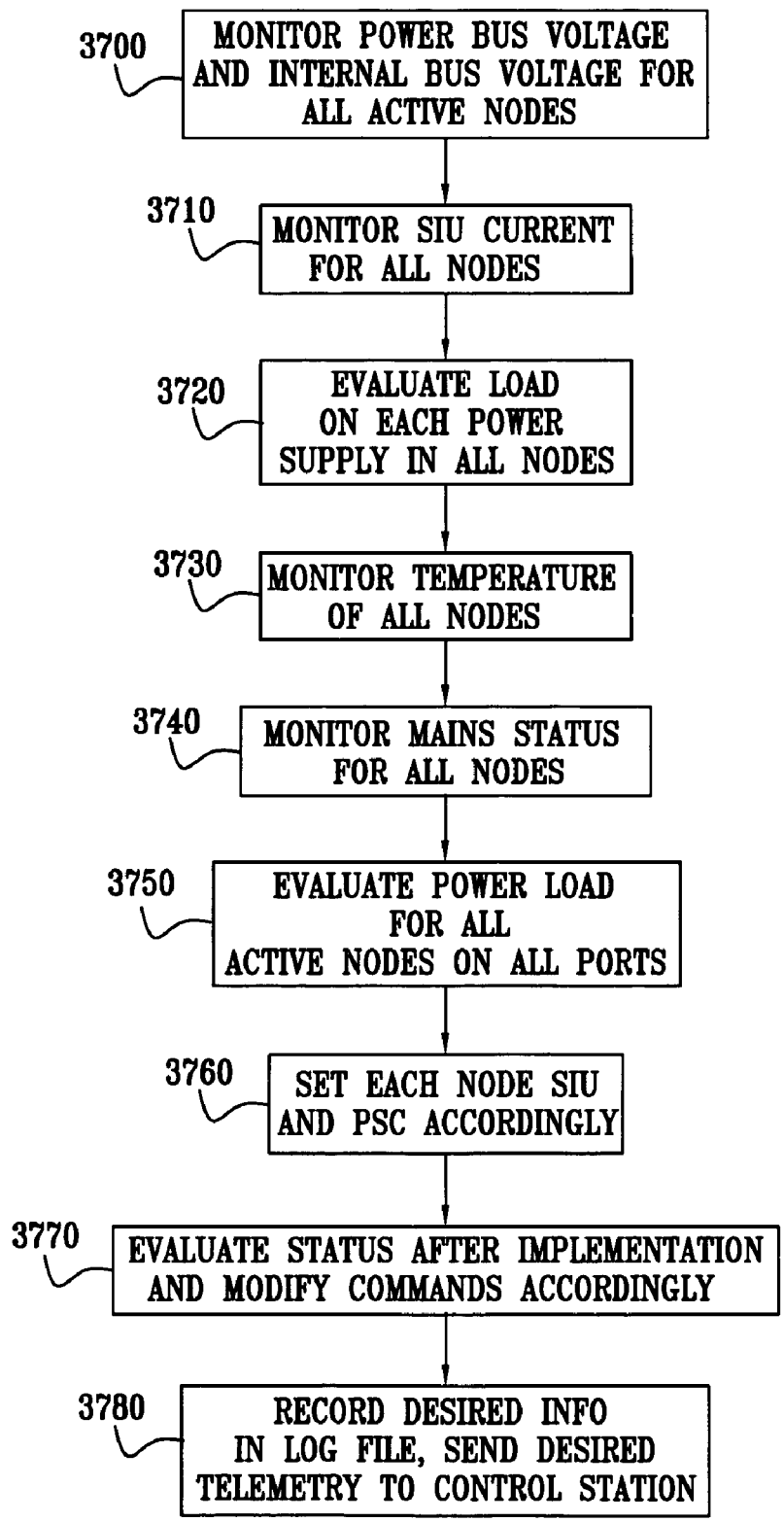
FIG. 34 is a simplified flow chart illustrating the normal mode in the operation of the controller shown in FIG. 29.

In the event that in stage 3400 the operating parameters of bi-directional power bus 1210 are within the acceptable range, in stage 3420 normal mode operation as described above in relation to FIG. 29, and as will be described further hereinto below in relation to FIG. 34 is resumed.

It is to be noted that the successful operation of the flow chart of FIG. 31, enables certain functionality not available to the prior art. In particular, as described above, reserve power supply functionality is available based on the overall power supply in the system, without the requirement for a specific dedicated stand-by power supply. Furthermore, add-power functionality, which allows a node to consume more power than is available from its internal power source is enabled. Furthermore, a distributed UPS functionality is enabled from any battery back up in the system to any node in the system.

Figure 32:
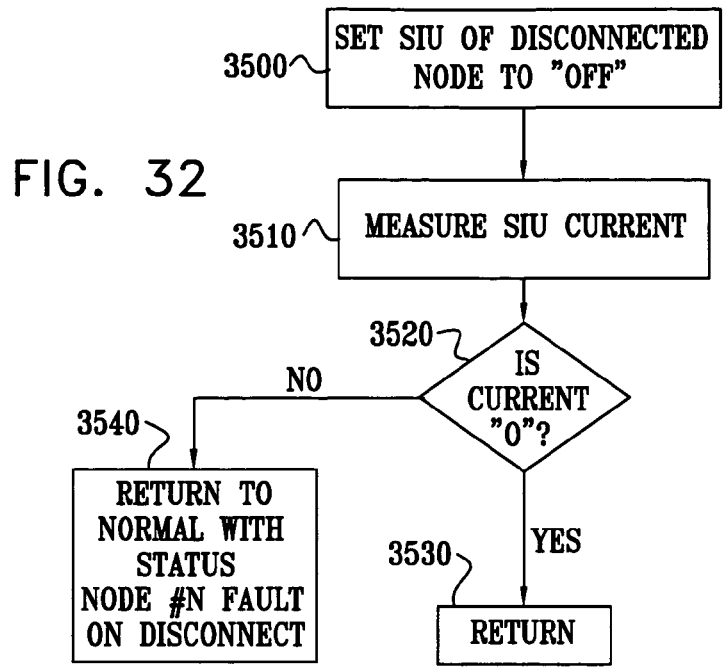
FIG. 32 is a simplified flow chart illustrating the disconnection of a node in the operation of the controller shown in FIG. 29.

FIG. 32 illustrates a high level flow chart of the operation of power pooling controller 1230 in the event of a disconnection of a node, as described above in relation to stage 3020 of FIG. 29. In stage 3500, the parameters of SIU 1300 associated with the disconnected node are set to off. In a preferred embodiment, SIU controller 1620 of FIG. 21C is addressed to open both first and second controllable switch 1590 so as to ensure that no current slows to/from the disconnected node.

In stage 3510 current through SIU 1300 is measured. In a preferred embodiment, SIU controller 1620 is polled to read first and second current sensor 1600. In stage 3520 the actual current sensed is compared with zero. In the event that in stage 3520 the current sensed is not zero, in stage 3540 a fault condition is noted, and the fault routine as described above in relation to stage 3040 of FIG. 29 and as will be described further hereinto below in relation to FIG. 33 is run. In the event that in stage 3520 the current is zero, in stage 3530 normal mode operation as described above in relation to FIG. 29, and as will be described further hereinto below in relation to FIG. 34 is resumed.

FIG. 33 illustrates a high level flow chart of the operation of power pooling controller 1230 in the event of a fault condition being noted, as described above in relation to stage 3040 of FIG. 29. In stage 3600 the fault condition parameters are evaluated, and in stage 3610 the fault condition parameters are compared with predetermined criteria. In the event that the fault condition falls within the predetermined criteria a management report is prepared and transmitted to management station 1040 of FIGS. 11–17 over LAN/WAN 1022. In stage 3620, a second set of pre-determined criteria are examined, to determine whether an automatic retry functionality is to be attempted. If an automatic retry is to be attempted, the program returns to the fault calling program with instructions to retry. In the event that a retry has failed, or in stage 3620 no retry is indicated, in stage 3630 the associated SIU 1300 is shut down. In stage 3640 normal mode operation as described above in relation to FIG. 29, and as will be described further hereinto below in relation to FIG. 34 is resumed.

FIG. 34 illustrates a high level flow chart of the operation of power pooling controller 1230 in normal mode, as described above in relation to stage 3030 of FIG. 29. In stage 3700, the operating voltage of bi-directional power bus 1210 and the operating voltage of internal bus 1350 of each connected active node is monitored to ensure proper operation within operating parameters. In stage 3710 current and direction of each SIU 1300 is monitored.

In stage 3720, based on the information obtained in stages 3700 and 3710 the load on each connected power supply is evaluated in real time. Internal power supplies 1330 of attached nodes, any internal power supply 1330 units, power supply 1330 of power bus power supply module 1140 and battery pack 1108 are all monitored. In stage 3730, the temperature of all power supply 1330 units are monitored, as indicated by temperature sensor 1750 connected to PSC controller 1928 and transmitter to power pooling controller 1230 of the data portion of bi-directional power bus 1210. In stage 3740 the mains power of each unit is monitored.

In stage 3750, the actual load on each of the power supplies connected to the system and available over bi-directional power share bus 1210 is evaluated, and in stage 3760 an optimization algorithm adjusts PSC 1340, 1345 and the associated SIU 1300 accordingly, thus achieving real time adjustment and optimization of all associated power supplies. In a preferred embodiment, the optimization algorithm comprises optimizing load sharing, heat distribution, battery support time and overall efficiency.

In stage 3770, any changes sent in stage 3760 to PSC 1340, 1345 are evaluated in real time based on feedback communicated from SIU 1300 and PSC 1340, 1345. In the event that operation is not optimum, stage 3760 is rerun to reoptimize. In stage 3780, a log is kept of all activities and instructions, and selected telemetry comprising selected operating parameters are sent over LAN/WAN 1022 to management station 1040.

Figure 35:
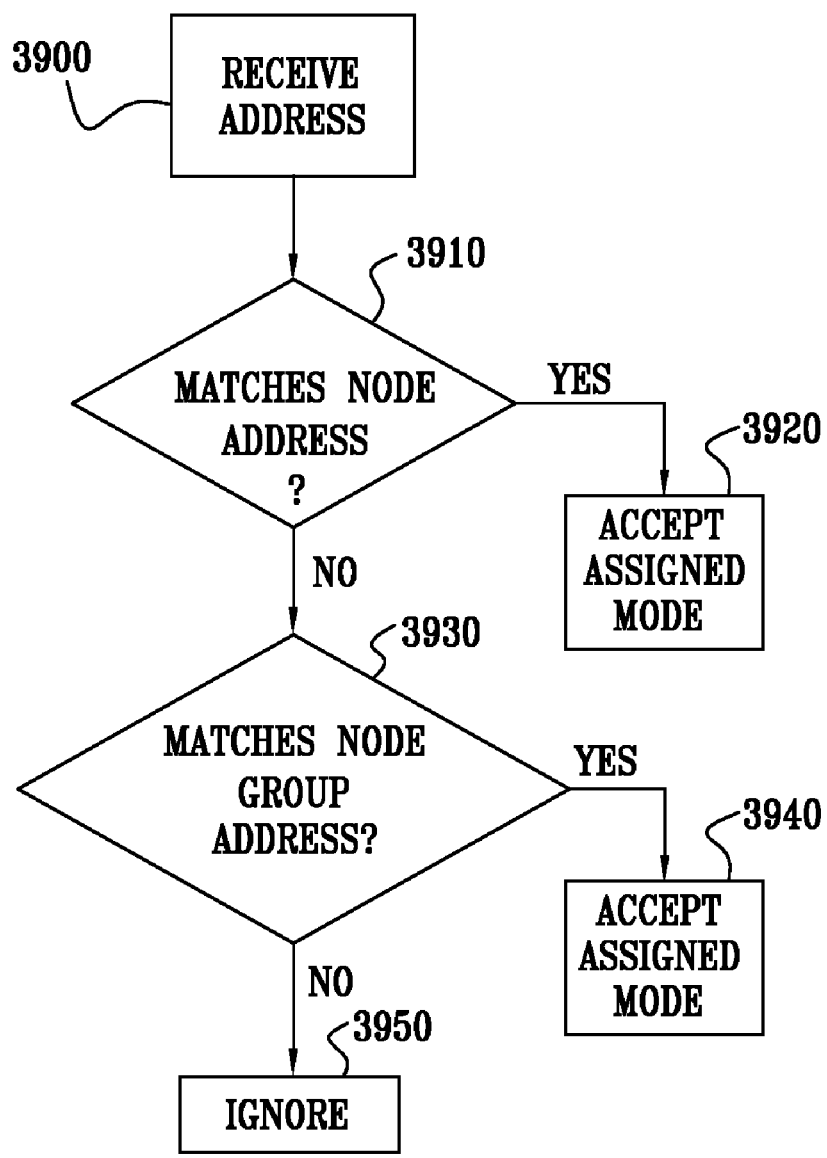
FIG. 35 is a simplified flow chart illustrating an addressing system in accordance with the principle of the subject invention.

FIG. 35 illustrates a high level flow chart of an addressing system in accordance with the principle of the subject invention. As indicated above, each node is provided with both an address, and a group number. Preferably, multiple nodes are provided with the same group number. In this manner, multiple nodes are addressed over a serial bus rapidly in the event of certain conditions, thus avoiding the need to individually address each node. In one non-limiting embodiment, in the event of a failure of a DC power source in a single node, pooling controller 1230 reacts by sending a group message to a plurality of nodes setting them to an emergency power mode. In one embodiment the emergency power mode comprises a reduced power demand of the electrical load of the node, and in another embodiment the reduced power mode comprises an increased power output of the associated DC power source of the node. In one embodiment reduced power demand of the electrical load of the node is accomplished by removing power from low priority loads. Preferably, the node is operable to notify the pooling controller of the failure of the DC power source of the node. In an exemplary embodiment, the use of group addressing allows for a response to a failure event within 10 milliseconds, thus avoiding any damage caused by an interruption in power. In one embodiment a failure is defined as an increase in temperature of a DC power source above a pre-set limit.

In stage 3900, a message, comprising an address, is received, and in stage 3910 the address of the message is compared with the node address. In the event that the address matches the node address, in stage 3920 the message is acted upon. In the event that in stage 3910 the address does not match the node address, in stage 3930 the address is compared to the group address assigned to the node. In the event that in stage 3930 the address matches the group address, in stage 3940 the node acts on the message. In the event that in stage 3930 the address does not match the group address, in stage 3950 the message is discarded. Such a group addressing system allows power pooling controller 1230 to group address a message requiring immediate action by multiple nodes in real time, without requiring individual nodes to be addressed. For example, in the event of a catastrophic power failure in the power supply 1330 of one or more nodes, power pooling controller 1230 may address all nodes in a specific group address to go to a power saving mode, and may address all nodes in a separate group address to maximize their power output. Alternatively, a single group address may be utilized to maximize the power output of some units, and place other units in a reduced power requirement mode, without exceeding the scope of the invention.

Thus the present invention provides for a system of power pooling of DC electrical power consuming and providing entities being interconnected to pool power under control of a pooling controller.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A DC power pooling system, comprising:
   a plurality of DC electrical power consuming and providing entities, each of said plurality of DC electrical power consuming and providing entities having at least a first operative mode in which it may provide more electrical power than it consumes and a second operative mode in which it may consume more electrical power than it provides, wherein each of said plurality of DC electrical power consuming and providing entities comprises at least one DC electrical power source and at least one electrical power load;
   DC electrical power interconnections, interconnecting said plurality of DC electrical power consuming and providing entities and permitting electrical power flow thereto and therefrom; and
   at least one pooling controller operative to vary at least one of voltage, output impedance and current of electrical power provided by at least one of said plurality of DC electrical power consuming and providing entities.

2. A DC power pooling system according to claim 1, wherein said DC electrical power source receives AC mains power and converts said AC mains power to DC electrical power.

3. A DC power pooling system according to claim 1, further comprising at least one power sharing circuit associated with said at least one DC electrical power source, said at least one power sharing circuit being responsive to an output of said at least one pooling controller to vary said at least one of voltage, output impedance and current of electrical power provided by said at least one DC electrical power source.

4. A DC power pooling system according to claim 3, wherein said at least one DC electrical power source comprises a power supply controller, and wherein said at least one power sharing circuit is operable to modify the operation of said power supply controller.

5. A DC power pooling system according to claim 1, wherein said pooling controller receives for each of said plurality of DC electrical power consuming and providing entities information relating to DC electrical power needs and DC electrical power providing capabilities.

6. A DC power pooling system according to claim 1, wherein said pooling controller receives at least one of power needs of said at least one electrical power load and power providing capabilities of said at least one DC electrical power source.

7. A DC power pooling system according to claim 1, further comprising a supply interface unit associated with at least one of said DC electrical power interconnections, said supply interface unit being responsive to an output of said at least one pooling controller to control said electrical power flow.

8. A DC power pooling system according to claim 7, wherein said supply interface unit comprises at least one adjustable current limiter responsive to an output of said at least one pooling controller, said at least one adjustable current limiter being operative for limiting at least one of said electrical power flow to at least one of said plurality of DC electrical power consuming and providing entities and from at least one of said plurality of DC electrical power consuming and providing entities.

9. A DC power pooling system according to claim 7, wherein said supply interface unit comprises at least one current sensor, said at least one current sensor being operative for sensing at least one of said electrical power flow to at least one of said plurality of DC electrical power consuming and providing entities and from at least one of said plurality of DC electrical power consuming and providing entities.

10. A DC power pooling system according to claim 9, wherein said supply interface unit comprises a telemetry output operable to communicate with said at least one pooling controller, said telemetry output comprising information regarding at least one of direction and extent of electrical power flow.

11. A DC power pooling system according to claim 1, wherein at least one of said plurality of DC electrical power consuming and providing entities comprises a temperature sensor having a temperature indicating output, wherein said at least one of said plurality of DC electrical power consuming and providing entities communicates information regarding said temperature indicating output to said at least one pooling controller.

12. A DC power pooling system according to claim 3, wherein power sharing circuit comprises a temperature sensor having a temperature indicating output, said at least one power sharing circuit being operable to communicate information regarding said temperature indicating output to said at least one pooling controller.

13. A DC power pooling system according to claim 1, wherein at least one of said plurality of DC electrical power consuming and providing entities comprises at least one of a modem, a switch, a switch providing power over Ethernet, an Internet Protocol telephone, a computer, a server, a camera, an access controller, a smoke sensor and a wireless access point.

14. A DC power pooling system according to claim 1, further comprising an overcurrent protection circuit associated with at least one of said DC electrical power interconnections.

15. A DC power pooling system according to claim 14, wherein said overcurrent protection circuit comprises at least one of a fuse and a circuit breaker operative to prevent excess power flow.

16. A DC power pooling system according to claim 1, further comprising a power supply module interconnected with at least one of said DC electrical power interconnections, said power supply module being operative to supply power to at least one of said plurality of DC electrical power consuming and providing entities when said at least one of said plurality of DC electrical power consuming and providing entities is operative in said second mode.

17. A DC power pooling system according to claim 1, further comprising a power supply module interconnected with at least one of said DC electrical power interconnections, and wherein said power supply module is operative in response to an output of said at least one pooling controller to supply power to at least one of said plurality of DC electrical power consuming and providing entities when said at least one of said plurality of DC electrical power consuming and providing entities is operative in said second mode.

18. A DC power pooling system according to claim 1, further comprising a battery pack module interconnected with at least one of said DC electrical power interconnections, and wherein said battery pack module supplies power to at least one of said plurality of DC electrical power consuming and providing entities when said at least one of said plurality of DC electrical power consuming and providing entities is operative in said second mode.

19. A DC power pooling system according to claim 1, wherein said DC electrical power interconnections are arranged in one of a hierarchical star topology and a hierarchical ring topology.

20. A method of DC power pooling comprising:
providing a plurality of DC electrical power consuming and providing entities, each of said plurality of DC electrical power consuming and providing entities having at least a first operative mode in which it may provide more electrical power than it consumes and a second operative mode in which it may consume more electrical power than it provides, wherein each of said plurality of DC electrical power consuming and providing entities comprises at least one DC electrical power source and at least one electrical power load;
providing at least one pooling controller;
interconnecting said plurality of DC electrical power consuming and providing entities thereby permitting electrical power flow thereto and therefrom; and
varying at least one of voltage, output impedance and current of electrical power provided by at least one of said plurality of DC electrical power consuming and providing entities in response to an output of said at least one pooling controller thereby enabling DC power pooling.

21. A method of DC power pooling according to claim 20, further comprising:
receiving AC mains power by said each of said plurality of DC electrical power consuming and providing entities;
converting said AC mains power to DC power; and
providing said DC power to said at least one electrical power load located in said each of said plurality of DC electrical power consuming and providing entities.

22. A method of DC power pooling according to claim 20, further comprising:
providing at least one power sharing circuit associated with said at least one DC electrical power source, and wherein said varying is accomplished by said at least one power sharing circuit.

23. A method of DC power pooling according to claim 22, wherein said at least one DC electrical power source comprises a power supply controller, and wherein said varying is accomplished by modifying the operation of said power supply controller.

24. A method of DC power pooling according to claim 20, further comprising:
receiving for each of said plurality of DC electrical power consuming and providing entities information relating to DC electrical power needs and DC electrical power providing capabilities,
wherein said varying is accomplished at least partially in response to said received information.

25. A method of DC power pooling according to claim 20, further comprising:
receiving by said pooling controller at least one of power needs of said at least one electrical power load and power providing capabilities of said at least one DC electrical power source.

26. A method of DC power pooling according to claim 20, further comprising:
providing a supply interface unit associated with at least one of said plurality of DC electrical power consuming and providing entities; and
controlling said electrical power flow in response to an output of said at least one pooling controller.

27. A method of DC power pooling according to claim 26, wherein said controlling comprises:
limiting at least one of said electrical power flow to at least one of said plurality of DC electrical power consuming and providing entities and from at least one of said plurality of DC electrical power consuming and providing entities.

28. A method of DC power pooling according to claim 26, further comprising:
sensing at least one of said electrical power flow to at least one of said plurality of DC electrical power and consuming entities and from at least one of said plurality of DC electrical power and consuming entities.

29. A method of DC power pooling according to claim 28, further comprising:
communicating information relating to at least one of direction and amount of electrical power flow sensed by said sensing to said at least one pooling controller.

30. A method of DC power pooling according to claim 20, further comprising:
sensing a temperature of at least one said plurality of DC electrical power consuming and providing entities; and
communicating information relating to said sensed temperature to said at least one pooling controller.

31. A method of DC power pooling according to claim 22, further comprising:
sensing a temperature of said at least one DC electrical power source;
communicating information relating to said sensed temperature to said at least one pooling controller.

32. A method of DC power pooling according to claim 20, wherein at least one of said plurality of DC electrical power consuming and providing entities comprises at least one of a modem, a switch, a switch providing power over Ethernet, an Internet Protocol telephone, a computer, a server, a camera, an access controller, a smoke sensor and a wireless access point.

33. A method of DC power pooling according to claim 20, further comprising:
protecting at least one of said plurality of DC electrical power consuming and providing entities against excess electrical power flow.

34. A method of DC power pooling according to claim 33, wherein said protecting comprises:
providing at least one of a fuse and a circuit breaker operative to prevent excess electrical power flow.

35. A method of DC power pooling according to claim 20, further comprising:
providing a power supply module;
interconnecting said power supply module with said interconnected plurality of DC electrical power consuming and providing entities; and
supplying power from said power supply module to at least one of said plurality of DC electrical power consuming and providing entities when said at least one of said plurality of DC electrical power consuming and providing entities is operative in said second mode.

36. A method of DC power pooling according to claim 20, further comprising:
providing a power supply module;
interconnecting said power supply module with said interconnected plurality of DC electrical power consuming and providing entities; and
supplying power from said power supply module in response to an output of said at least one pooling controller to at least one of said plurality of DC electrical power consuming and providing entities when said at least one of said plurality of DC electrical power consuming and providing entities is operative in said second mode.

37. A method of DC power pooling according to claim 20, further comprising:
providing a battery pack module;
interconnecting said battery pack module with said interconnected plurality of DC electrical power consuming and providing entities; and
supplying power from said battery pack module to at least one of said plurality of DC electrical power consuming and providing entities when said at least one of said plurality of DC electrical power consuming and providing entities is operative in said second mode.

38. A method of DC power pooling according to claim 20, wherein said interconnecting is done in one of a hierarchical star topology and a hierarchical ring topology.

* * * * *